US011931676B2

(12) United States Patent
Abdalla et al.

(10) Patent No.: US 11,931,676 B2
(45) Date of Patent: Mar. 19, 2024

(54) SEALING SYSTEMS AND METHODS FOR A FILTRATION SYSTEM

(71) Applicant: CUMMINS FILTRATION INC., Nashville, TN (US)

(72) Inventors: Wassem Abdalla, Fishers, IN (US); Vaibhav Pimpalte, Pune (IN); Jayant Singh, Pune (IN); Sagar Padale, Pune (IN)

(73) Assignee: Cummins Filtration Inc., Nashville, TN (US)

( * ) Notice: Subject to any disclaimer, the term of this patent is extended or adjusted under 35 U.S.C. 154(b) by 7 days.

(21) Appl. No.: 17/241,463

(22) Filed: Apr. 27, 2021

(65) Prior Publication Data

US 2022/0047971 A1 Feb. 17, 2022

(30) Foreign Application Priority Data

Aug. 14, 2020 (DE) .......................... 202020104741.8

(51) Int. Cl.
*B01D 29/21* (2006.01)
*B01D 35/16* (2006.01)
*B01D 35/31* (2006.01)

(52) U.S. Cl.
CPC ............. *B01D 29/21* (2013.01); *B01D 35/16* (2013.01); *B01D 35/31* (2013.01); *B01D 2201/0415* (2013.01); *B01D 2201/291* (2013.01)

(58) Field of Classification Search
CPC ........ B01D 29/21; B01D 35/16; B01D 35/31; B01D 2201/0415; B01D 2201/291;
(Continued)

(56) References Cited

U.S. PATENT DOCUMENTS 4,619,764 A 10/1986 Church et al.
4,906,365 A 3/1990 Baumann et al.
(Continued)

FOREIGN PATENT DOCUMENTS

CN 1756582 A 4/2006
CN 101730570 6/2010
(Continued)

OTHER PUBLICATIONS

International Search Report & Written Opinion for PCT Application No. PCT/US2019/036726, dated Aug. 30, 2019, 13 pages.
(Continued)

*Primary Examiner* — Waqaas Ali
(74) *Attorney, Agent, or Firm* — Foley & Lardner LLP

(57) ABSTRACT

A filter assembly includes a filter head and a filter cartridge. The filter head includes a filter head coupling surface, a filter head outlet, a filter head inner wall, and a filter head outer wall. The filter head coupling surface defines a filter head opening. The filter head outlet is configured to provide a fluid. The filter head inner wall extends around the filter head outlet. The filter head outer wall extends around the filter head inner wall. The filter head inner wall and the filter head outer wall collectively define a filter head channel. The filter cartridge includes a filter cartridge shell and a filter element. The filter cartridge shell has a filter cartridge coupling surface that is configured to be coupled to the filter head coupling surface. The filter cartridge shell defines a filter cartridge opening.

19 Claims, 48 Drawing Sheets

(58) Field of Classification Search
CPC ............ B01D 2201/347; B01D 35/147; B01D 35/30; B01D 29/96; B01D 2201/295; B01D 2201/303; B01D 2201/304; F01M 2011/031; F01M 11/03; F02M 37/42; F02M 37/54

See application file for complete search history.

(56) References Cited

U.S. PATENT DOCUMENTS

| | | | |
|---|---|---|---|
| 5,098,559 A | 3/1992 | Mack et al. | |
| 5,468,386 A | 11/1995 | Ardes | |
| 5,520,801 A | 5/1996 | Gerber et al. | |
| 5,718,825 A | 2/1998 | Greive et al. | |
| 5,906,733 A | 5/1999 | Purvey | |
| 6,068,762 A | 5/2000 | Stone et al. | |
| 6,308,836 B1 | 10/2001 | Guichaoua et al. | |
| 6,319,402 B1 | 11/2001 | Schwandt et al. | |
| 6,506,303 B1 | 1/2003 | Gustafsson et al. | |
| 6,543,625 B1 | 4/2003 | Le Roux et al. | |
| 6,544,412 B2 | 4/2003 | Michels et al. | |
| 6,554,139 B1 | 4/2003 | Maxwell et al. | |
| 6,555,000 B2 | 4/2003 | Knight | |
| 6,837,993 B2 | 1/2005 | Clausen et al. | |
| 6,910,692 B2 | 6/2005 | Malone et al. | |
| 6,936,162 B1 | 8/2005 | McKenzie | |
| 6,983,851 B2 | 1/2006 | Maxwell et al. | |
| 6,986,426 B2 | 1/2006 | Clausen et al. | |
| 7,086,537 B2 | 8/2006 | Maxwell et al. | |
| 7,175,761 B2 | 2/2007 | Stanhope et al. | |
| 7,204,370 B2 | 4/2007 | Clausen et al. | |
| 7,329,342 B2 | 2/2008 | Faria | |
| 7,335,300 B1 | 2/2008 | Stamey et al. | |
| 7,360,658 B2 | 4/2008 | Clausen et al. | |
| 7,384,547 B2 | 6/2008 | Evanovich et al. | |
| 7,410,575 B1 | 8/2008 | Crawford et al. | |
| 7,435,341 B2 | 10/2008 | Crawford et al. | |
| 7,543,711 B1 | 6/2009 | Stamey et al. | |
| 7,572,306 B2 | 8/2009 | Hawkins et al. | |
| 7,682,507 B2 | 3/2010 | Stamey et al. | |
| 8,034,240 B2 | 10/2011 | Reiland et al. | |
| 8,083,938 B2 | 12/2011 | Lepine et al. | |
| 8,092,690 B2 | 1/2012 | Stamey et al. | |
| 8,119,002 B2 | 2/2012 | Schiavon et al. | |
| 8,127,934 B2 | 3/2012 | Stamey et al. | |
| 8,128,819 B2 | 3/2012 | Beard et al. | |
| 8,168,066 B2 | 5/2012 | Wieczorek et al. | |
| 8,231,781 B2 | 7/2012 | Lepine et al. | |
| 8,349,173 B2 | 1/2013 | Evanovich et al. | |
| 8,425,769 B2 | 4/2013 | Gift et al. | |
| 8,465,643 B2 | 6/2013 | Beard et al. | |
| 8,480,885 B2 | 7/2013 | Bryson et al. | |
| 8,561,808 B2 | 10/2013 | Van Savooijen et al. | |
| 8,727,134 B2 | 5/2014 | Jokschas et al. | |
| 9,266,044 B2 | 2/2016 | Van Savooijen et al. | |
| 9,433,881 B2 | 9/2016 | Schiavon et al. | |
| 2002/0100720 A1* | 8/2002 | Jainek .................. | B01D 35/153 210/450 |
| 2002/0108897 A1 | 8/2002 | Pavlin et al. | |
| 2003/0127384 A1 | 7/2003 | Kapur | |
| 2004/0094464 A1 | 5/2004 | Baumann et al. | |
| 2004/0206682 A1 | 10/2004 | Hamlin et al. | |
| 2004/0232063 A1 | 11/2004 | Cline et al. | |
| 2005/0279958 A1 | 12/2005 | Baumann | |
| 2006/0118475 A1 | 6/2006 | Girondi | |
| 2006/0118476 A1 | 6/2006 | Weindorf et al. | |
| 2006/0207948 A1 | 9/2006 | Hacker et al. | |
| 2007/0215561 A1 | 9/2007 | Yates et al. | |
| 2008/0035587 A1 | 2/2008 | Wieczorek et al. | |
| 2012/0199522 A1 | 8/2012 | Weindorf | |
| 2013/0025246 A1 | 1/2013 | Burns et al. | |
| 2014/0091029 A1 | 4/2014 | Van Savooijen et al. | |
| 2014/0202939 A1 | 7/2014 | Luther et al. | |
| 2014/0284266 A1* | 9/2014 | Kamp .................. | B01D 35/153 210/462 |
| 2015/0265948 A1 | 9/2015 | Ellison et al. | |
| 2015/0283486 A1 | 10/2015 | Fisher | |
| 2016/0023145 A1 | 1/2016 | Greco et al. | |
| 2017/0209821 A1 | 7/2017 | Allott et al. | |
| 2018/0333661 A1 | 11/2018 | Vogt | |
| 2018/0333663 A1 | 11/2018 | Vogt | |

FOREIGN PATENT DOCUMENTS

| | | | |
|---|---|---|---|
| DE | 35 38 589 A1 | 5/1987 | |
| DE | 10064482 A1 | 7/2002 | |
| EP | 1 047 485 B1 | 11/2000 | |
| EP | 1 216 740 A1 | 6/2002 | |
| EP | 1 616 611 A1 | 1/2006 | |
| FR | 3078895 A1 * | 9/2019 | ............ B01D 29/15 |
| JP | 3834402 B2 | 10/2006 | |
| WO | WO-2004/069373 A1 | 8/2004 | |
| WO | WO-2008/021902 A1 | 2/2008 | |

OTHER PUBLICATIONS

Office Action issued for Chinese Patent Application No. CN 201980040107.X dated Jun. 2, 2022, 15 pages.
First Office Action issued for Chinese Patent Application No. CN 201980040107.X dated Oct. 25, 2021, 12 pages.
Non-Final Office Action issued for U. S. U.S. Appl. No. 17/121,223 dated May 5, 2023, 35 pages.

* cited by examiner

SEALING SYSTEMS AND METHODS FOR A FILTRATION SYSTEM

CROSS-REFERENCE TO RELATED PATENT APPLICATION

The present application claims priority to German Utility Model No. 202020104741.8, entitled "Sealing System for a Filtration System" and filed Aug. 14, 2020, the contents of which are incorporated herein by reference.

TECHNICAL FIELD

The present application relates to sealing systems and methods for use in a filter assembly.

BACKGROUND

Internal combustion engines utilize various fluid systems. These fluid systems include or may include filters. These filters may be changed periodically. These filters may include gaskets for creating various seals. During use, these gaskets may be come deformed, thereby causing the seals to no longer be maintained.

SUMMARY

In one set of embodiments, a filter assembly includes a filter head and a filter cartridge. The filter head includes a filter head coupling surface, a filter head second inlet, a filter head outlet, a filter head inner wall, and a filter head outer wall. The filter head coupling surface defines a filter head opening. The filter head outlet is configured to provide a fluid. The filter head inner wall extends around the filter head outlet. The filter head outer wall extends around the filter head inner wall. The filter head inner wall and the filter head outer wall collectively define a filter head channel. The filter cartridge includes a filter cartridge shell and a filter element. The filter cartridge shell has a filter cartridge coupling surface that is configured to be coupled to the filter head coupling surface. The filter cartridge shell defines a filter cartridge opening. The filter element is configured to be contained within the filter head opening and the filter cartridge opening when the filter cartridge coupling surface is coupled to the filter head coupling surface. The filter element includes a first endcap, a seal member, and filter media. The seal member is coupled to the first endcap and configured to be received within the filter head channel when the filter element is contained within the filter head opening and the filter cartridge opening. The filter media is coupled to the first endcap.

In another set of embodiments, a filter cartridge includes a filter cartridge shell and a filter element. The filter cartridge shell has a filter cartridge coupling surface. The filter cartridge shell defines a filter cartridge opening. The filter element is configured to be contained within the filter cartridge opening. The filter element includes filter media, a first endcap, and a seal member. The first endcap includes a first endcap flange, a first endcap inner wall, and a first endcap outer wall. The first endcap flange interfaces with the filter media. The first endcap inner wall is contiguous with the first endcap flange. The first endcap inner wall projects orthogonally from the first endcap flange. The first endcap outer wall is contiguous with the first endcap flange. The first endcap outer wall projects orthogonally from the first endcap flange and interfaces with the filter media. The seal member is coupled to the first endcap and is separated from the filter media by the first endcap.

In yet another set of embodiments, a filter assembly includes a filter head and a filter cartridge. The filter head includes a filter head coupling surface, a filter head outlet, a filter head inner wall, a filter head outer wall, and a vent. The filter head coupling surface defines a filter head opening. The filter head outlet is configured to provide a fluid. The filter head inner wall extends around the filter head outlet. The filter head outer wall extends around the filter head inner wall. The filter head inner wall and the filter head outer wall collectively define a filter head channel. The vent extends from the filter head channel and configured to facilitate evacuation of air within the filter head channel. The filter cartridge includes a filter cartridge and a filter element. The filter cartridge coupling surface is configured to be coupled to the filter head coupling surface. The filter element is configured to be contained within the filter head opening when the filter cartridge coupling surface is coupled to the filter head coupling surface. The filter element includes a first endcap, a seal member, and filter media. The seal member is coupled to the first endcap and configured to be received within the filter head channel when the filter element is contained within the filter head opening. The filter media is coupled to the first endcap. The vent extends above the first endcap when the filter cartridge coupling surface is coupled to the filter head coupling surface.

BRIEF DESCRIPTION OF THE DRAWING

The details of one or more implementations are set forth in the accompanying drawing and the description below. Other features, aspects, and advantages of the disclosure will become apparent from the description, the drawing, and the claims, in which:

Figure 1:
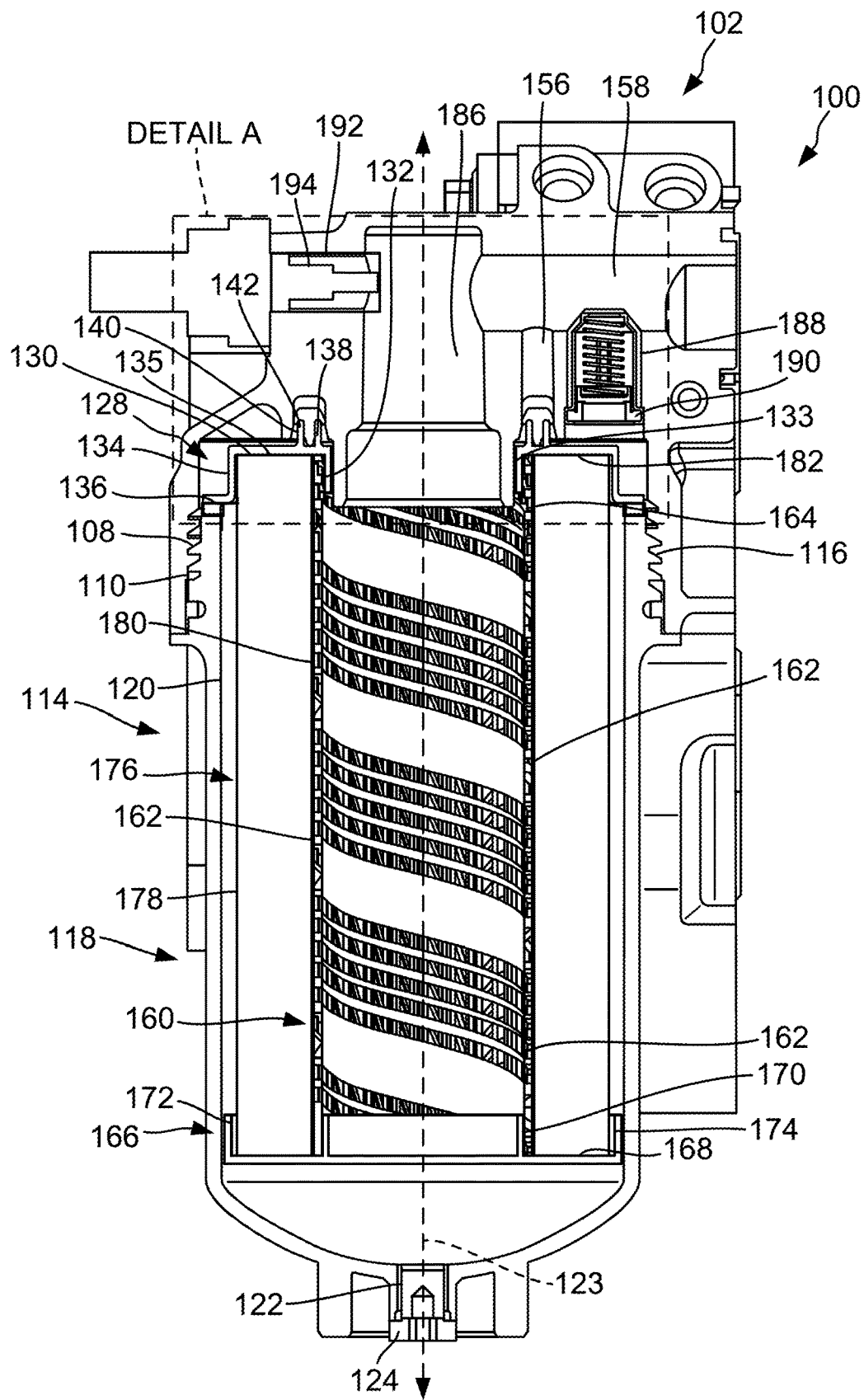
FIG. 1 is a cross-sectional view of a filter assembly, according to an example embodiment.

It will be recognized that the Figures are schematic representations for purposes of illustration. The Figure are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a sealing system for use in a filter assembly for a fluid system of an internal combustion engine system. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Filter systems often utilize gaskets to establish seals that mitigate passage of a fluid around a filter. In this way, these seals prevent unfiltered fluid from, for example, being provided to sensitive components, such as a pump or a cylinder of an internal combustion engine. However, these gaskets can become deformed over time and the seals can become compromised.

Embodiments herein relate to a filter assembly that is utilized with a fluid system. The filter assembly includes a filter head and a filter cartridge. A fluid is routed from the filter head into the filter cartridge for filtering by filter media within the filter cartridge, and then is routed from the filter cartridge back into the filter head (e.g., for providing to downstream components of the fluid system, etc.). The filter head includes an endcap with a seal member that is received within a filter head channel in the filter head such that two seals are established between the seal member and the filter head. In contrast to this dual seal, other filter systems are only capable of providing a single seal. By providing two seals, the filter assembly described herein is less likely to provide unfiltered fluid to the filter head, and therefore is more desirable than other filter systems that only provide one seal. The two seals also mitigate impacts of compression set (e.g., due to a lip seal style, due to pressure creasing compression of the seal member, etc.), which can cause other filter systems with only a single seal to leak. Additionally, the filter assembly described herein may include a vent in the filter head. The vent is in fluid communication with the filter head channel and is configured to evacuate air from between the filter head channel and the seal member, thereby enhancing the two seal provided by the seal member. By decreasing the likelihood of unfiltered fluid being provided form the filter head, the fluid system, and therefore the internal combustion engine system that utilizes the fluid system, is more desirable (e.g., due to decreased maintenance costs, increased longevity, decreased frequency of servicing events, etc.).

II. Example Filter Assembly

Figure 2:
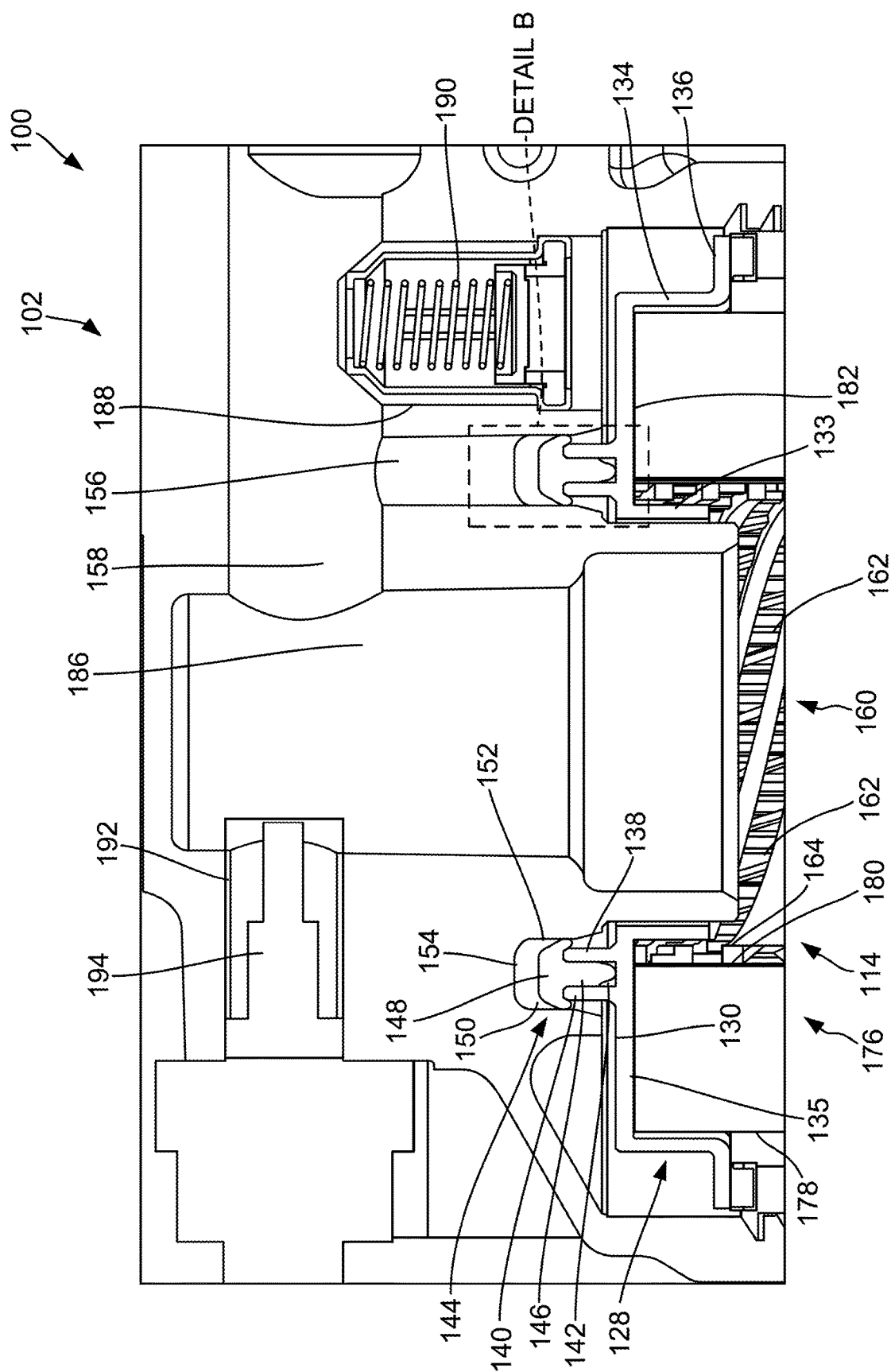
FIG. 2 is a view of DETAIL A shown in FIG. 1.
Figure 3:
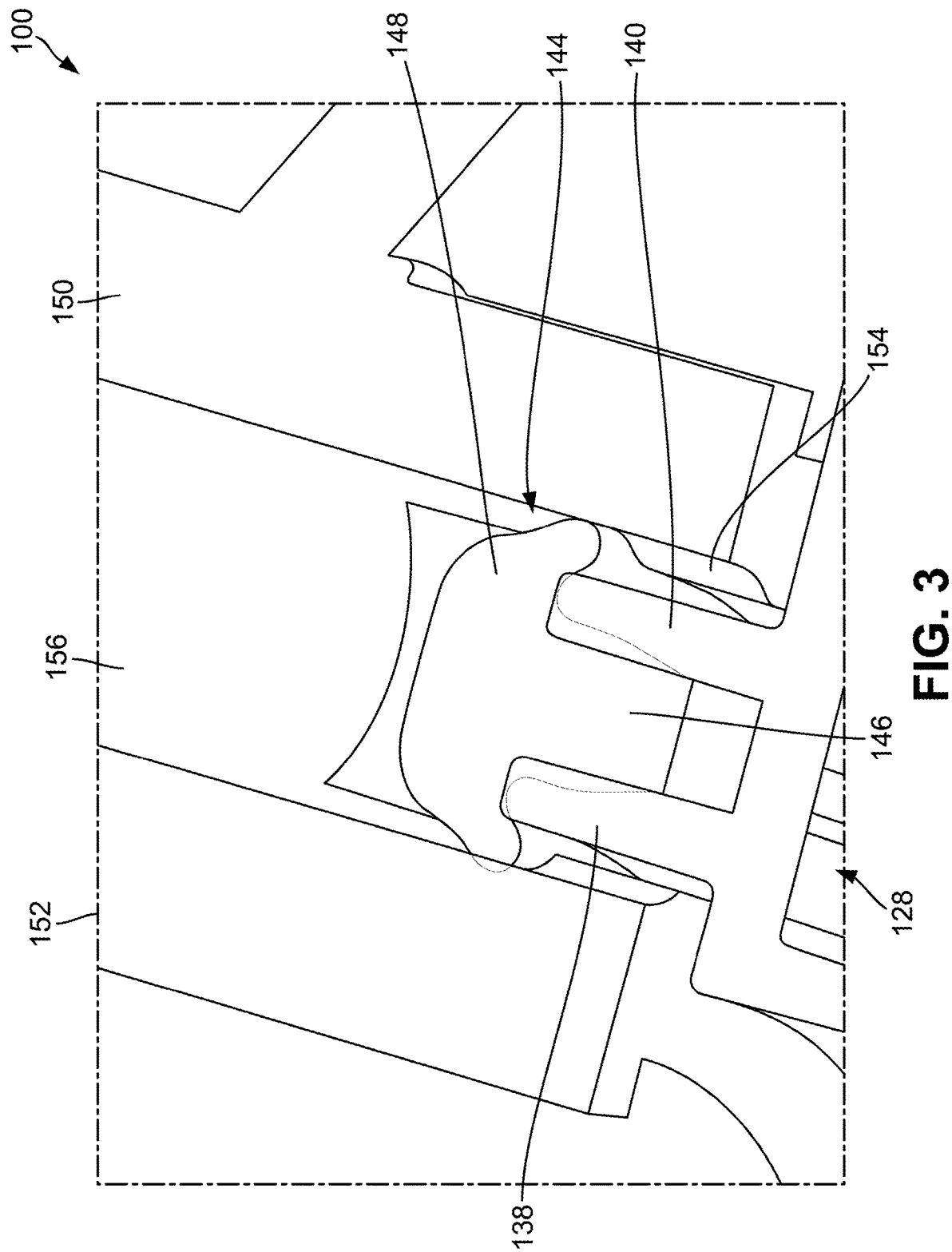
FIG. 3 is a perspective view of DETAIL B shown in FIG. 1.

FIGS. 1-3 depict a filter assembly 100 (e.g., filtration system, etc.) according to an example embodiment. The filter assembly 100 is utilized with a fluid system (e.g., lubricant fluid system, fuel fluid system, reductant system, etc.) of an internal combustion engine system (e.g., diesel internal combustion engine system, gasoline internal combustion engine system, natural gas internal combustion engine system, lean-burn internal combustion engine system, biofuel internal combustion engine system, biodiesel internal combustion engine system, bi-fuel internal combustion engine system, hybrid internal combustion engine system, etc.).

The filter assembly 100 includes a filter head 102 (e.g., base, body, etc.). The filter head 102 is configured to be attached to, or integrally formed with, a component (e.g., cylinder head, cylinder block, bracket, pump, rail, support, etc.) of the internal combustion engine system. For example, the filter head 102 may be configured to be attached to, or integrally formed with, a cylinder block of the internal combustion engine system.

Figure 4:
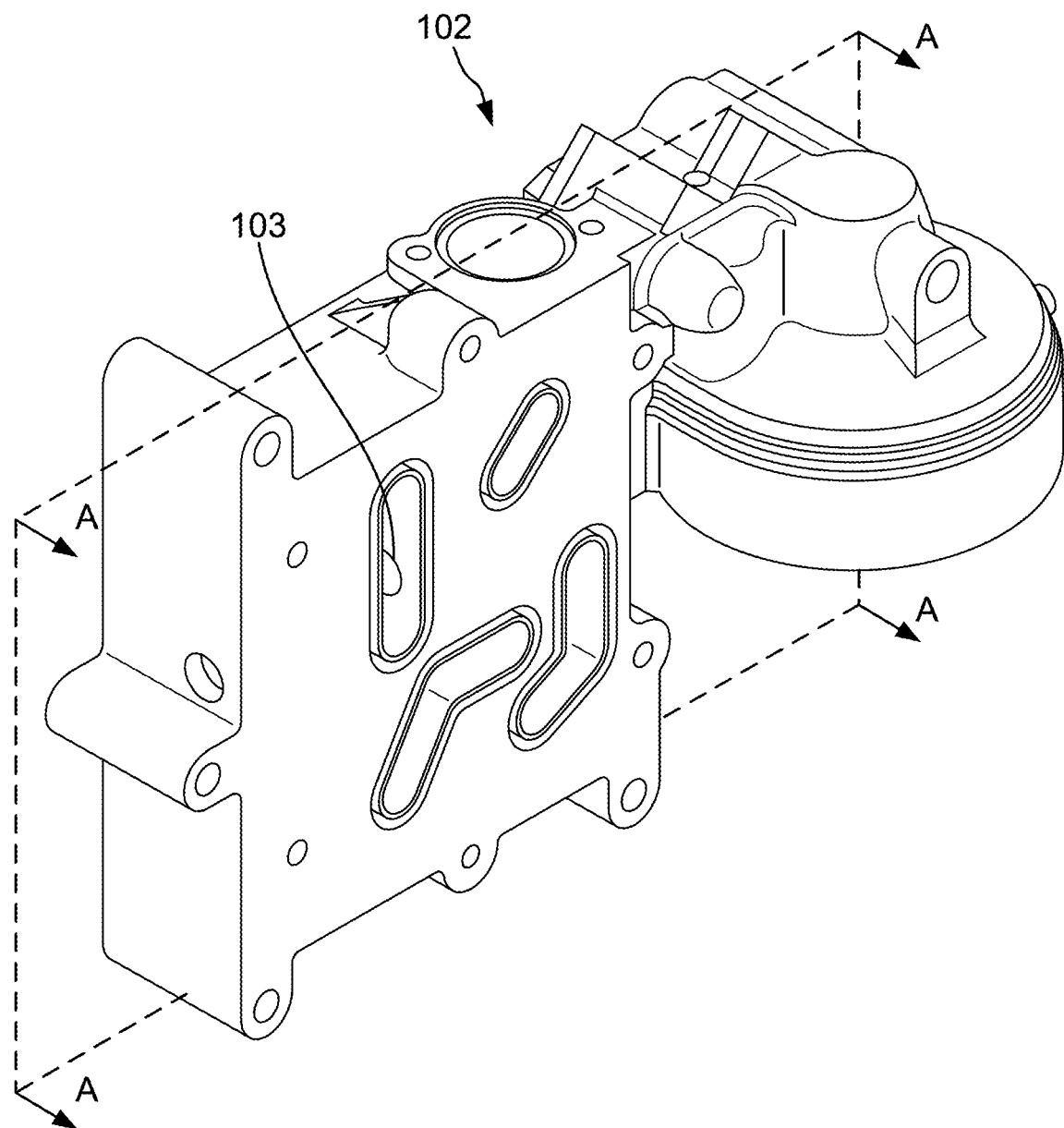
FIG. 4 is a front perspective view of a filter head for a filter assembly, according to an example embodiment.

As shown in FIG. 4, the filter head 102 includes a filter head first connector 103 (e.g., inlet aperture, inlet port, inlet connector, etc.). The filter head first connector 103 is configured to be coupled to a conduit (e.g., lubricant conduit, fluid line, pipe, hose, etc.) and to receive a fluid (e.g., lubricant, oil, fuel, additive, reductant, urea, air, etc.) from the conduit when the conduit is coupled to the filter head first connector 103. For example, the filter head first connector 103 may be threaded. In this example, the conduit may be threaded into the filter head first connector 103.

As utilized herein, it is understood that the "fluid" may include, or entirely consist of, air. In other words, the fluid may be a fluid-air mixture (e.g., a stream of air with fluid droplets interspersed therein, a stream of fluid with bubbles of air therein, etc.), may not include any air, or may entirely consist of air (without any fluid).

In various embodiments, the filter head first connector 103 is configured to be coupled to a conduit that is coupled to a cooler (e.g., lubricant cooler, oil cooler, etc.). The cooler is configured to cool the lubricant prior to the lubricant being provided to the conduit and subsequently provided to the filter head first connector 103.

Figure 5:
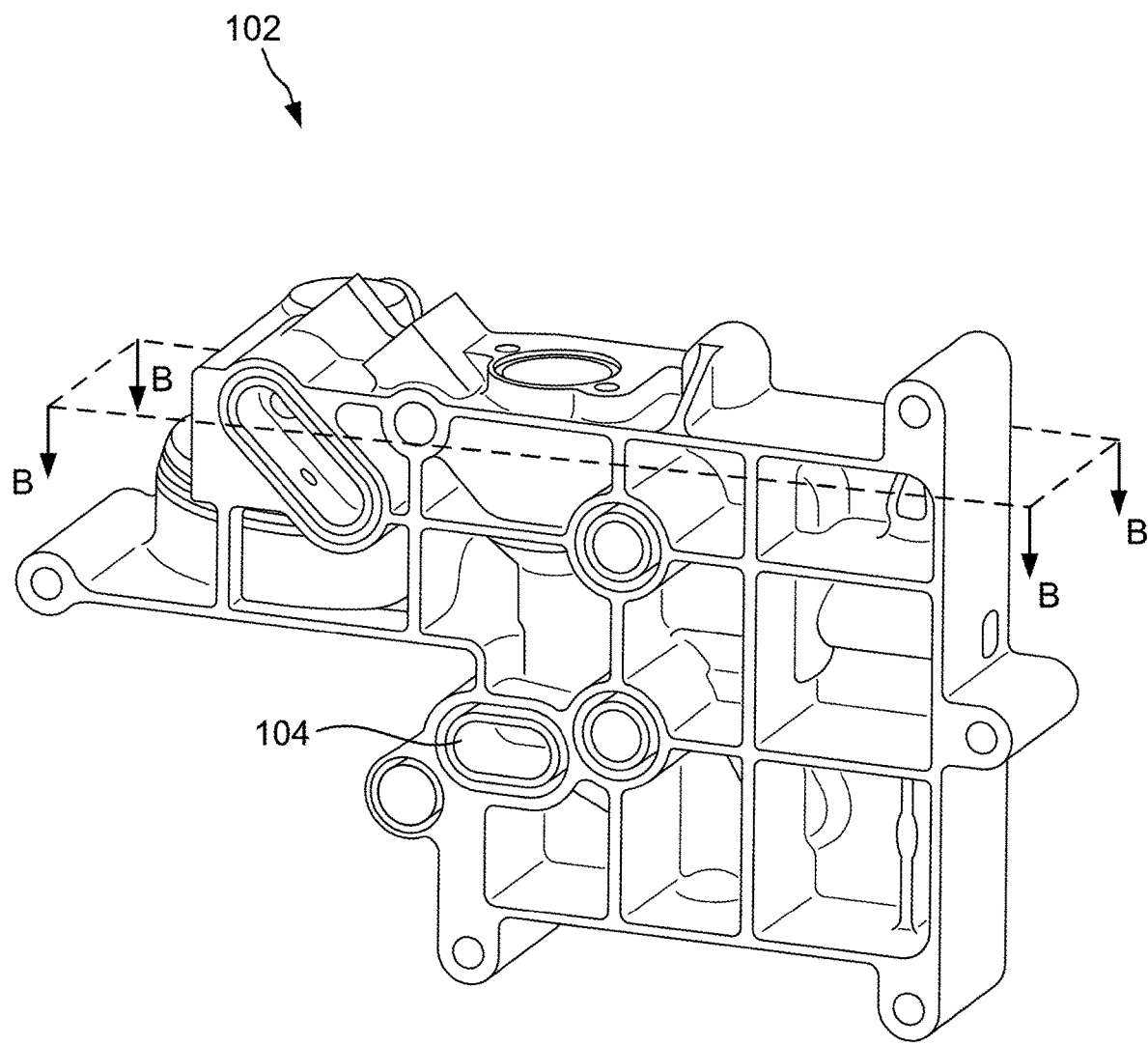
FIG. 5 is a rear perspective view of the filter head shown in FIG. 4.

As shown in FIG. 5, the filter head 102 includes a filter head second connector 104. The filter head second connector 104 is configured to be coupled to a conduit and to receive a fluid from the conduit when the conduit is coupled to the filter head second connector 104. For example, the filter head second connector 104 may be threaded. In this example, the conduit may be threaded into the filter head second connector 104.

In various embodiments, the filter head second connector 104 is configured to be coupled to a conduit that is coupled to an engine block of an internal combustion engine. The engine block utilizes the lubricant (e.g., to lubricate pistons of the internal combustion engine, etc.) and provide the lubricant to the conduit, which subsequently provides the lubricant to the filter head second connector 104. In some embodiments, the lubricant provided to the filter head second connector 104 is provided from a pressure release valve or overflow conduit.

The filter head 102 also includes a filter head coupling surface 108 (e.g., threaded surface, etc.). In various embodiments, the filter head coupling surface 108 is partially circular or completely circular. The filter head coupling surface 108 defines a filter head opening 110 (e.g., void, cavity, etc.). In various embodiments, the filter head opening 110 is at least partially cylindrical.

Figure 6:
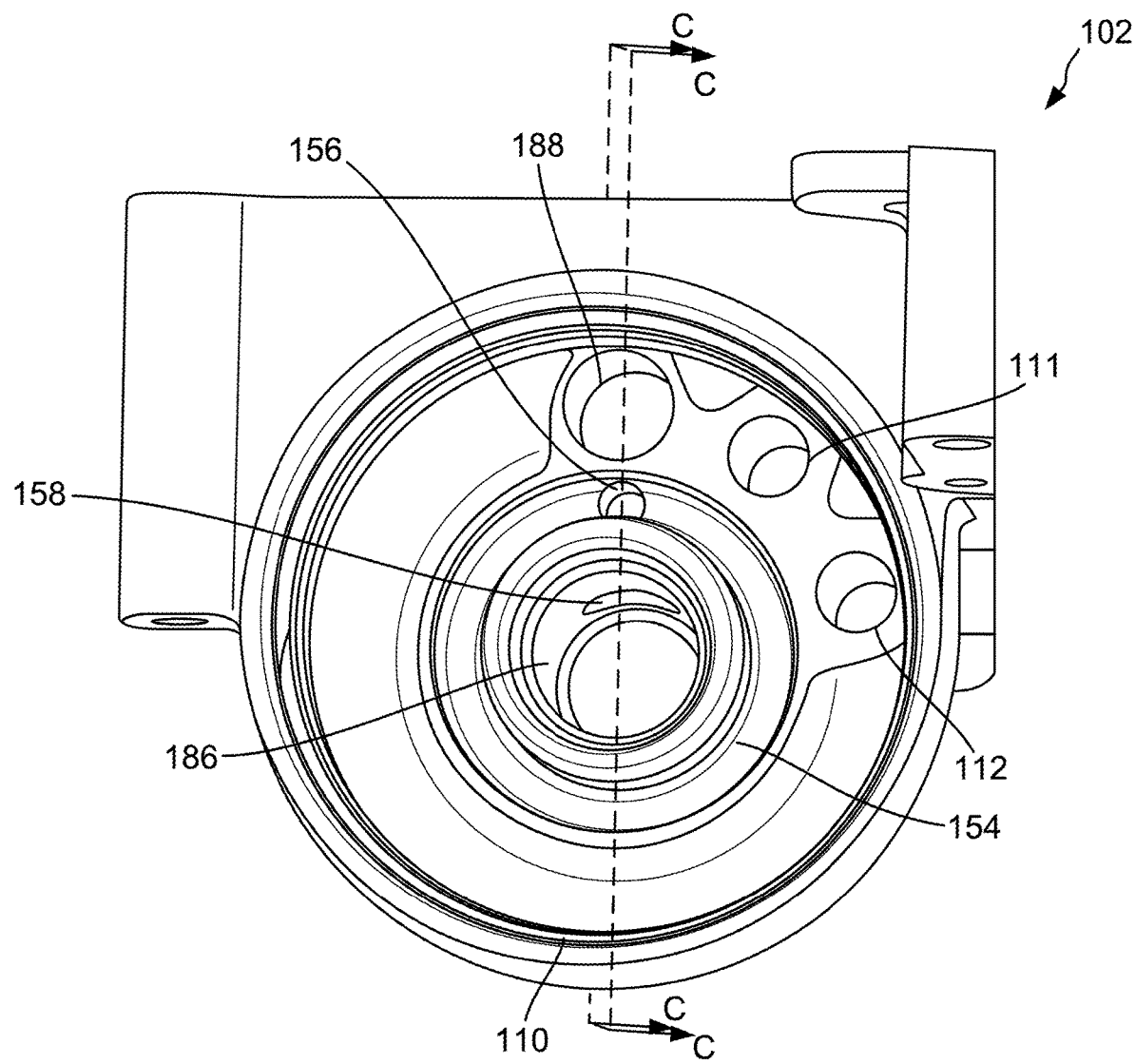
FIG. 6 is a bottom view of a portion of the filter head shown in FIG. 4.
Figure 7:
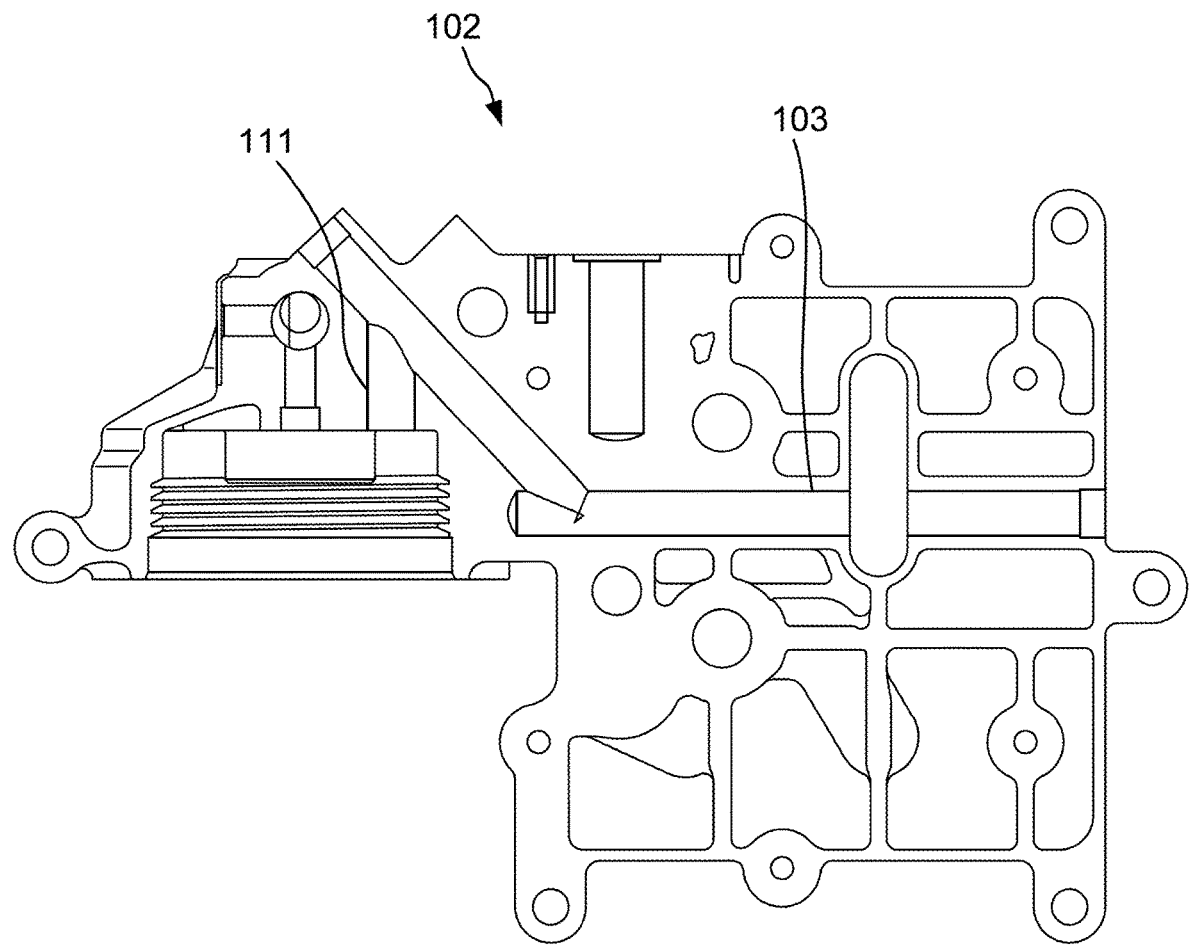
FIG. 7 is a cross-sectional view of a portion of the filter head shown in FIG. 4 taken along plane A-A.
Figure 8:
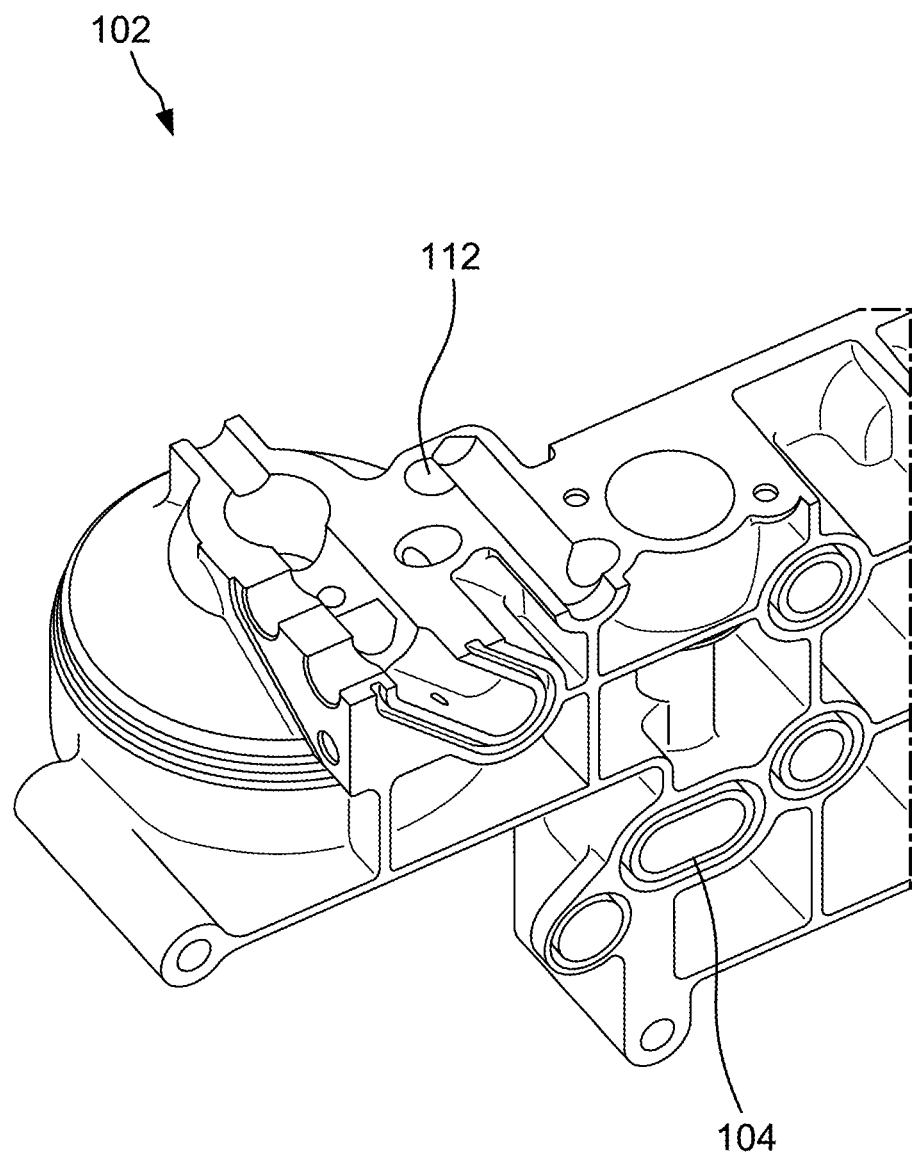
FIG. 8 is a cross-sectional view of a portion of the filter head shown in FIG. 5 taken along plane B-B.
Figure 9:
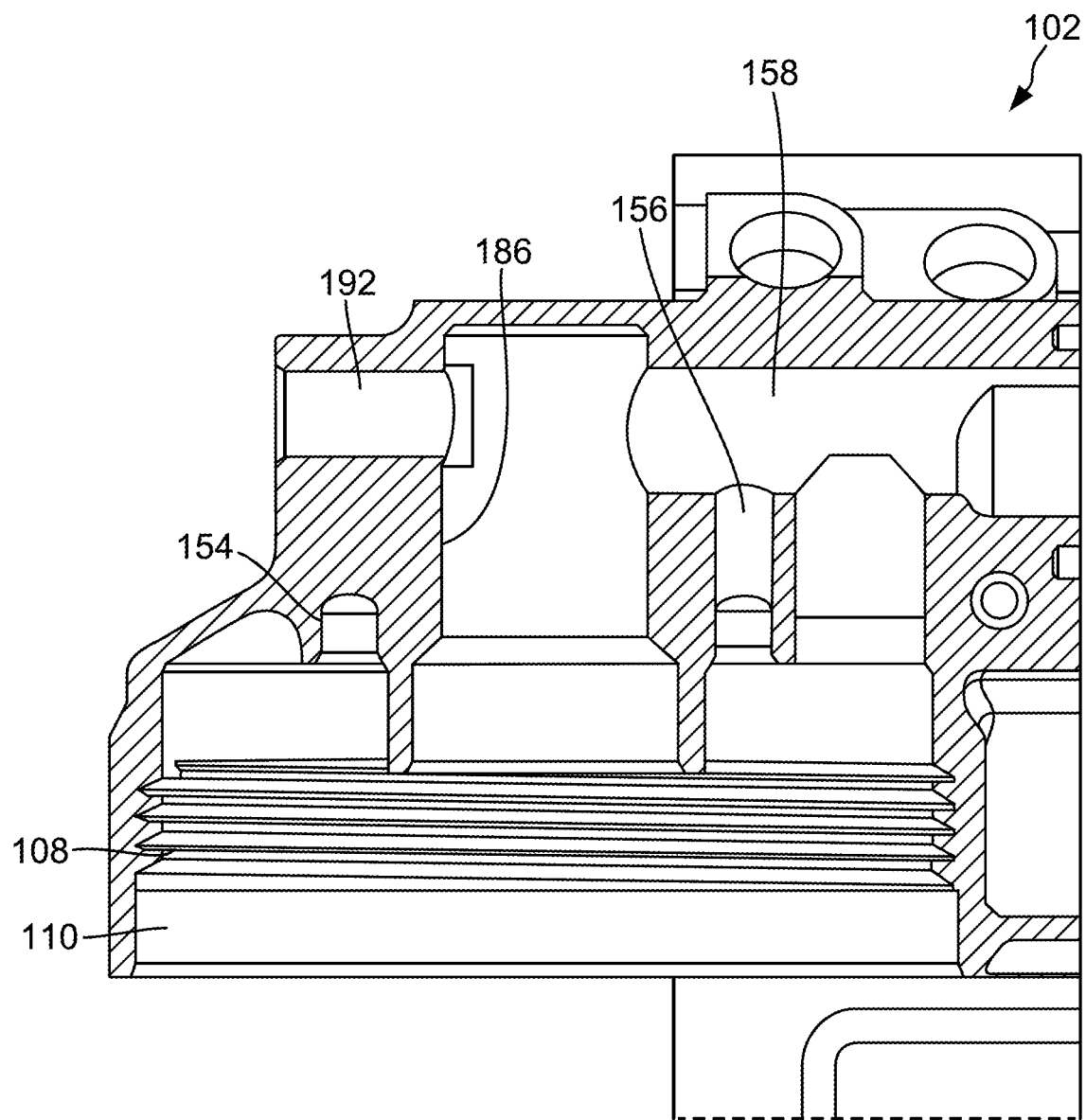
FIG. 9 is a cross-sectional view of a portion of the filter head shown in Figure C taken along plane C-C.

As shown in FIG. 6, the filter head 102 includes a filter head first inlet 111 (e.g., bore, inlet passage, etc.). The filter head first inlet 111 is fluidly coupled to the filter head first connector 103 and the filter head first inlet 111 is configured to receive the fluid from the filter head first connector 103. The filter head first inlet 111 is contiguous with the filter head opening 110 and the filter head opening 110 is configured to receive the fluid from the filter head first inlet 111.

Additionally, the filter head 102 includes a filter head second inlet 112 (e.g., bore, inlet passage, etc.). The filter head second inlet 112 is fluidly coupled to the filter head second connector 104 and the filter head second inlet 112 is configured to receive the fluid from the filter head second connector 104. The filter head second inlet 112 is contiguous with the filter head opening 110 and the filter head opening 110 is configured to receive the fluid from the filter head second inlet 112.

The filter assembly 100 also includes a filter cartridge 114 (e.g., filter assembly, replaceable cartridge, oil filter, lubricant filter, fuel filter, reductant filter, etc.). The filter cartridge 114 is configured to be received within the filter head opening 110. Additionally, the filter cartridge 114 is configured to be coupled to, and decoupled from, the filter head 102 via an interaction between the filter head coupling surface 108 and a filter cartridge coupling surface 116 (e.g., threaded surface, etc.) of a filter cartridge shell 118 (e.g., housing, body, casing, etc.) of the filter cartridge 114. In this way, the filter cartridge 114 is replaceable with another filter cartridge 114. As is explained in more detail herein, the filter head 102 is configured to provide a fluid (e.g., a dirty fluid, etc.) to the filter cartridge 114 (e.g., via the filter head first inlet 111, via the filter head second inlet 112) and to receive the fluid (e.g., as a clean fluid, etc.) from the filter cartridge 114 (e.g., after the fluid has flowed through the filter cartridge 114, etc.).

The filter cartridge coupling surface 116 defines a filter cartridge opening 120 (e.g., void, cavity, etc.). In various embodiments, the filter cartridge opening 120 is at least partially cylindrical. When the filter cartridge coupling surface 116 is coupled to the filter head coupling surface 108, the filter cartridge opening 120 is contiguous with the filter head opening 110. Fluid that is received by the filter cartridge opening 120 (e.g., via the filter head opening 110 and the filter head first inlet 111, via the filter head opening 110 and the filter head second inlet 112, etc.) is collected within the filter cartridge shell 118.

The filter cartridge shell 118 also includes a filter cartridge drain aperture 122 (e.g., hole, etc.). The filter cartridge drain aperture 122 is located at or near a lowermost point of the filter cartridge opening 120 when the filter cartridge 114 is coupled to the filter head 102. As a result, fluid within the filter cartridge opening 120 may drain entirely, or almost entirely, via the filter cartridge drain aperture 122. In this sense, "lowermost point" is relative to a vertical direction that is the same as, or parallel to, a center axis 123 (e.g., central axis, etc.) of the filter cartridge shell 118, where the filter head 102 is defined as being above the filter cartridge shell 118. In various embodiments, the filter cartridge drain aperture 122 is located at a first end (e.g., lower end, etc.) of the filter cartridge shell 118 and the filter cartridge coupling surface 116 is located at a second end (e.g., upper end, etc.) of the filter cartridge shell 118 opposite the first end of the filter cartridge shell 118.

The filter cartridge 114 also includes a drain plug 124 (e.g., stop, threaded member, etc.). The drain plug 124 is configured to be coupled to the filter cartridge shell 118 via the filter cartridge drain aperture 122. For example, the drain plug 124 may be threaded into the filter cartridge drain aperture 122 such that the drain plug 124 is threadably coupled to the filter cartridge shell 118. The drain plug 124 may be configured such that when the filter cartridge 114 is coupled to the filter head 102 and the fluid is contained within the filter cartridge shell 118 (e.g., within the filter cartridge opening 120, etc.), the fluid may be drained (e.g., removed, emptied, etc.) from the filter cartridge shell 118 by removing (e.g., unthreading, etc.) the drain plug 124 from the filter cartridge drain aperture 122. After the fluid has been drained from the filter cartridge shell 118, the filter cartridge 114 may then be decoupled from the filter head 102 without spilling fluid from within the filter cartridge shell 118. In this way, the drain plug 124 and the filter cartridge drain aperture 122 cooperate to facilitate cleaner removal of the filter cartridge shell 118.

The filter cartridge 114 also includes a filter element 126 (e.g., filter, etc.). The filter element 126 is configured to be received within the filter cartridge opening 120 and the filter head opening 110 when the filter cartridge 114 is coupled to the filter head 102. As is explained in more detail herein, the filter element 126 is configured to receive the fluid (e.g., from between the filter element 126 and the filter cartridge shell 118, from between the filter element 126 and the filter head 102, etc.), the filter (e.g., clean, strain, etc.) the fluid, and then to provide the fluid back into the filter head 102 (e.g., for distribution to the fluid system, etc.).

The filter element 126 includes a first endcap 128 (e.g., top endcap, endplate, etc.). The first endcap 128 includes a first endcap flange 130 (e.g., annular surface, etc.). In various embodiments, the first endcap flange 130 is at least partially annular (e.g., extends along a circular arc, etc.). As is explained in more detail herein, the first endcap 128 is in confronting relation with the filter head 102 when the filter cartridge 114 is coupled to the filter head 102 and the filter element 126 is received within the filter cartridge opening 120 and the filter head opening 110. The first endcap 128 may be constructed from (e.g., formed of, etc.) a rigid (e.g., resilient, etc.) material. For example, the first endcap 128 may be constructed from metal (e.g., aluminum, etc.), plastic (e.g., high temperature plastic, thermoset plastic, etc.), or another similar material.

The first endcap 128 also includes a first endcap inner wall 132 (e.g., annular wall, etc.). The first endcap inner wall 132 is contiguous with the first endcap flange 130 and extends (e.g., projects, protrudes, etc.) from the first endcap flange 130. In some embodiments, the first endcap inner wall 132 extends orthogonally from the first endcap flange 130. The first endcap inner wall 132 defines a first endcap inner opening 133 (e.g., void, cavity, etc.). In various embodiments, the first endcap inner opening 133 is at least partially cylindrical.

The first endcap 128 also includes a first endcap outer wall 134 (e.g., annular wall, etc.). The first endcap outer wall 134 is contiguous with the first endcap flange 130 and extends from the first endcap flange 130. The first endcap outer wall 134 is separated from the first endcap inner wall 132 by the first endcap flange 130. In various embodiments, the first endcap outer wall 134 extends orthogonally from the first endcap flange 130. The first endcap outer wall 134 and the first endcap inner wall 132 collectively define a first endcap aperture 135 (e.g., void, cavity, etc.). In various embodiments, the first endcap aperture 135 is at least partially annular.

The first endcap 128 also includes a first endcap lip 136 (e.g., annular flange, wall, etc.). The first endcap lip 136 is contiguous with the first endcap outer wall 134 and extends from the first endcap outer wall 134. The first endcap lip 136 is separated from the first endcap flange 130 by the first endcap outer wall 134. In various embodiments, the first endcap lip 136 extends orthogonally from the first endcap outer wall 134.

The first endcap 128 also includes an inner seal member wall 138 (e.g., annular wall, etc.). The inner seal member wall 138 is contiguous with the first endcap flange 130 and extends from the first endcap flange 130. In various embodiments, the inner seal member wall 138 extends from the first endcap flange 130 in a first direction that is substantially opposite (e.g., separated by 170° from, separated by 180° from, separated 190° from, etc.) a second direction along which the first endcap inner wall 132 extends and/or the first endcap outer wall 134 extends.

The first endcap 128 also includes an outer seal member wall 140 (e.g., annular wall, etc.). The outer seal member wall 140 is contiguous with the first endcap flange 130 and extends from the first endcap flange 130. In various embodiments, the outer seal member wall 140 extends from the first endcap flange 130 in a first direction that is substantially opposite (e.g., separated by 170° from, separated by 180° from, separated 190° from, etc.) a second direction along which the first endcap inner wall 132 extends and/or the first endcap outer wall 134 extends. The inner seal member wall 138 and the outer seal member wall 140 collectively define a seal member aperture 142 (e.g., void, cavity, etc.). In various embodiments, the seal member aperture 142 is at least partially annular.

As shown in FIGS. 1-3, the filter element 126 also includes a seal member 144 (e.g., gasket, ring, etc.). As is explained in more detail herein, the seal member 144 is configured to mitigate passage of 'dirty' fluid (e.g., fluid that has not yet been passed through a filter media, etc.) to an outlet of the filter head 102. In various embodiments, the seal member 144 is at least partially annular.

The seal member 144 includes a seal member base 146 (e.g., post, peg, etc.). The seal member base 146 is configured to be inserted into, and received within, the seal member aperture 142. When the seal member base 146 is received within the seal member aperture 142, the seal member 144 is coupled to the first endcap 128. The seal member 144 may be constructed from a compressible (e.g., deformable, elastic, etc.) material. For example, the seal member 144 may be constructed from a rubber, a polymer, nylon, a nitrile rubber, a gasket material, an O-ring material, or Viton™. Where the seal member 144 is constructed from a compressible material, the seal member base 146 may be press fit into the seal member aperture 142. In some embodiments, an adhesive (e.g., located within the seal member aperture 142, etc.) is utilized to couple the seal member base 146 to the inner seal member wall 138 and/or the outer seal member wall 140.

The seal member 144 also includes a seal member head 148 (e.g., flange, rib, etc.). The seal member head 148 is integrally formed with the seal member base 146 and is at least partially located between the first endcap 128 (e.g., the inner seal member wall 138, the outer seal member wall 140, etc.) and the filter head 102.

As shown in FIG. 2, the filter head 102 includes a filter head outer wall 150 (e.g., annular wall, etc.). In various embodiments, the filter head outer wall 150 is at least partially annular. The filter head 102 also includes a filter head inner wall 152 (e.g., annular wall, etc.). In various embodiments, the filter head inner wall 152 is at least partially annular.

The filter head outer wall 150 and the filter head inner wall 152 collectively define a filter head channel 154 (e.g., groove, void, cavity, recess, etc.). In various embodiments, the filter head channel 154 is at least partially annular. The filter head channel 154 is contiguous with the filter head opening 110. In various embodiments, the filter head channel 154 is at least partially annular.

The filter head channel 154 is configured to receive the seal member head 148 when the filter cartridge 114 is coupled to the filter head 102 and the filter element 126 is received within the filter cartridge opening 120 and the filter head opening 110. When the filter head channel 154 receives the seal member head 148, the seal member head 148 contacts both the filter head outer wall 150 and the filter head inner wall 152. In this way, the seal member 144 forms a first seal, between the seal member head 148 and the filter head outer wall 150, and a second seal, between the seal member head 148 and the filter head inner wall 152. In contrast to forming two such seals, other filter systems are only capable of forming one seal, which may be incapable of desirably mitigating passage of fluid. By forming two such seals, passage of 'dirty' fluid (e.g., fluid that has not yet been passed through a filter media, etc.) to an outlet of the filter head 102 is mitigated. Additionally, by forming two such seals, impacts due to swell and/or compression of the seal member 144 on the ability of the seal member 144 to mitigate passage of fluid are minimized.

The filter head 102 also includes a vent 156 (e.g., passage, bore, etc.). As a result, the vent 156 extends above the filter cartridge 114. The vent 156 is fluidly coupled to the filter head channel 154 and is configured to receive fluid (e.g., air, etc.) that is located between the seal member head 148 and the filter head channel 154, such that this fluid can be evacuated and the seals provided by the seal member 144 can be maintained. Due to the vent 156 extending above the filter cartridge 114, the fluid must, in some embodiments, flow against a force of gravity to traverse the vent 156. The force of gravity may assist in sealing the vent 156 and mitigating undesirable flow of fluid through the vent 156.

In some embodiments, the seal member head 148 includes a groove that forms a passage between the seal member head 148 and the filter head outer wall 150 or between the seal member 144 and the filter head inner wall 152. The seal member 144 is positioned such that this groove is aligned with the vent 156. This groove may, for example, be machined into or molded in the seal member head 148. This groove functions to aide in evaluation of the fluid that is located between the seal member head 148 and the filter head channel 154. When a pressure of the fluid that is located upstream of the seal member head 148 (e.g., within the filter head opening 110, within the filter cartridge opening 120, within the filter cartridge 114, etc.) exceeds a threshold (e.g., a pressure threshold, etc.), the seal between the seal member head 148 and the filter head channel 154 is broken and fluid may flow between the seal member head 148 and the filter head channel 154 (e.g., into the vent 156, etc.).

As shown in FIG. 2, the filter head 102 also includes a filter head third connector 158 (e.g., outlet passage, outlet port, outlet connector, etc.). The filter head third connector 158 is fluidly coupled to the vent 156 and is configured to receive the fluid from the vent 156. The filter head third connector 158 is configured to be fluidly coupled to a conduit (e.g., lubricant conduit, fluid line, pipe, hose, etc.) and to provide the fluid to the conduit when the conduit is coupled to the filter head third connector 158. In this way, the filter head 102 provides the fluid to downstream components of the fluid system utilized with the filter assembly 100.

The filter element 126 also includes a central tube 160 (e.g., support, column, etc.). The central tube 160 includes a plurality of central tube holes 162 (e.g., perforations, etc.). Each of the central tube holes 162 facilitates passage of the fluid through the central tube 160. The central tube 160 also defines a central tube opening 164 (e.g., void, cavity, etc.). In various embodiments, the central tube opening 164 is at least partially cylindrical. The central tube 160 may be constructed from a rigid material. For example, the central tube 160 may be constructed from metal, plastic, or another similar material.

The first endcap inner wall 132 is inserted into the central tube opening 164 such that the central tube 160 is coupled to the first endcap inner wall 132. For example, the first endcap inner wall 132 may be press fit into the central tube opening 164. In some embodiments, the first endcap inner wall 132 is coupled to the central tube 160. For example, an adhesive (e.g., silicon, glue, bonding material, etc.) may be utilized to couple the first endcap inner wall 132 to the central tube 160.

The filter element 126 also includes a second endcap 166 (e.g., bottom endcap, endplate, etc.). The second endcap 166 includes a second endcap flange 168 (e.g., annular surface, etc.). In various embodiments, the second endcap flange 168 is at least partially annular (e.g., extends along a circular arc, etc.). The second endcap 166 may be constructed from a rigid material. For example, the second endcap 166 may be constructed from metal, plastic, or another similar material.

The second endcap 166 also includes a second endcap inner wall 170 (e.g., annular wall, etc.). The second endcap inner wall 170 is contiguous with the second endcap flange 168 and extends (e.g., projects, protrudes, etc.) from the second endcap flange 168. In some embodiments, the second endcap inner wall 170 extends orthogonally from the second endcap flange 168.

The second endcap inner wall 170 is inserted into the central tube opening 164 such that the central tube 160 is coupled to the second endcap inner wall 170. For example, the second endcap inner wall 170 may be press fit into the central tube opening 164. In some embodiments, the second endcap inner wall 170 is coupled to the central tube 160

(e.g., using an adhesive, etc.). In this way, the second endcap 166 is coupled to the central tube 160.

The second endcap 166 also includes a second endcap outer wall 172 (e.g., annular wall, etc.). The second endcap outer wall 172 is contiguous with the second endcap flange 168 and extends from the second endcap flange 168. The second endcap outer wall 172 is separated from the second endcap inner wall 170 by the second endcap flange 168. In various embodiments, the second endcap outer wall 172 extends orthogonally from the second endcap flange 168. The second endcap outer wall 172 and the second endcap inner wall 170 collectively define a second endcap aperture 174 (e.g., void, cavity, etc.). In various embodiments, the second endcap aperture 174 is at least partially annular.

The filter element 126 also includes filter media 176 (e.g., a pleated filter media, etc.). The filter media 176 is configured to facilitate passage of the fluid therethrough such that particulates (e.g., hydrocarbons, dirt, grime, etc.) are collected in the filter media 176. The filter media 176 is received within the first endcap aperture 135 and the second endcap aperture 174.

The filter media 176 includes an external surface 178 (e.g., outer surface, etc.). The external surface 178 extends between the first endcap 128 and the second endcap 166. The fluid enters the filter media 176 via the external surface 178 (e.g., from between the filter media 176 and the filter cartridge shell 118, etc.). The external surface 178 is in confronting relation with the first endcap outer wall 134 and the second endcap outer wall 172. In some embodiments, the external surface 178 is coupled to the first endcap outer wall 134 and/or the second endcap outer wall 172 (e.g., using an adhesive, etc.).

The filter media 176 also includes an internal surface 180 (e.g., outer surface, etc.). The internal surface 180 extends between the first endcap 128 and the second endcap 166. The fluid exits the filter media 176 via the internal surface 180. The internal surface 180 is in confronting relation with the first endcap inner wall 132 and the second endcap inner wall 170. In some embodiments, the internal surface 180 is coupled to the first endcap inner wall 132 and/or the second endcap inner wall 170 (e.g., using an adhesive, etc.). The internal surface 180 is in confronting relation with the central tube 160. In some embodiments, the internal surface 180 is coupled to the central tube 160 (e.g., using an adhesive, etc.). After exiting the internal surface 180, the fluid flows into the central tube opening 164 via the central tube holes 162.

The filter media 176 includes a first side 182 (e.g., top side, etc.). The first side 182 is contiguous with the external surface 178 and the internal surface 180. The first side 182 is in confronting relation with the first endcap flange 130. In some embodiments, the first side 182 is coupled to the first endcap flange 130 (e.g., using an adhesive, etc.).

The filter media 176 includes a second side 184 (e.g., bottom side, etc.). The second side 184 is contiguous with the external surface 178 and the internal surface 180. The second side 184 is in confronting relation with the second endcap flange 168. In some embodiments, the second side 184 is coupled to the second endcap flange 168 (e.g., using an adhesive, etc.).

The filter head 102 also includes a filter head outlet 186 (e.g., outlet passage, etc.). When the filter cartridge 114 is coupled to the filter head 102 and the filter element 126 is received within the filter cartridge opening 120 and the filter head opening 110, the filter head outlet 186 is fluidly coupled to the central tube opening 164 and is configured to receive the fluid from the central tube opening 164. In other words, the fluid enters the filter media 176 by flowing through the external surface 178, flow through the filter media 176, exit the filter media 176 by flowing out of the internal surface 180, flow into the central tube opening 164 via the central tube holes 162, and flow out of the central tube opening 164 and into the filter head outlet 186.

The filter head third connector 158 is fluidly coupled to the filter head outlet 186 and is configured to receive the fluid from the filter head outlet 186. As discussed above, the vent 156 facilitates evacuation of fluid that is located between the seal member head 148 and the filter head channel 154, and the vent 156 provides this fluid to the filter head third connector 158.

In various embodiments, the filter head 102 also includes a bypass channel 188 (e.g., outlet passage, etc.). The bypass channel 188 is fluidly coupled to the filter head opening 110 and is configured to receive the fluid from the filter head opening 110. Additionally, the bypass channel 188 is fluidly coupled to the filter head third connector 158 and is configured to provide the fluid to the filter head third connector 158. In these embodiments, the filter assembly 100 further includes a bypass valve 190 (e.g., pressure relief valve, etc.). The bypass valve 190 is disposed within the bypass channel 188 and is configured to control the flow of the fluid through the bypass channel 188 (e.g., from the filter head opening 110 to the filter head third connector 158, etc.). The bypass valve 190 is defined by a threshold pressure. When the pressure of the fluid within the filter head opening 110 exceeds the threshold pressure, the bypass valve 190 opens and the bypass valve 190 facilitates flow of the fluid from the filter head opening 110 to the filter head third connector 158. However, when the pressure of the fluid within the filter head opening 110 does not exceed the threshold pressure, the bypass valve 190 is closed and the bypass valve prohibits flow of the fluid from the filter head opening 110 to the filter head third connector 158. In this way, the bypass valve 190 protects against over-pressurization of the fluid within the filter cartridge 114.

In some embodiments, the filter head 102 also includes a sensor channel 192 (e.g., outlet passage, etc.). The sensor channel 192 is fluidly coupled to the filter head outlet 186 and is configured to receive the fluid from the filter head outlet 186. In these embodiments, the filter assembly 100 further includes a sensor 194 (e.g., flow sensor, temperature sensor, pressure sensor, etc.). The sensor 194 is coupled to the filter head 102 such that the sensor 194 is at least partially located in the sensor channel 192 and configured to obtain a signal associated with a parameter (e.g., flow rate, pressure, temperature, viscosity, etc.) of the fluid within the sensor channel 192.

Figure 10:
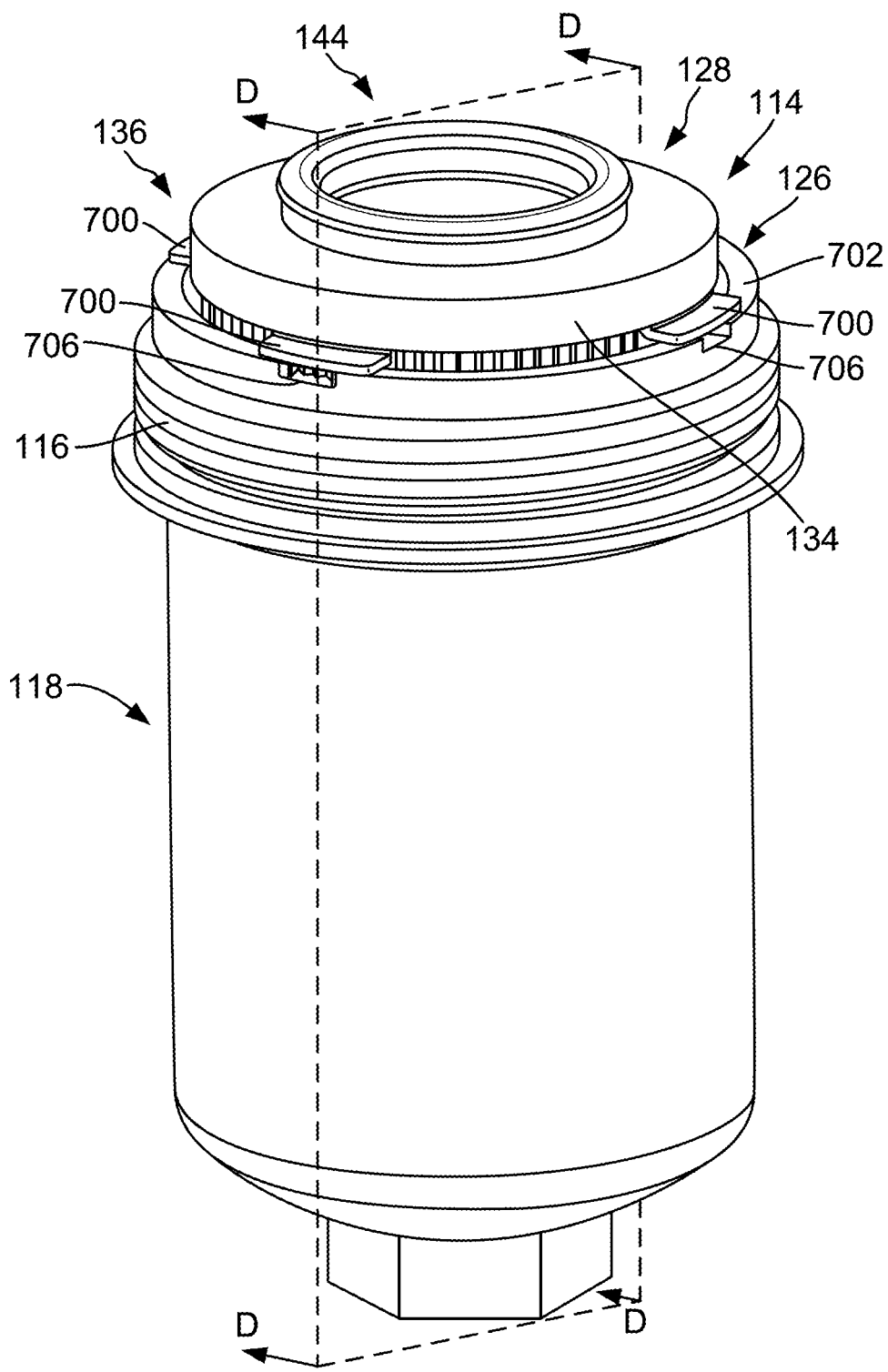
FIG. 10 is a perspective view of a filter cartridge and a filter element for a filter assembly, according to an example embodiment.
Figure 11:
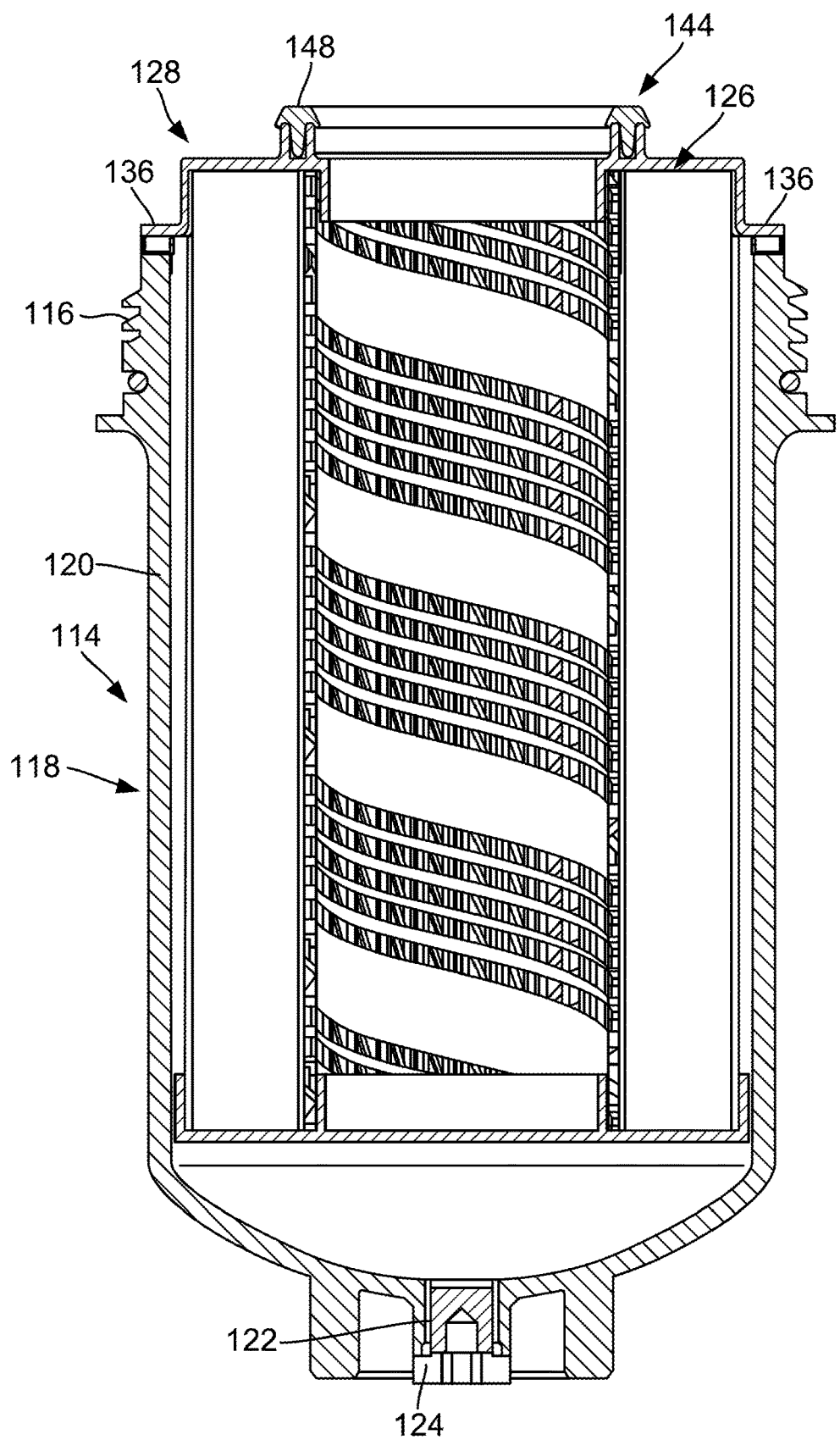
FIG. 11 is a cross-sectional view of the filter cartridge and the filter element shown in FIG. 10 taken along plane D-D.
Figure 12:
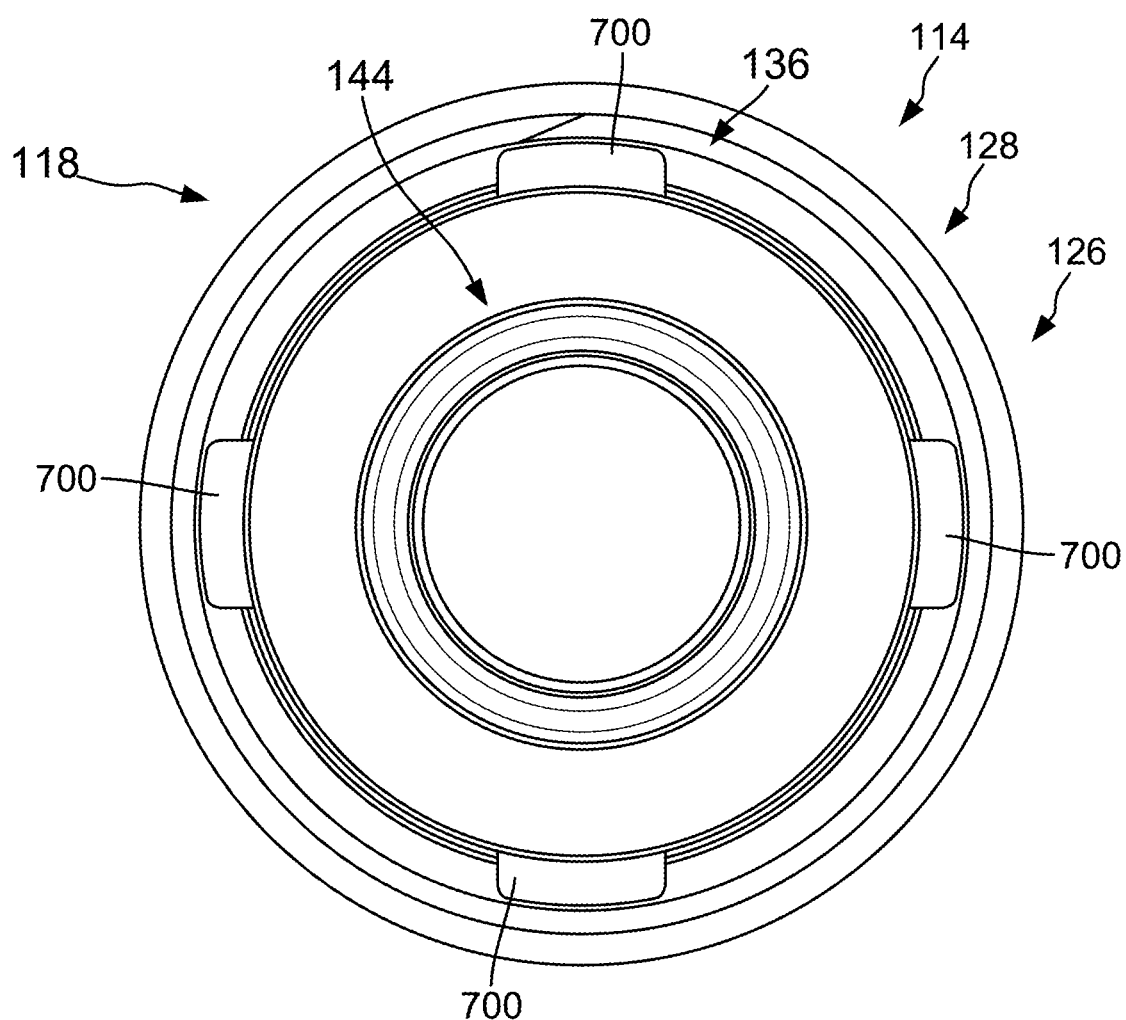
FIG. 12 is a top view of the filter cartridge and the filter element shown in FIG. 10.

As shown in FIG. 10, the first endcap lip 136 includes a plurality of lip sections 700 (e.g., segments, etc.), in some embodiments. For example, the first endcap lip 136 may include two, three, four, six, or other numbers of the lip sections 700. Each of the lip sections 700 is separated from another of the lip sections 700 by a gap (e.g., spacing, etc.) and by an angular separation. For example, where the first endcap lip 136 includes four lip sections 700, each of the lip sections 700 may be separated from another of the lip sections 700 by 90 degrees.

The lip sections 700 interface with and are supported on an edge 702 (e.g., top edge, etc.) of the filter cartridge shell 118. When the filter cartridge 114 is coupled to the filter head 102 and the filter element 126 is received within the filter cartridge opening 120 and the filter head opening 110, the lip sections 700 are located between the edge 702 and the filter head 102. As shown in FIG. 10, the lip sections 700 separate the first endcap outer wall 134 from the edge 702 such that the fluid can flow between the lip sections 700, the edge 702, and the first endcap outer wall 134.

Figure 14:
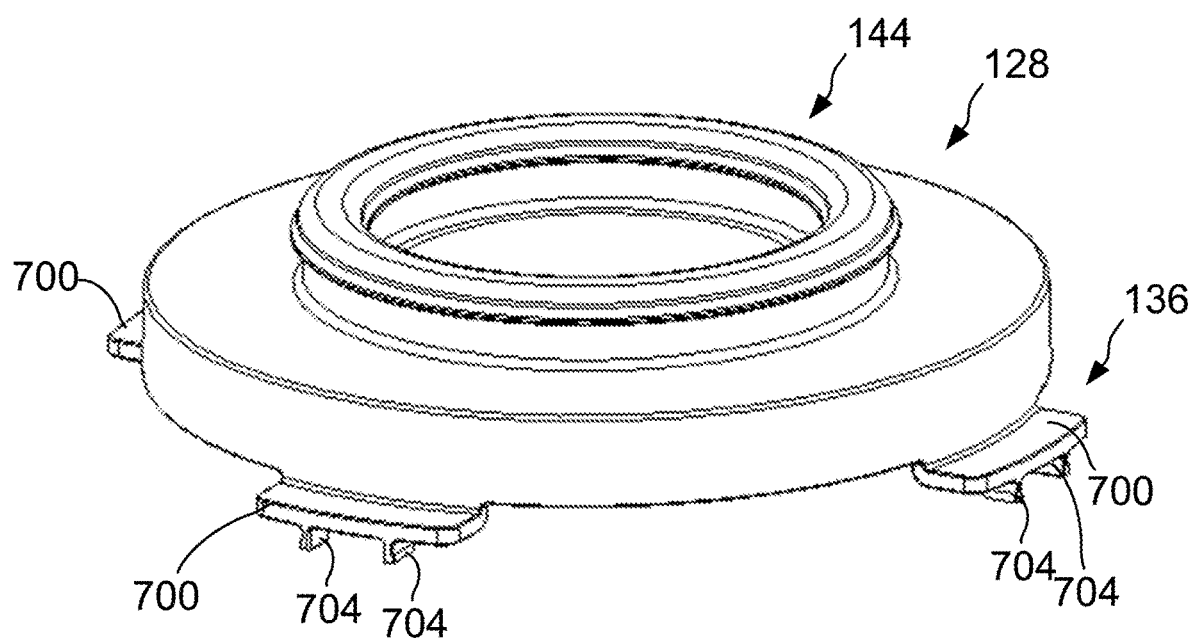
FIG. 14 is a top perspective view of a portion of a first endcap for a filter assembly, according to an example embodiment.
Figure 15:
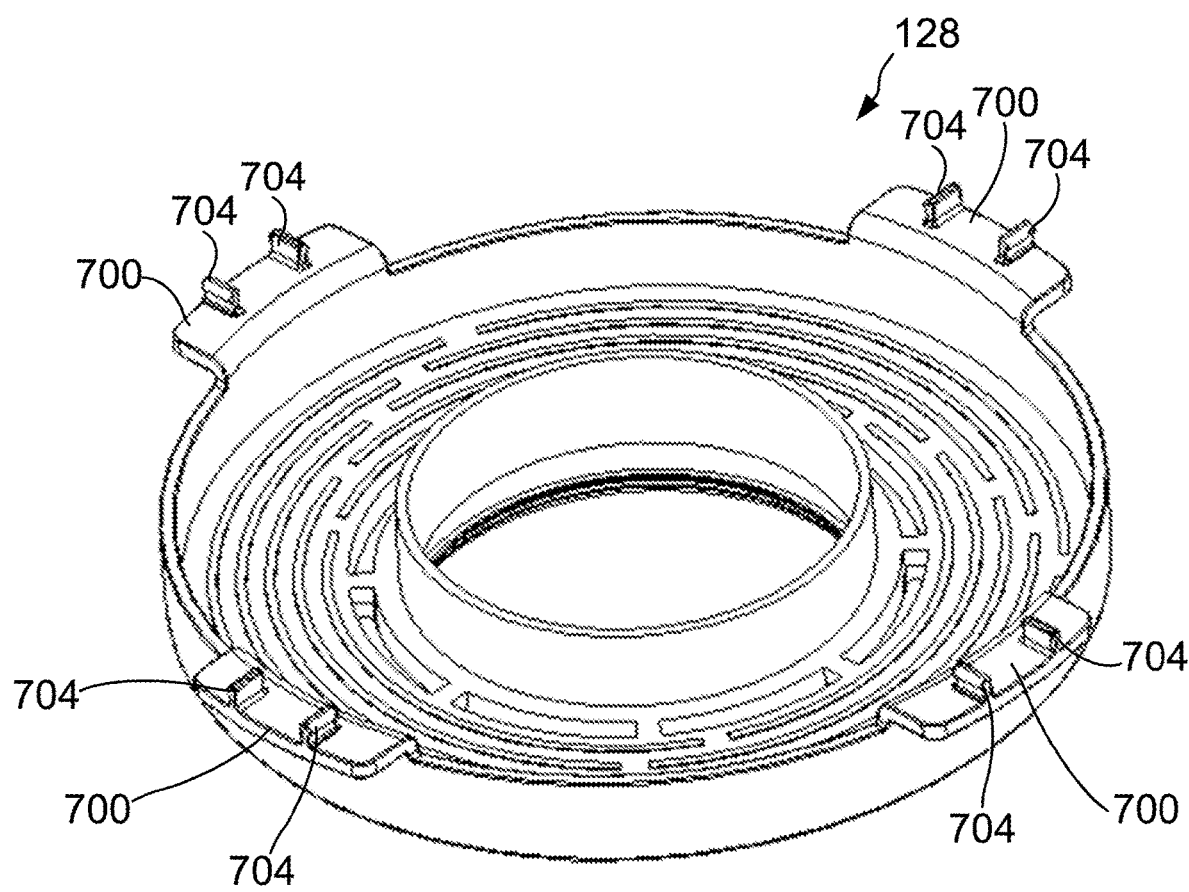
FIG. 15 is a bottom perspective view of a portion of a first endcap for a filter assembly, according to an example embodiment.
Figure 16:
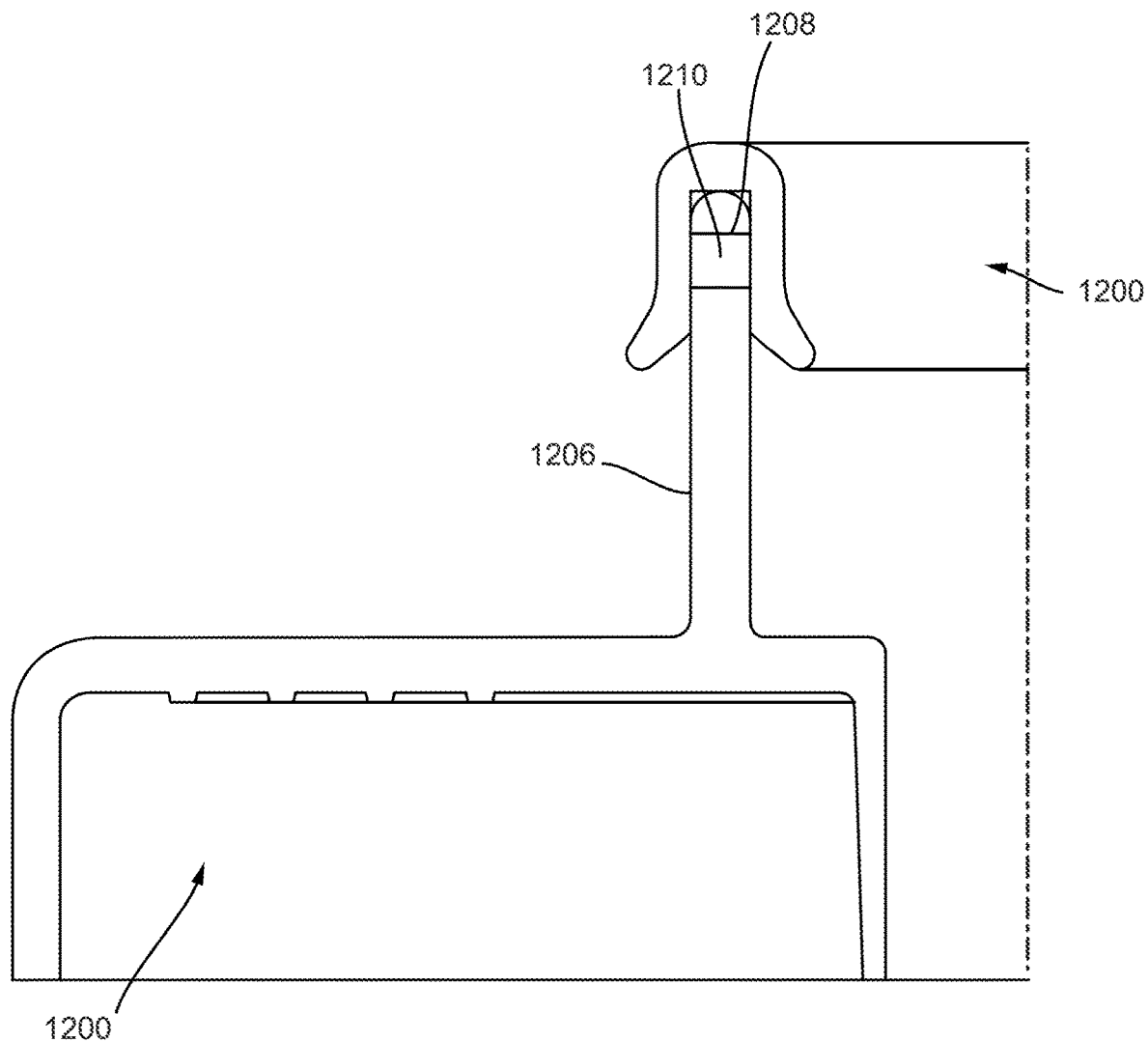
FIG. 16 is a detailed view of a portion of the first endcap shown in FIG. 15.
Figure 17:
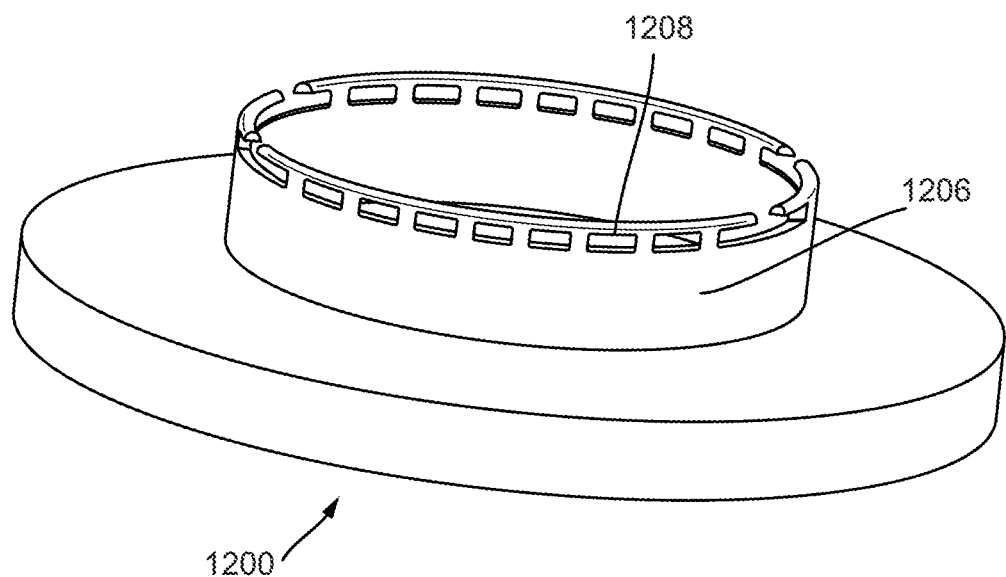
FIG. 17 is a perspective view of another portion of the first endcap shown in FIG. 15.

In various embodiments, one or more of the lip sections 700 include at least one lip projection 704 (e.g., rib, etc.). The lip projections 704 project from the lip section 700 away from the first endcap flange 130 (e.g., downwards, etc.). Each of the lip sections 700 may, for example, include two of the lip projections 704, as shown in FIG. 14. In other applications, the lip sections 700 may each include one lip projection 704, three lip projections 704, or other numbers of the lip projections 704. In some applications, only one of the lip sections 700 includes one or more lip projections 704, and the others of the lip sections 700 do not include any of the lip projections 704.

Figure 13:
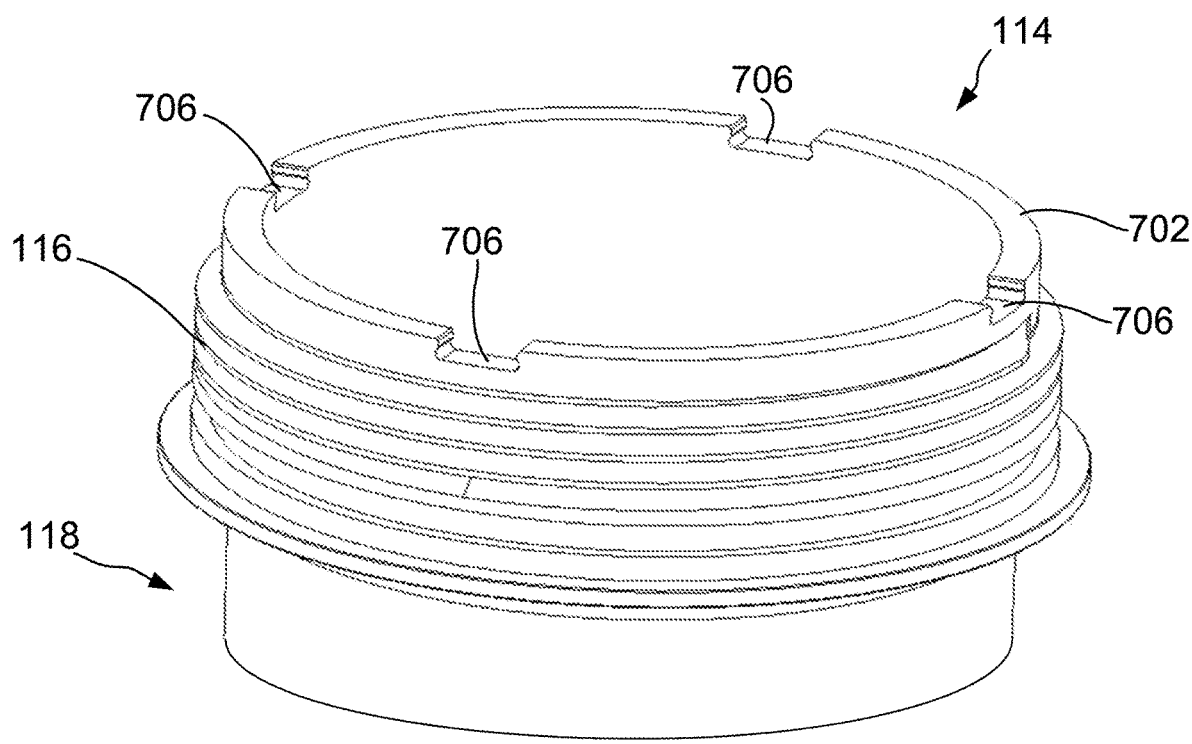
FIG. 13 is a top perspective view of a portion of a filter cartridge for a filter assembly, according to an example embodiment.

In these embodiments, the edge 702 includes one or more edge recesses 706 (e.g., depressions, slots, grooves, etc.), as shown in FIG. 13 where the filter element 126 and the first endcap 128 are removed. Each of the edge recesses 706 is configured to receive the at least one lip projection 704 projecting from one of the lip sections 700. When the at least one lip projection 704 is received within the edge recess 706, rotation of the filter cartridge shell 118 may be transferred to the first endcap 128 (e.g., via an interaction between the edge recesses 706 and the lip projections 704, etc.) and rotation of the first endcap 128 may be transferred to the filter cartridge shell 118. In this way, the filter cartridge shell 118 functions to rotationally retain the first endcap 128. Additionally, as the filter cartridge shell 118 is being coupled to the filter head 102, such as through threading of the filter cartridge coupling surface 116 onto the filter head coupling surface 108, the filter cartridge shell 118 is rotated, thereby causing rotation of the first endcap 128. Rotation of the first endcap 128 causes rotation of the seal member 144. Rotation of the seal member 144 within the filter head channel 154 may assist in seating of the seal member 144 within the filter head channel 154 and establishment of the seals by the seal member 144.

For example, the first endcap lip 136 may include two, three, four, six, or other numbers of the edge recesses 706. In some embodiments, the edge 702 includes the same number of the edge recesses 706 as the number of the lip sections 700. For example, if the first endcap lip 136 includes four of the lip sections 700, the edge 702 may include four of the edge recesses 706. Each of the edge recesses 706 is separated from another of the edge recesses 706 by a gap and by an angular separation. For example, where the first endcap lip 136 includes four edge recesses 706, each of the edge recesses 706 may be separated from another of the edge recesses 706 by 90 degrees. The spacing and angular separation of the edge recesses 706 may be the same as, or related to, the spacing and angular separation of the lip sections 700. For example, if the lip sections 700 are separated by 90 degrees, then the edge recesses 706 may also be separated by 90 degrees. In this way, the first endcap 128 and the filter cartridge shell 118 are configured such that each of the lip sections 700 can be aligned with one of the edge recesses 706.

In various applications, the filter cartridge 114 is periodically removed such that the filter element 126 can be cleaned and/or replaced with another filter element 126. To remove the filter cartridge 114, the fluid is first drained from the filter cartridge 114 by removing the drain plug 124 from the filter cartridge drain aperture 122. After the fluid has been drained from the filter cartridge 114, the drain plug 124 is reinstalled in the filter cartridge drain aperture 122. Then, the filter cartridge shell 118 is removed from the filter head 102. For example, the filter cartridge coupling surface 116 may be unthreaded from the filter head coupling surface 108. The filter cartridge 114 may then be lowered from the filter head 102. As the filter cartridge 114 is removed from the filter head opening 110, the seal member 144 is simultaneously removed from the filter head channel 154. As a result, the seal member 144 does not get stuck in the filter head 102 when the filter cartridge 114 has been removed from the filter head 102. In contrast, other filter systems may have gaskets that get stuck during removal (e.g., due to swell of the gasket, etc.).

III. Additional Seal Member Configurations

Figure 18:
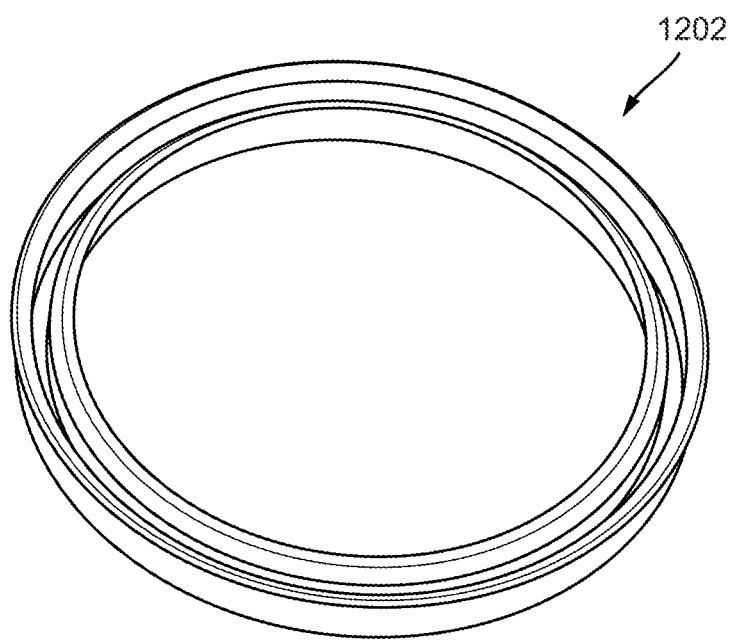
FIG. 18 is a perspective view of yet another portion of the first endcap shown in FIG. 15.
Figure 19:
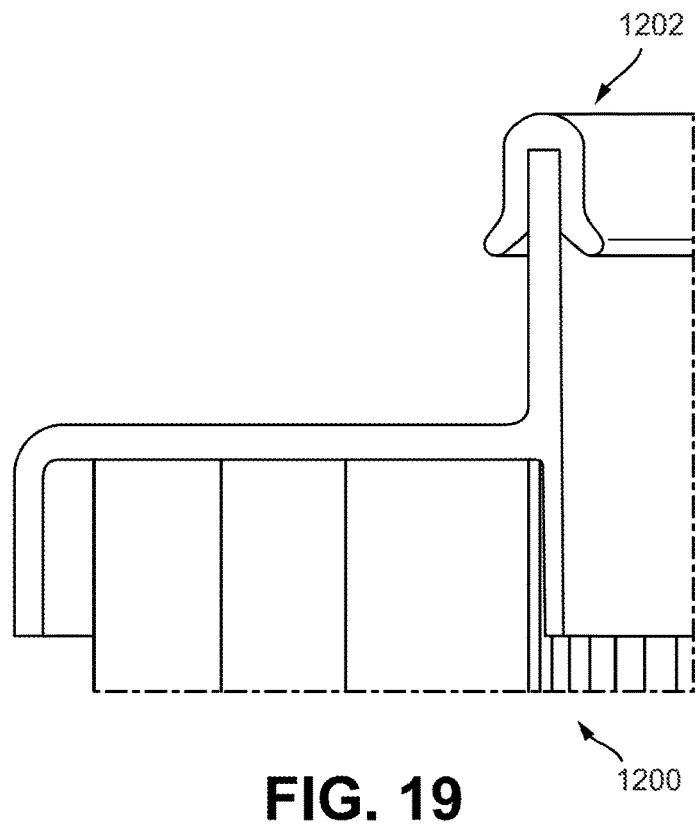
FIG. 19 is a portion of a cross-sectional view of a first endcap according to another example embodiment.

FIGS. 16-19 illustrate a first endcap 1200 and seal member 1202 according to an example embodiment. The first endcap 1200 includes an endcap projection 1206. The endcap projection 1206 includes endcap bonding apertures 1208. The endcap bonding apertures 1208 are configured to receive the adhesive 1210 or the seal member 1202 (e.g., when the seal member 1202 is overmolded onto the endcap projection 1206, etc.) to enhance bonding between the seal member 1202 and the endcap projection 1206. The endcap bonding apertures 1208 may be covered by the seal member 1202 when the seal member 1202 is coupled to the endcap projection 1206. Referring to FIG. 18, a detailed view of the seal member 1202 is shown according to an example embodiment.

In this design the bottom end plate & Y type rubber seal members are manufactured as separate components & then they are glued together using adhesive to form one assembly which will be part of filter cartridge assembly. This Y type rubber seal member establishes sealing with a drain passage in the filter head when installed thereby facilitating drainage of fluid when a filter cartridge is removed. The type of rubber that the rubber seal member is made from, the shape of rubber seal member, the type of glue using in making the rubber seal member, and the geometry of various components of the first endcap assembly that may be used to facilitate assembly of the rubber seal member may vary as per application and design. During assembly, the cartridge moves inside the groove freely and comes in contact with both walls of the groove. Seal member features may be radially compressed due to this contact. The interference between the seal member and the inner groove wall creates the sealing surface. The profile of the seal member is optimized to keep the installation and removal force to its minimum. The first endcap 128 is manufactured as a single part in one draw. The seal member may be manufactured as a single part. A dispenser dispenses a synthetic glue in the seal member cavity, such as using epoxy or acrylic adhesive. Later, the seal member is pushed against the end plate. In manufacturing of the first endcap assembly, the first endcap 128 and the seal member 1202 are manufactured separately. The seal member 1202 may be made from Viton. The first endcap 128 and the seal member 1202 may be permanently assembled using glue.

The first endcap 128, the seal member 1202, the first endcap 128, and the top endcap form a filter cartridge assembly. The first endcap assembly may be sold individually and used with the first endcap 128 (e.g., one filter cartridge assembly may be replaced with another first endcap, etc.).

The seal member 1202 and the first endcap 128 are constructed from different materials in some embodiments. For example, the seal member 1202 may be constructed from a deformable material, such as rubber, a polymer, nylon, nitrile rubber, seal member material, O-ring material, or other similar materials and the first endcap 128 may be constructed from metal, plastic, or other similar material.

Figure 20:
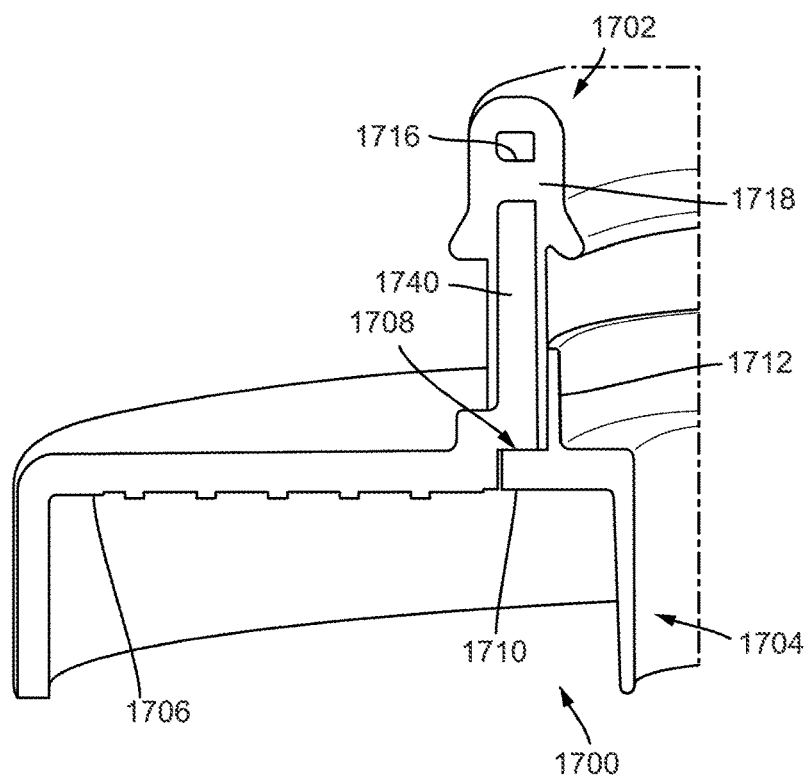
FIG. 20 is a cross-sectional view of a portion of the first endcap shown in FIG. 19.
Figure 21:
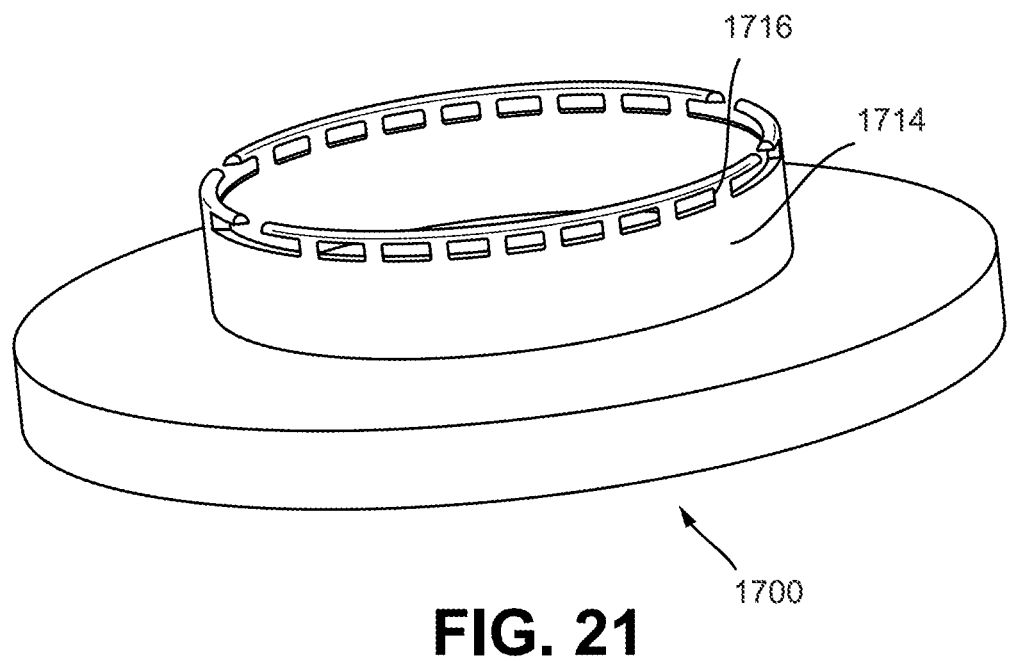
FIG. 21 is a perspective view of another portion of the first endcap shown in FIG. 19.
Figure 22:
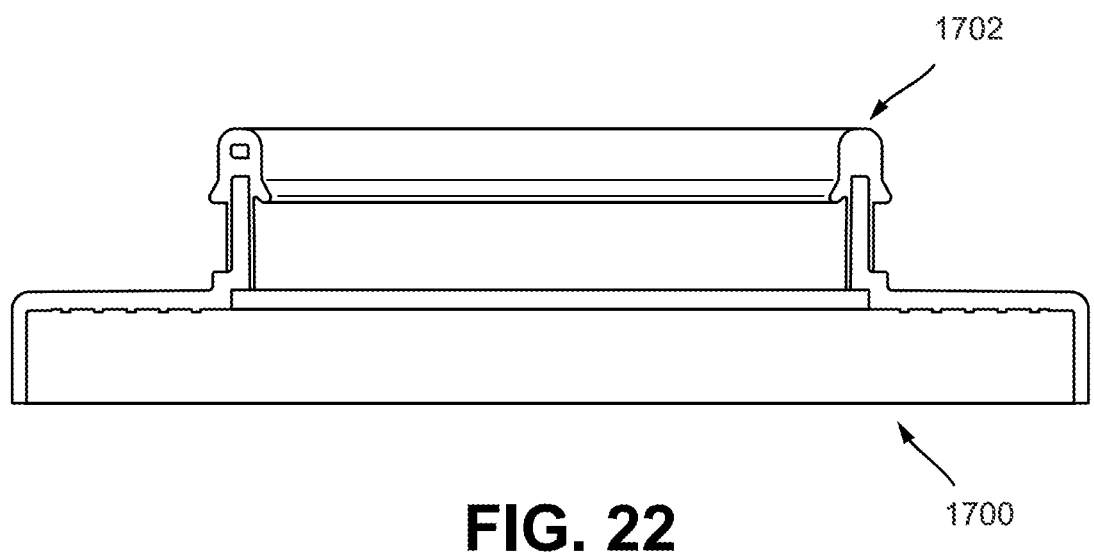
FIG. 22 is a cross-sectional view of a portion of the first endcap shown in FIG. 19.

FIGS. 20-22 illustrate cross-sectional views of another first endcap according to multiple example embodiments. In this design, the first endcap is manufactured as separate part and then this endcap will be placed on tooling of rubber seal member manufacturing process and rubber material is poured around endcap to create over molded rubber seal member design. The original endcap may be divided in 2 separate pieces to enable over molding operation of rubber and later coupled together using adhesive during potting process. The type of rubber, shape of rubber seal member and endcap design may vary as per application and design. During assembly, the cartridge moves inside the groove freely and comes in contact with both walls of the groove. Thus seal member features get compressed radially. The interference between seal member and inner groove wall creates the sealing surface. The seal member profile is optimized to keep the installation and removal force to its minimum. In these embodiments, the seal member is over-molded with the first endcap. Thus, no glue or other adhesive is required to attach the seal member to the endcap.

The first endcap may be manufactured in two pieces. In this arrangement, the seal member may be over-molded with the first piece. Subsequently, the second piece of the endcap may be snap fit onto the combination of the first piece and the seal member. In the embodiment shown in FIG. 19, as compared to the embodiment shown in FIG. 20, the endcap is not manufactured in two pieces, but the seal member is still over-molded onto the endcap.

Referring to FIG. 20, a cross-sectional view of a portion of a first endcap 1700 is shown according to an example embodiment. The first endcap 1700 includes a seal member 1702 and a first endcap insert 1704. The seal member 1702 is positioned within the filter head channel 154.

The first endcap 1700 includes a first endcap flange 1706 that interfaces with the filter element 126. Specifically, the first endcap is held by the first endcap flange 1706 against a top endcap. The first endcap flange 1706 is annular (e.g., circular, etc.). The first endcap 1700 also includes a first endcap shelf 1708. The first endcap shelf 1708 is annular. The first endcap insert 1704 includes a first endcap insert shelf 1710 and a first endcap insert projection 1712. The first endcap insert shelf 1710 is configured to interface with the first endcap shelf 1708 to support the first endcap insert 1704 on the first endcap 1700. The first endcap insert projection 1712 is configured to be disposed adjacent an endcap projection 1714 of the first endcap 1700.

The endcap projection 1714 includes endcap bonding apertures 1716. The endcap bonding apertures 1716 are configured to receive the adhesive 1718 or the seal member 1702 (e.g., when the seal member 1702 is overmolded onto the endcap projection 1714, etc.) to enhancing bonding between the seal member 1702 and the endcap projection 1714. The endcap bonding apertures 1716 may be covered by the seal member 1702 when the seal member 1702 is coupled to the endcap projection 1714.

The seal member 1702 and the first endcap 1700 are constructed from different materials in some embodiments. For example, the seal member 1702 may be constructed from a deformable material, such as rubber, a polymer, nylon, nitrile rubber, seal member material, O-ring material, or other similar materials and the first endcap 1700 may be constructed from metal (e.g., aluminum, etc.), plastic (e.g., high temperature plastic, thermoset plastic, etc.), or other similar material.

FIGS. 23-27 illustrate cross-sectional views of another first endcap according to multiple example embodiments. In this design, the endcap and seal member are manufactured separately. These two parts have matching locking features (such as snaps, dimples, rings, etc.) to facilitate mechanical locking. These two parts are locked against each other using mechanical lock (e.g., a snap fit, press fit etc.), and then adhesive is poured to make this lock more robust and avoid pull back during operation. The geometry of a seal member, endcap design, locking feature design, type of adhesive may vary as per application and design. During assembly, the cartridge moves inside the groove freely and comes in contact with both walls of the groove. Thus, seal member features get compressed radially. The interference between the seal member and inner groove wall creates the sealing surface. The seal member profile is optimized to keep the installation and removal force to its minimum. The first endcap is manufactured such that the seal member and endcap are manufactured separately and then seal member is pushed inside the endcap aperture (interference fit). The protrusions have a mechanical lock with endcap once assembled. A potting method ensures the proper bonding between endcap & seal member and it will fill all the space between endcap and seal member.

Figure 23:
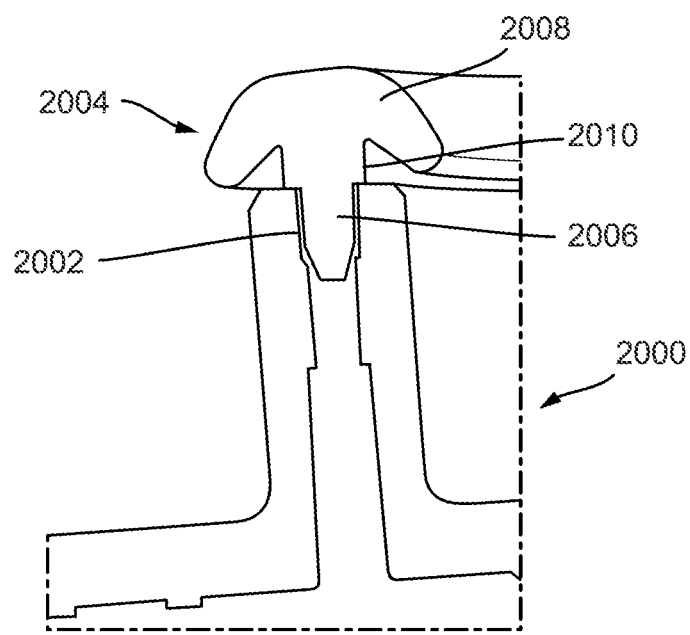
FIG. 23 is a cross-sectional view of a portion of a first endcap according to another example embodiment.
Figure 25:
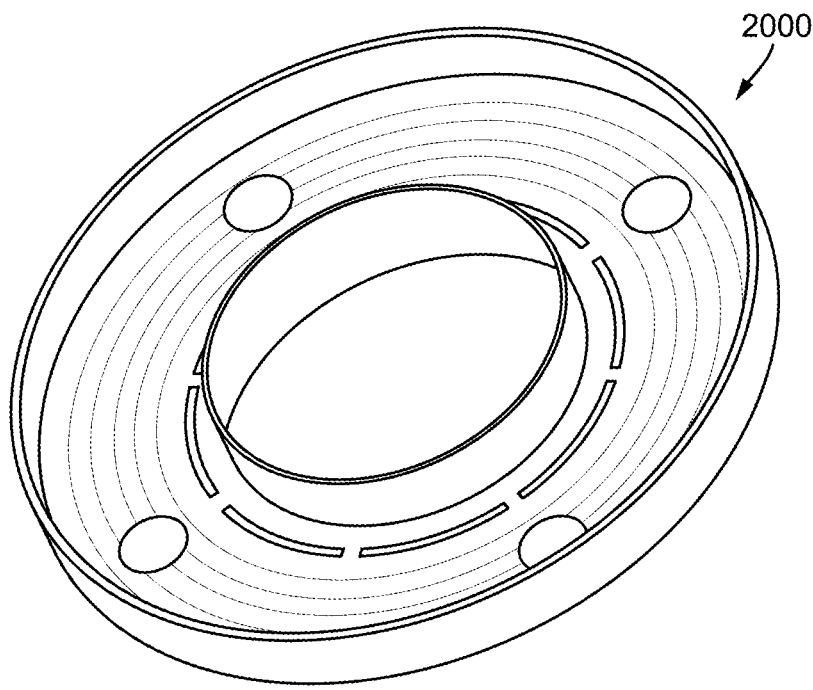
FIG. 25 is a perspective view of a portion of a first endcap according to yet another example embodiment.
Figure 26:
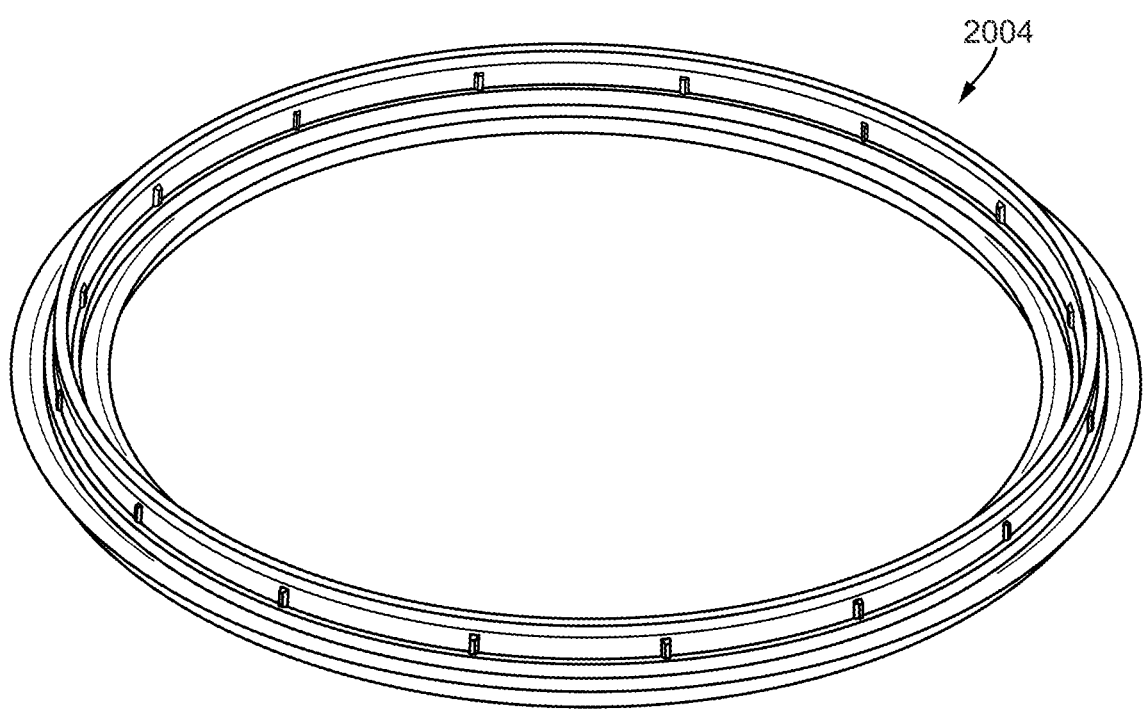
FIG. 26 is a perspective view of a portion of a first endcap according to still another example embodiment.
Figure 27:
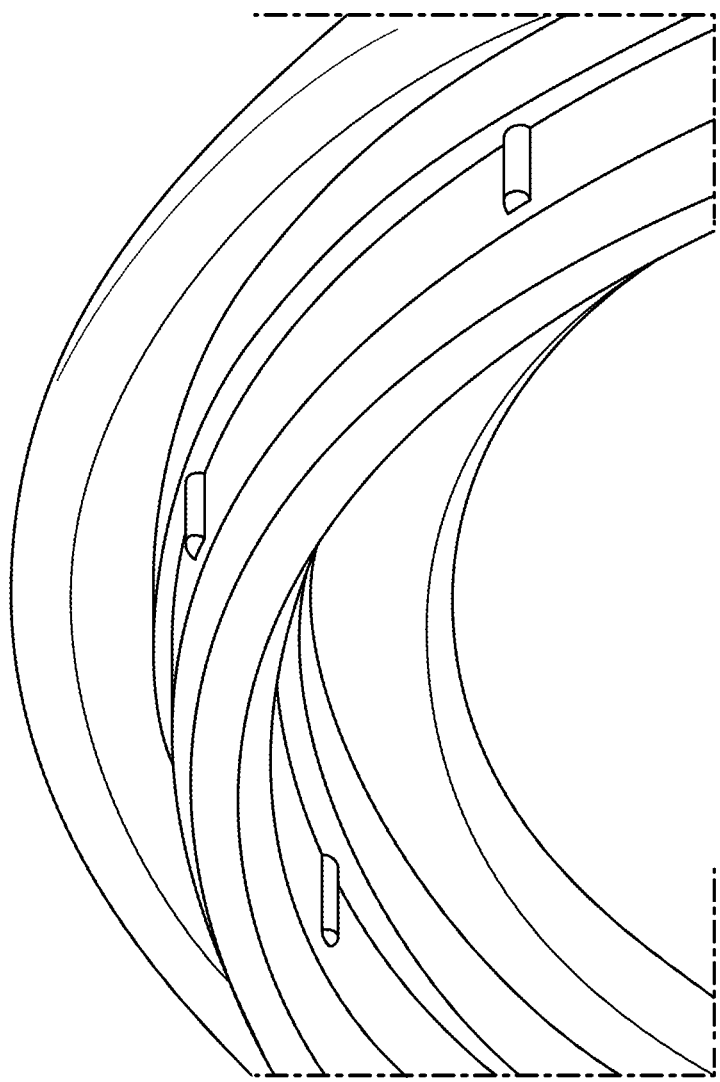
FIG. 27 is a detailed view of a portion of the first endcap of FIG. 26.

Referring to FIG. 23, a first endcap 2000 is shown to include a first endcap aperture 2002 and a seal member 2004 is shown to include a seal member projection 2006 according to an example embodiment. The seal member 2004 is configured to be coupled to the first endcap 2000 by insertion of the seal member projection 2006 into the first endcap aperture 2002. The seal member 2004 includes seal member head 2008 and a seal member stop 2010. The seal member stop 2010 is configured to prevent over insertion of the seal member projection 2006 into the first endcap aperture 2002. The seal member head 2008 is configured to deflect relative to the seal member projection 2006 and therefore relative to the first endcap 2000, when the seal member projection 2006 is inserted into the first endcap aperture 2002. Deflection of the seal member head 2008 enables the seal member 2004 to attain a seal when inserted into the filter head channel 154. FIG. 25 illustrates the first endcap 2000 and FIGS. 26 and 27 illustrate the seal member 2004.

Figure 24:
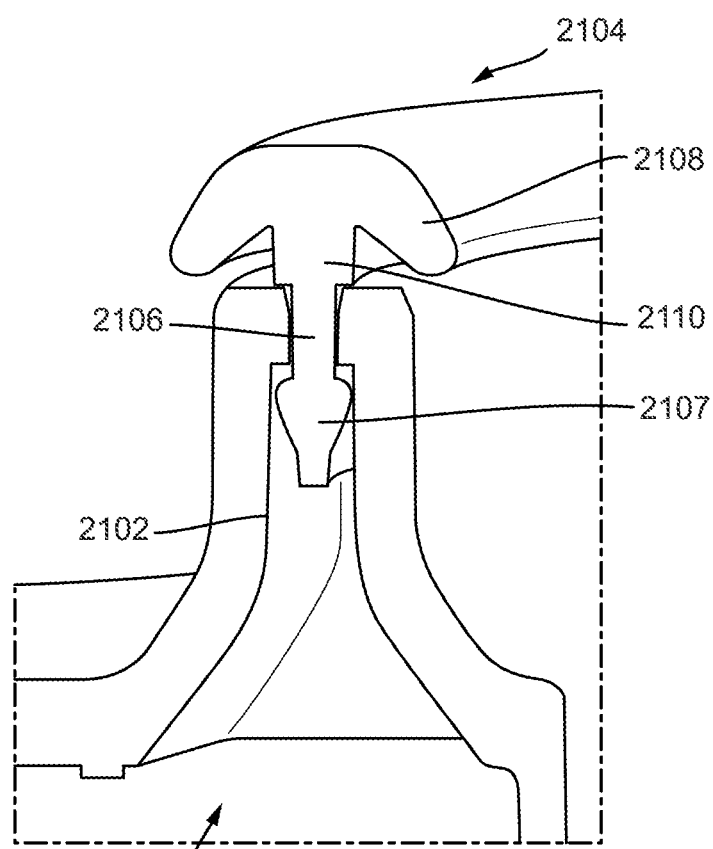
FIG. 24 is a cross-sectional view of a portion of a first endcap according to still another example embodiment.

Referring to FIG. 24, a first endcap 2100 is shown to include a first endcap aperture 2102 and a seal member 2104 is shown to include a seal member projection 2102 according to an example embodiment. The seal member 2104 is configured to be coupled to the first endcap 2100 by insertion of the seal member projection 2102 into the first endcap aperture 2102. The seal member projection 2102 includes a mechanical locking mechanism in the form of a flanged extension 2107 that interfaces with the first endcap aperture 2102 to retain the seal member projection 2102 in the first endcap aperture 2102. For example, the flanged extension 2107 retain the seal member projection 2102 in the first endcap aperture 2102 without the use of adhesive or glue. The seal member 2104 includes seal member head 2108 and a seal member stop 2110. The seal member stop 2110 is configured to prevent over insertion of the seal member projection 2102 into the first endcap aperture 2102. The seal member head 2108 are configured to deflect relative to the seal member projection 2102, and therefore relative to the first endcap 2100, when the seal member projection 2102 is inserted into the first endcap aperture 2102. Deflection of the seal member head 2108 enables the seal member 2104 to attain a seal when inserted into the filter head channel 154.

FIG. 25 illustrates a cross-sectional view of another first endcap according to an example embodiment. In this design, the first endcap and seal members are manufactured as separate parts & they have features which are suitable for press fit application such as a barb feature, transition fit tolerances, press fit using retaining elements etc. The geometry of a seal member, endcap design, locking feature design, etc. may vary as per application and design. During assembly, the cartridge moves inside the groove freely and comes in contact with both walls of the groove. Thus, the seal member features get compressed radially. The interference between seal member and inner groove wall creates the sealing surface. The seal member profile is optimized to keep the installation and removal force to its minimum. The filter assembly is manufactured such that the barb profile is to be developed on the outer and inner surface of the plastic endcap. The seal member is assembled with endcap with the help of a fixture. The barb profile is known to be leak proof and a reliable assembly.

Figure 28:
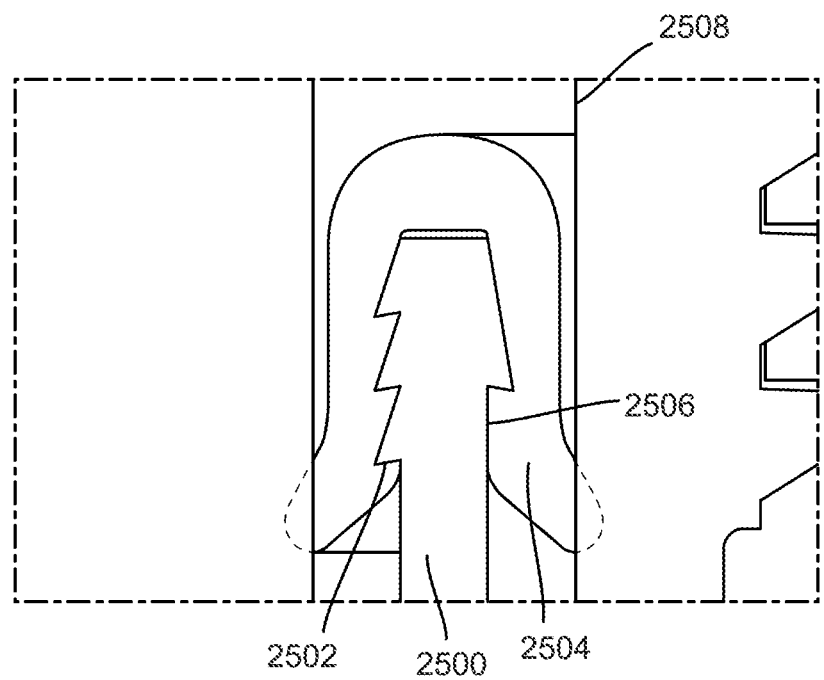
FIG. 28 is a cross-sectional view of a portion of a first endcap according to yet another example embodiment.
Figure 29:
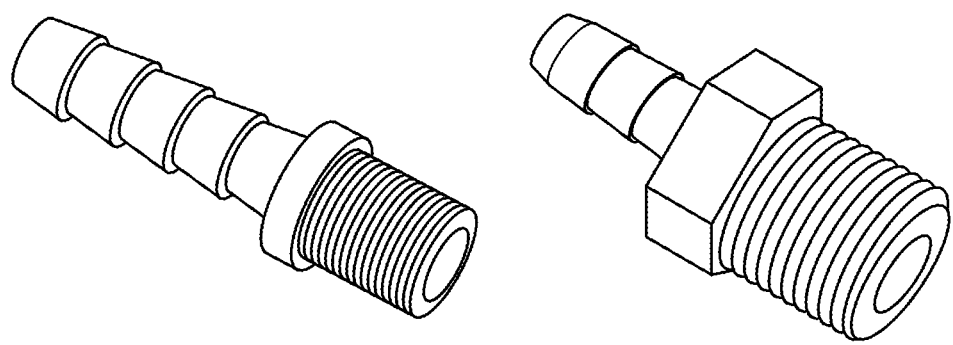
FIG. 29 are perspective views of various barb fittings.

Referring to FIG. 28, a first endcap projection 2500 is shown to include a barb profile 2502 according to an example embodiment. A seal member 2504 is shown to include a seal member aperture 2506. The first endcap projection 2500 is inserted into the seal member aperture 2506 such that the barb profile 2502 is at least partially located within the seal member aperture 2506. The barb profile 2502 facilitates retention of the seal member 2504 on the first endcap projection 2500 when a first endcap having the first endcap projection 2500 is removed from a filter head having the filter head channel 2508 within which the seal member 2504 was inserted. Various example barb profiles are shown in FIG. 29.

Figure 30:
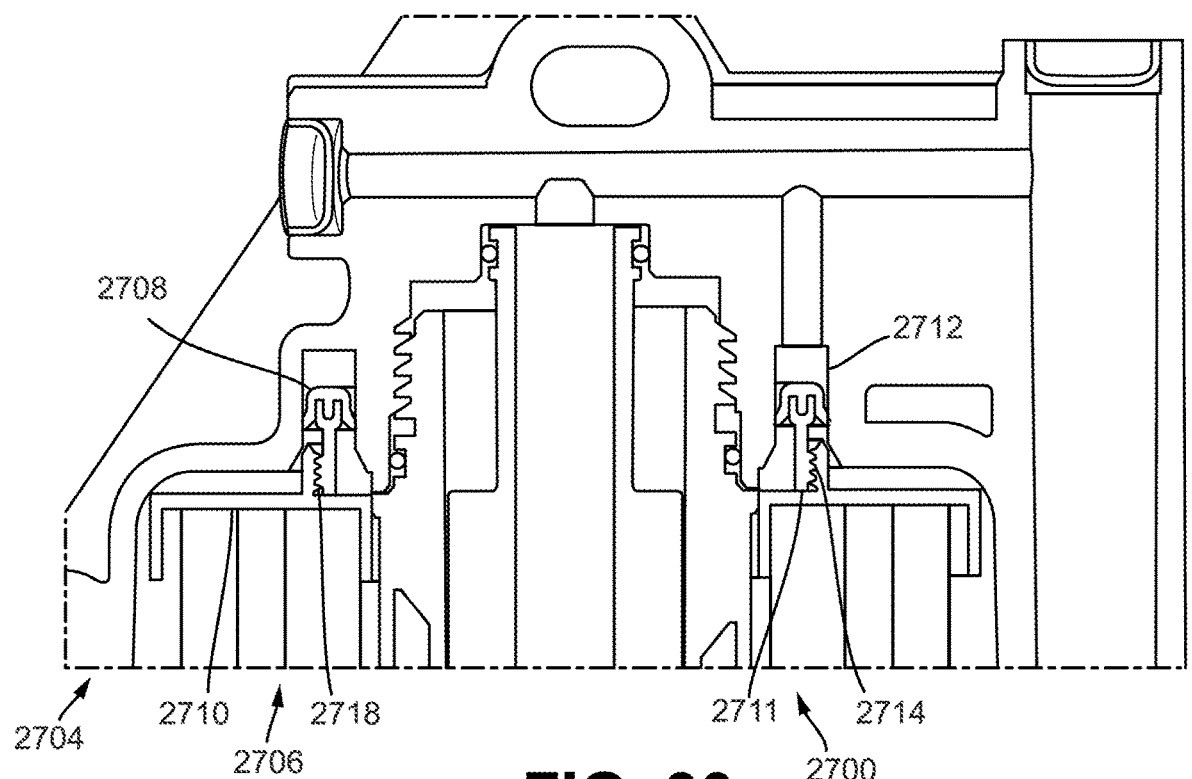
FIG. 30 is a cross-sectional view of a portion of a first endcap according to another example embodiment.
Figure 31:
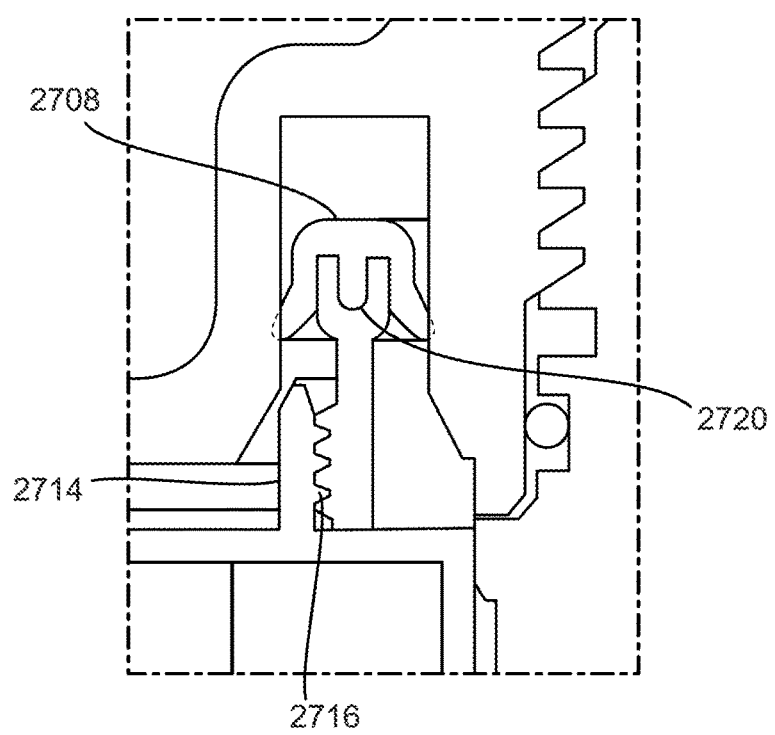
FIG. 31 is a detailed view of a portion of FIG. 30.
Figure 32:
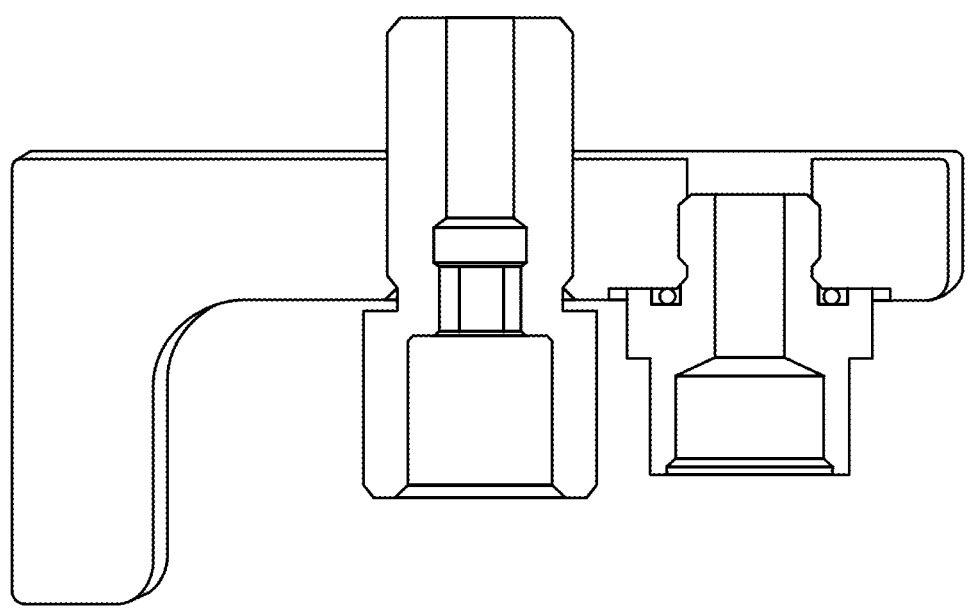
FIG. 32 is a representation of an example leak proof threading with sealant.

FIGS. 30-3229 illustrate cross-sectional views of another first endcap according to multiple example embodiments. In this design, an overmolded rubber seal member is created on separate piece of endcap & later this piece of endcap is attached to original endcap using threading two parts together, using welding method (vibration welding, ultrasonic welding etc.) or using hardware like screws/bolts etc. Various types of sealant may be used to avoid leakage through threads, welding geometry etc. The type of attachment & over molded seal member may vary as per application and design. During assembly, the cartridge moves inside the groove freely and comes in contact with both walls of the groove. Thus, seal member features get compressed radially. The interference between seal member and inner groove wall creates the sealing surface. The seal member profile is optimized to keep the installation and removal force to its minimum. The first endcap may be manufactured such that the endcap is manufactured with the threaded interface separately, the endcap is assembled (threaded) with over molded assembly using Loctite, thereby resulting in a permanent leak-proof assembly. FIG. 32 is an example of a leak proof threading with sealant.

Referring to FIG. 30, a cross-sectional view of a filter assembly 2700 is shown according to an example embodiment. The filter assembly 2700 includes a filter head lid, a filter head 2704, a filter cartridge 2706, a seal member 2708, a first endcap 2710 (e.g., endcap, etc.), a first endcap insert 2711, and the filter head channel 2712. The first endcap 210 interfaces with the first endcap 2710. The first endcap insert 2711 interfaces with the seal member 2708. The seal member 2708 is positioned within the filter head channel 2712. The filter head channel 2712 is configured to be in fluid communication with a fuel tank and/or an oil pan. The first endcap 2710 facilitates sealing across the inner pocket of the filter head separating clean and dirty side of the filter.

The first endcap 2710 also includes an endcap projection 2714 (e.g., rib, etc.). The endcap projection 2714 extends (e.g., projects, etc.) from the first endcap flange 2730 opposite the first endcap 2710. The endcap projection 2714 is annular or extends annularly (e.g., in discontinuous segments disposed annularly, etc.) along the first endcap flange 2730. The endcap projection 2714 is configured to be aligned with (e.g., centered on, etc.) the filter head channel 2712.

The endcap projection 2714 includes an endcap projection threaded surface 2716. The endcap projection threaded surface 2716 is configured to be coupled to a first endcap insert threaded surface 2718 of the first endcap insert 2711. The first endcap insert 2711 includes a first endcap insert aperture 2720. The first endcap insert aperture 2720 is annular or extends annularly along the first endcap insert 2711. The first endcap insert aperture 2720 is configured to receive the seal member 2708 and be coupled to the seal member 2708. For example, the seal member 2708 may be inserted into the first endcap insert aperture 2720 and adhesively bonded to or overmolded onto the first endcap insert aperture 2720. When the seal member 2708 is inserted into the filter head channel 2712, the first endcap insert 2711 may be partially received within the filter head channel 2712. The first endcap insert 2711 may be separated from the filter head channel 2712 due to an interaction between the seal member 2708 and the filter head channel 2712. While the first endcap insert 2711 is shown as being located radially inward of the endcap projection 2714, it is understood that the first endcap insert 2711 may instead be located radially outward of the endcap projection 2714 in other embodiments.

The seal member 2708 and the first endcap 2710 are constructed from different materials in some embodiments. For example, the seal member 2708 may be constructed from a deformable material, such as rubber, a polymer, nylon, nitrile rubber, seal member material, O-ring material, or other similar materials, and the first endcap 2710 may be constructed from metal, plastic, or other similar material.

Figure 35:
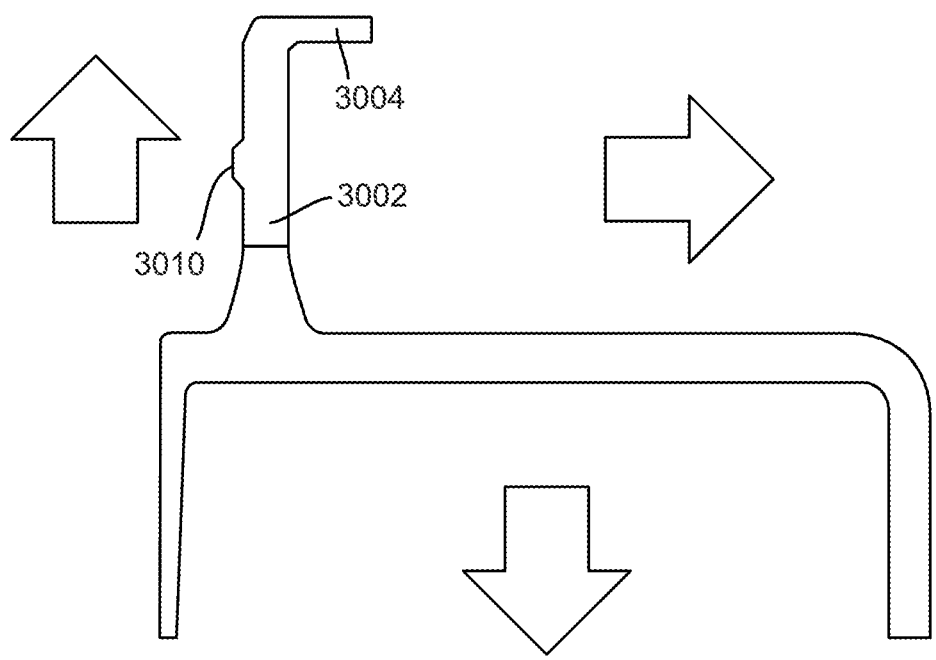
FIG. 35 is a detailed view of a portion of the first endcap of FIG. 33.

FIGS. 33-36 illustrate cross-sectional views of another first endcap according to multiple example embodiments. This design concept looks like a letter L or a right angle. On the inner wall of the first endplate, a dimple is created which may get crushed to provide a seal member on the first fluid side. The tip of the extended leg provides the sealing on the second fluid side. A small radial clearance is maintained between the tip of the leg and the wall of groove. Contrary to this, an interference is kept on the inside wall and the dimple. During assembly, the leg will move inside the groove freely until the dimple comes in contact with inside wall of groove. The interference between dimple and inner groove wall creates the sealing surface and at the same time bend the leg so that the leg tip makes a firmer contact with outer wall. Further downward motion of end plate creates sealing surface on both sides. During servicing, when the end plate moves in the downward direction, the seal member created by dimple disengages first, thus creating an opening for the fluid (e.g., from the first fluid side) to drain. Further downward movement of endcap disengages the seal member developed by tip of L shaped seal member and the fluid (e.g., from the second fluid side) now can drain. A draft on the groove surface will further reduce the installation and removal force. The delaying length feature can be modified to meet a target application. The first endcap is configured such that the end plate is manufactured as a single part in one draw. The core out directions are shown in FIG. 35.

Figure 33:
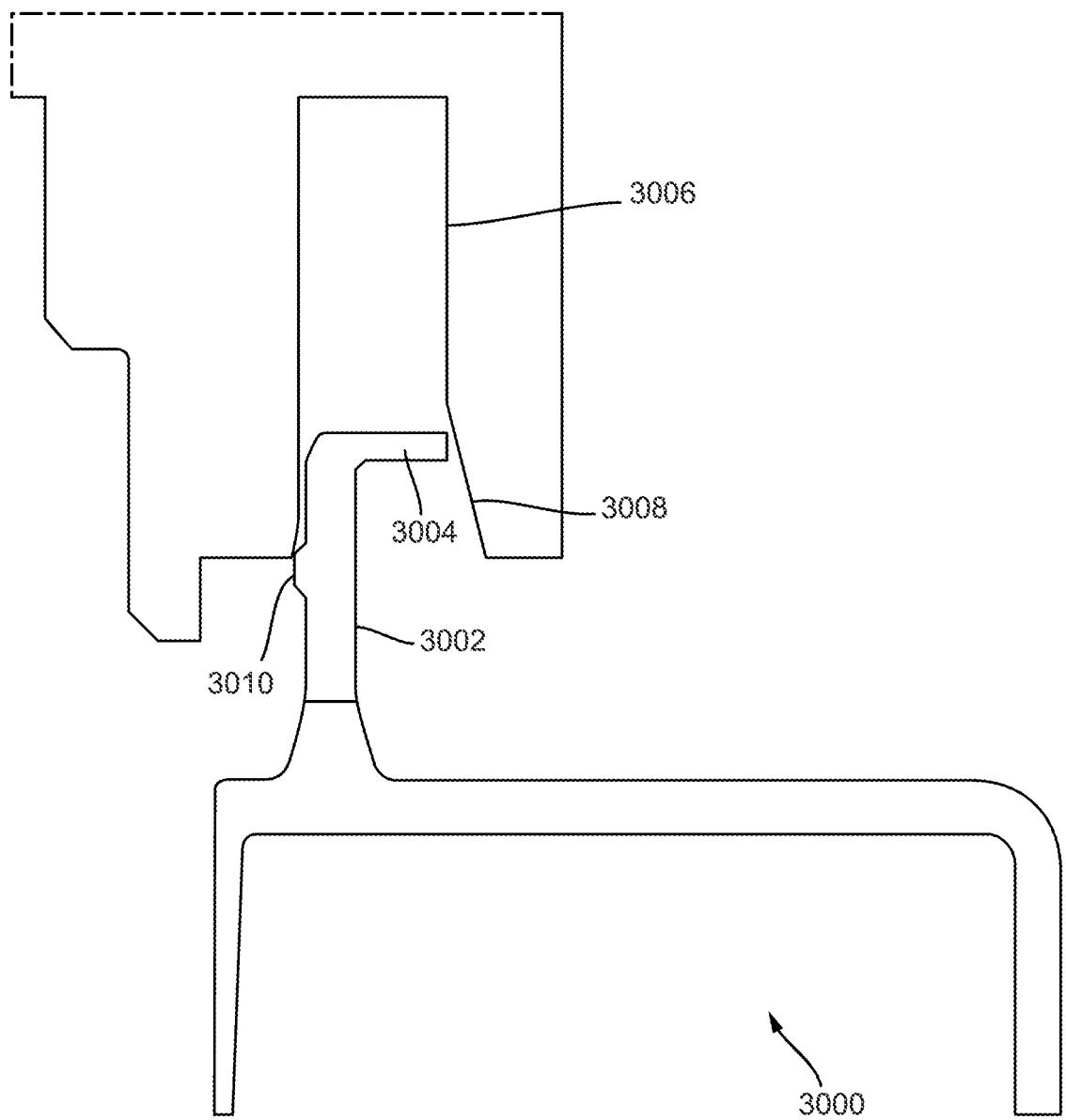
FIG. 33 is a cross-sectional view of a portion of a first endcap according to still another example embodiment.
Figure 34:
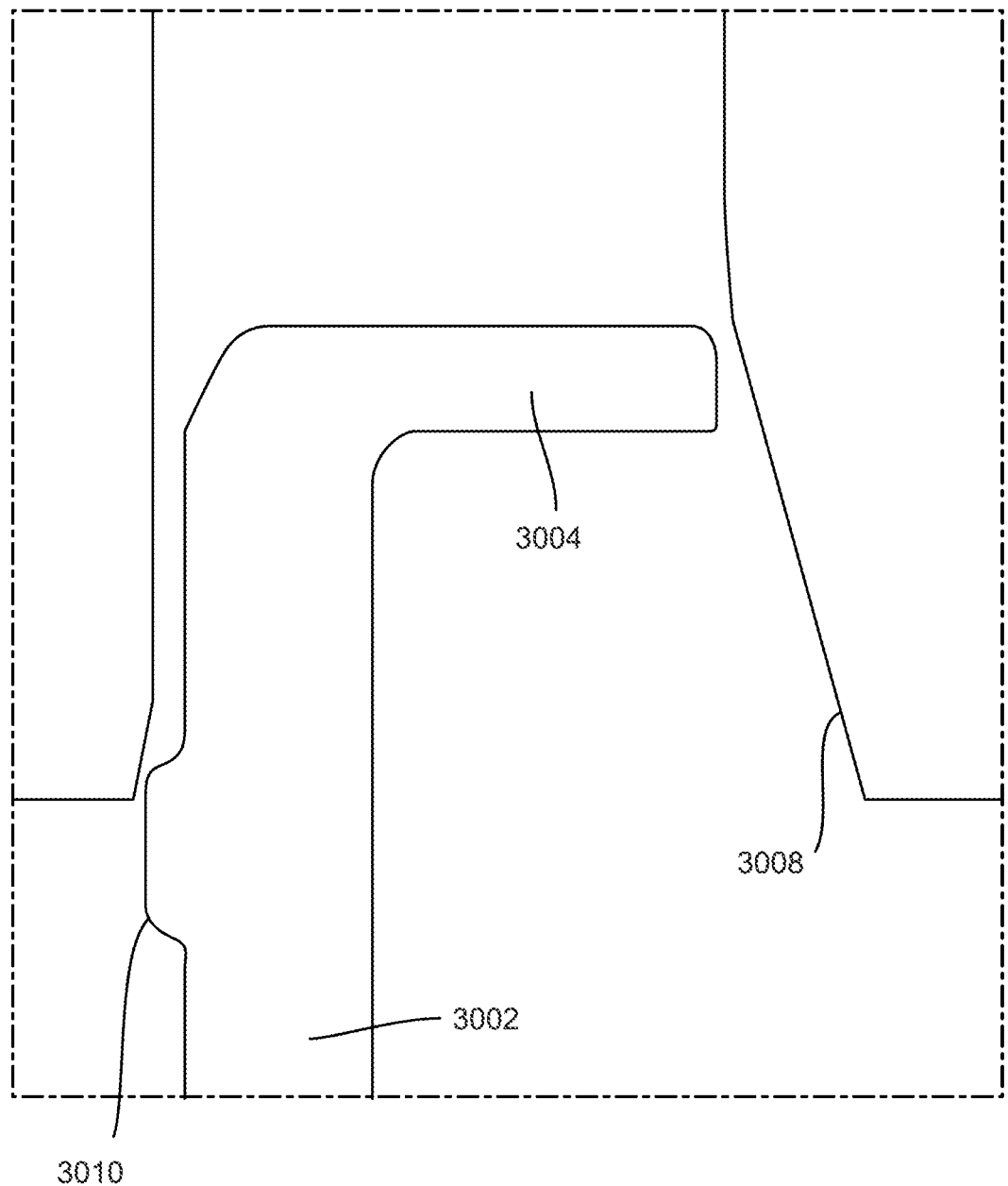
FIG. 34 is a detailed view of a portion of the first endcap of FIG. 33.

Referring to FIG. 33, a first endcap 3000 is shown with a first endcap projection 3002 having a seal member 3004 structurally integrated therewith (and therefore structurally integrated with the first endcap 3000) according to an example embodiment. As used herein, structurally integrated means that two elements (e.g., the first endcap 3000 and the seal member 3004, etc.) are contained within (e.g., formed in, present in, part of, features of, etc.) a single unitary member and are not joined, adhesively attached, or otherwise connected to form an assembly of the two elements. As used herein, a single unitary member that contains two elements is not an assembly of the two elements. In some examples, the single unitary member is formed from molding or casting. In other examples, the single unitary member is formed via machining or printing.

The seal member 3004 extends from the first endcap projection 3002 at an angle (e.g., a right angle, etc.) such that a separate seal member is not necessary. Upon insertion of the first endcap projection 3002 into the filter head channel 3006, the seal member 3004 may deflect (e.g., bend upwards, etc.) relative to the first endcap projection 3002. The filter head channel 3006 includes a sloped portion 3008 and the first endcap projection 3002 includes a dimple 3010 on a side of the first endcap projection 3002 that is opposite to a side from which the seal member 3004 extends. As the first endcap projection 3002 is inserted into the filter head channel 3006, the seal member 3004 may be guided along the sloped portion 3008 and, upon sufficient insertion into the filter head channel 3006. The dimple 3010 causes a radial translation of the seal member 3004 (e.g., to the right in FIG. 33), so as to cause the seal member 3004 to be biased against the filter head channel 3006. The sloped portion 3008 may guide insertion of the first endcap projection 3002 into the filter head channel 3006 and the dimple 3010 may increase sealing between the seal member 3004 and the filter head channel 3006.

Figure 36:
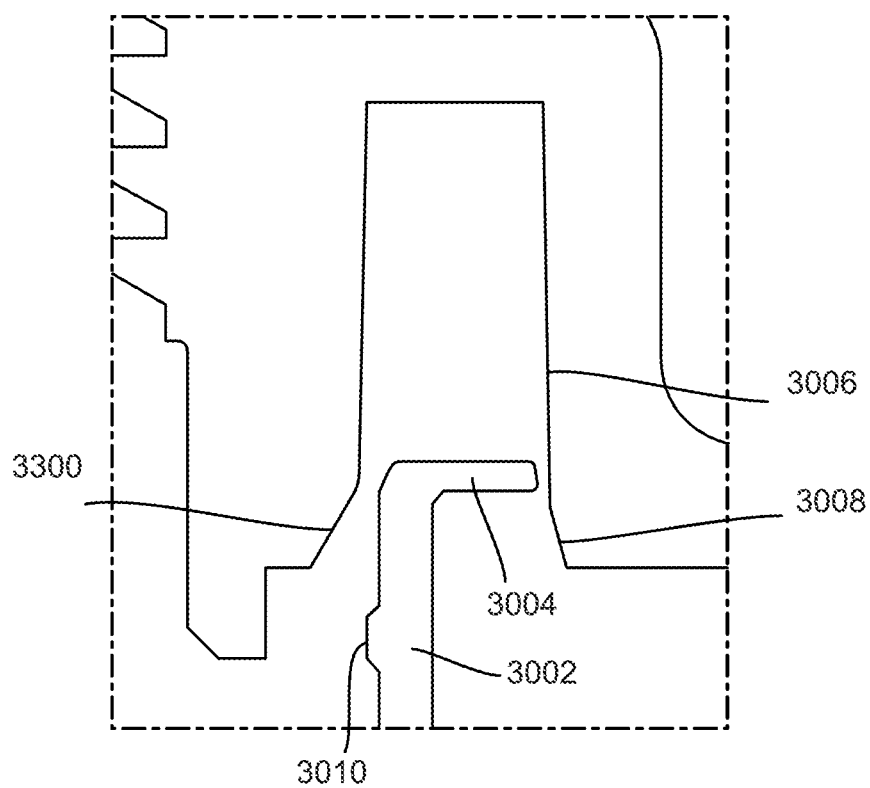
FIG. 36 is a detailed view of a portion of the first endcap of FIG. 33.

In some embodiments, as shown in FIG. 36, the filter head channel 3006 includes a drafted surface 3300 opposite the sloped portion 3008. The drafted surface 3300 may assist in guiding insertion of the first endcap projection 3002 into the filter head channel 3006.

Figure 37:
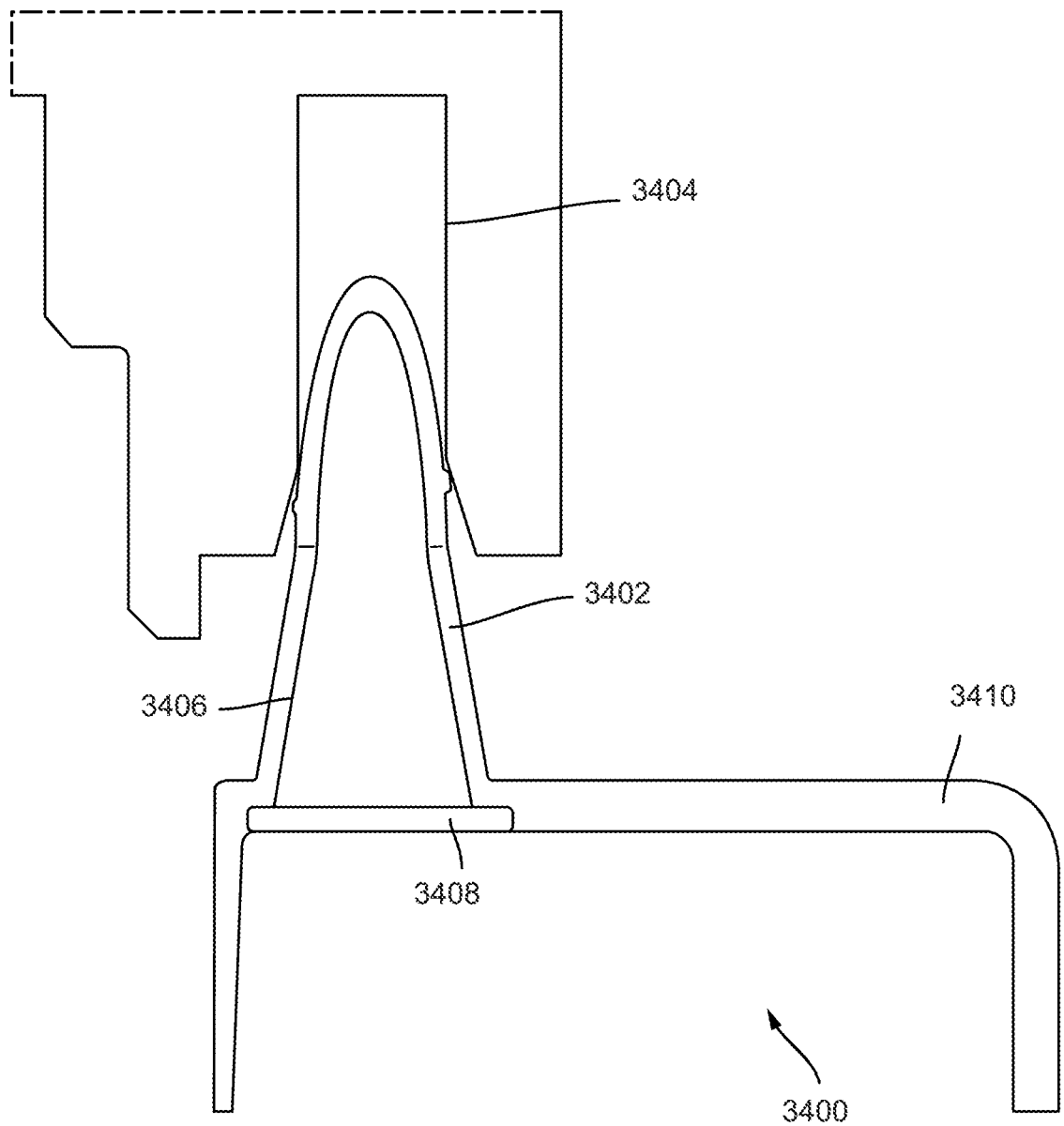
FIG. 37 is a cross-sectional view of a portion of a first endcap according to yet another example embodiment.
Figure 38:
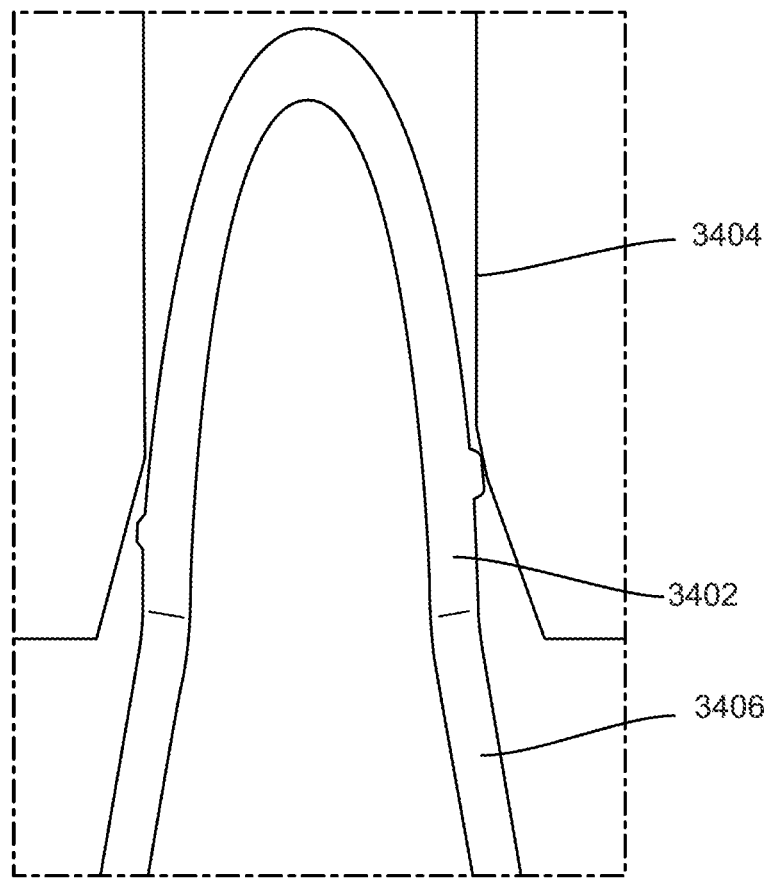
FIG. 38 is a detailed view of a portion of the first endcap of FIG. 37.
Figure 39:
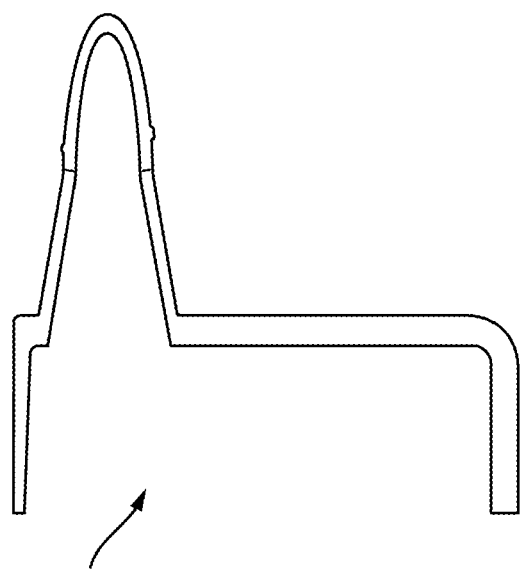
FIG. 39 is a detailed view of a portion of the first endcap of FIG. 37.

FIGS. 37-39 illustrate cross-sectional views of another first endcap according to other example embodiments. A bubble shaped feature is created in the end plate that gets compressed radially in this concept. Since the sealing achieved by radial compression, this concept is easiest to install and remove. Two dimples are created on inner and outer side of bubble to create a seal member surface. The delaying length feature can be modified to meet a target application. The end plate is manufactured in one draw. The draw directions are shown in FIG. 39. If the epoxy used for gluing the media to the end-plate enters the bulb feature, it may not allow the bulb to deform easily, thereby increasing installation and removal force. Hence, to avoid the epoxy entering the bulb feature a separate plate is used that is snap fitted on the bulb end-plate.

Figure 40:
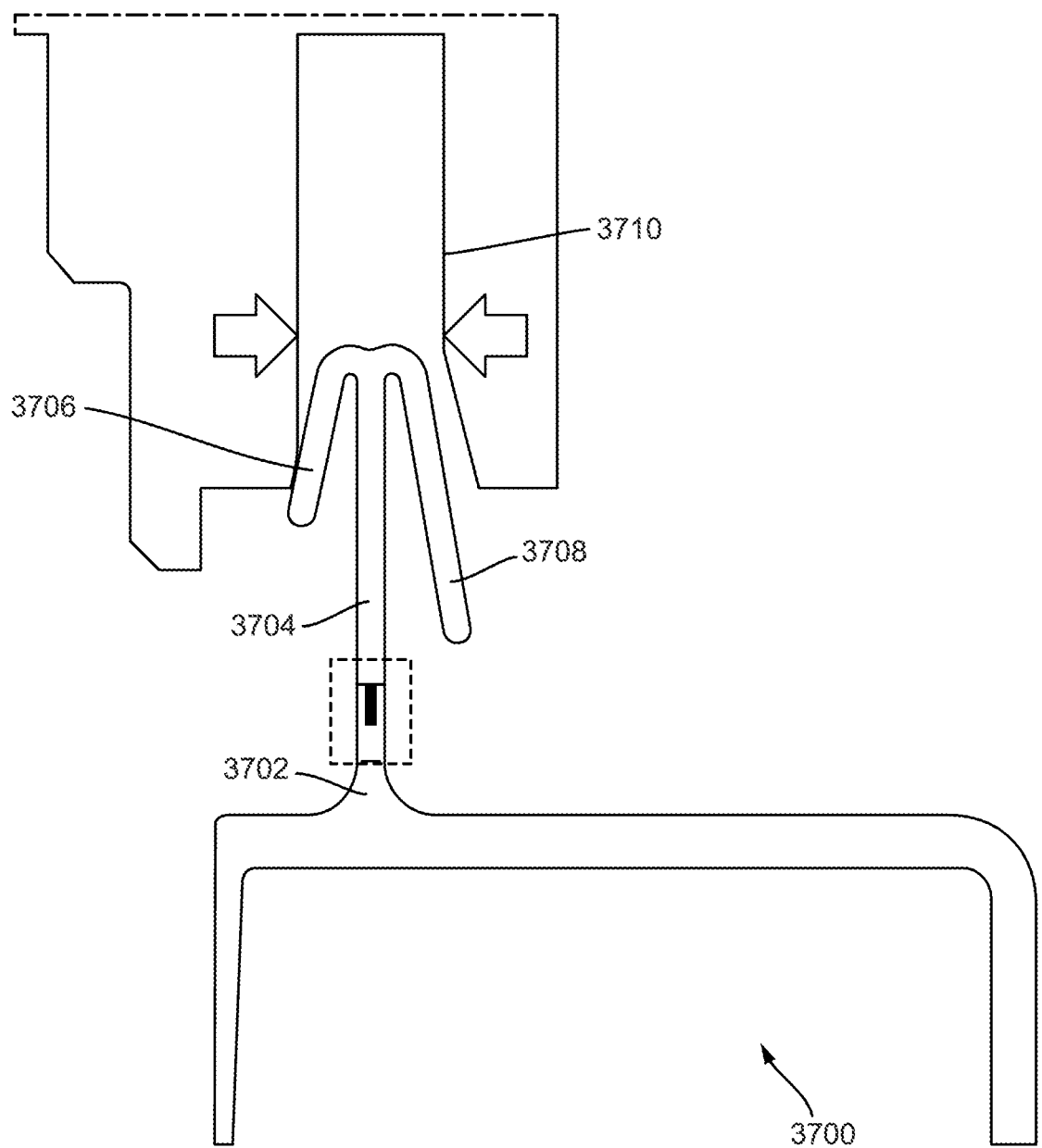
FIG. 40 is a cross-sectional view of a portion of a first endcap according to an example embodiment.
Figure 41:
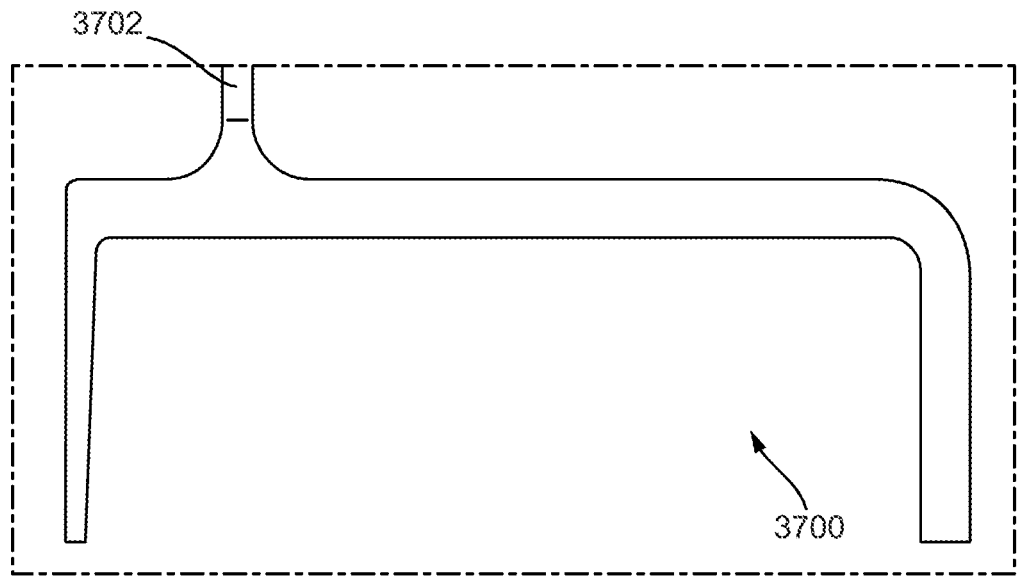
FIG. 41 is a detailed view of a portion of the first endcap of FIG. 40.
Figure 42:
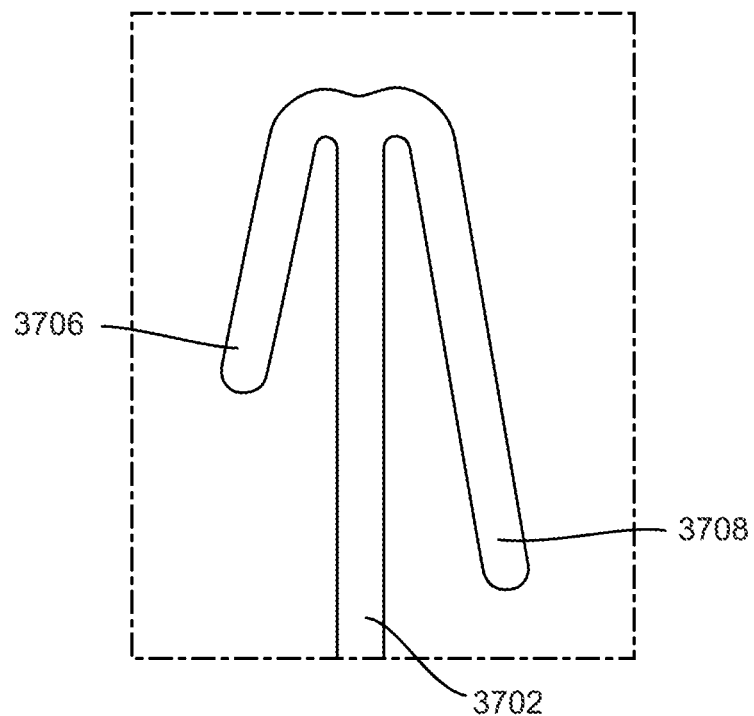
FIG. 42 is a detailed view of a portion of the first endcap of FIG. 40.

FIGS. 40-42 illustrate cross-sectional views of another first endcap according to multiple example embodiments. Sealing is achieved by using a double lip pattern on both sides. Sealing is achieved by radial compression of lips. Because of radial sealing, installation force is small for this design also. By adjusting the lengths of lips, sealing is achieved late for inner lip and first on outer lip. During downward motion of end plate (i.e. installation) an inner lip makes contact first and an outer lip seal member makes contact last. During downward motion of end plate (i.e. removal) an inner lip seal member disengages first while an outer lip seal member disengages last. The length of the lip seal members can be altered and interchanged also to obtain desirable results in every scenario. The delaying length feature can be modified to meet a target application. Because the lip seal member can't be manufactured directly (or in one draw), the lip seal member is separately produced. The end plate and lip seal member then can be joined together using friction or ultrasonic welding as shown in FIG. 37. Thus, end plate is manufactured first in one draw. Next, the lip seal member is separately manufactured in one draw. Both parts are then joined together using a friction or ultra-sonic weld technology.

Referring to FIG. 37, a first endcap 3400 is shown with a first endcap projection 3402 that functions as a seal member according to an example embodiment. Specifically, the first endcap projection 3402 is configured to compress upon insertion into the filter head channel 3404. Compression of the first endcap projection 3402 is facilitated due to a void 3406 formed within the first endcap projection 3402. The void 3406 is bordered by a plate 3408 that is contiguous with a first endcap flange 3410 that interfaces with a filter element. The plate 3408 mitigates accumulation of debris (e.g., epoxy, dirt, etc.) within the void 3406 and thereby functions to maintain desirable operation of the first endcap projection 3402.

Referring to FIG. 40, a first endcap 3700 is shown with a first endcap projection 3702 and a seal member 3704 welded thereto according to an example embodiment. The seal member 3704 includes a first seal member flange 3706 and a second seal member flange 3708. Both the first seal member flange 3706 and the second seal member flange 3708 are configured to deflect (e.g., towards the seal member 3704, etc.) upon insertion of the seal member 3704 into the filter head channel 3710.

Figure 43:
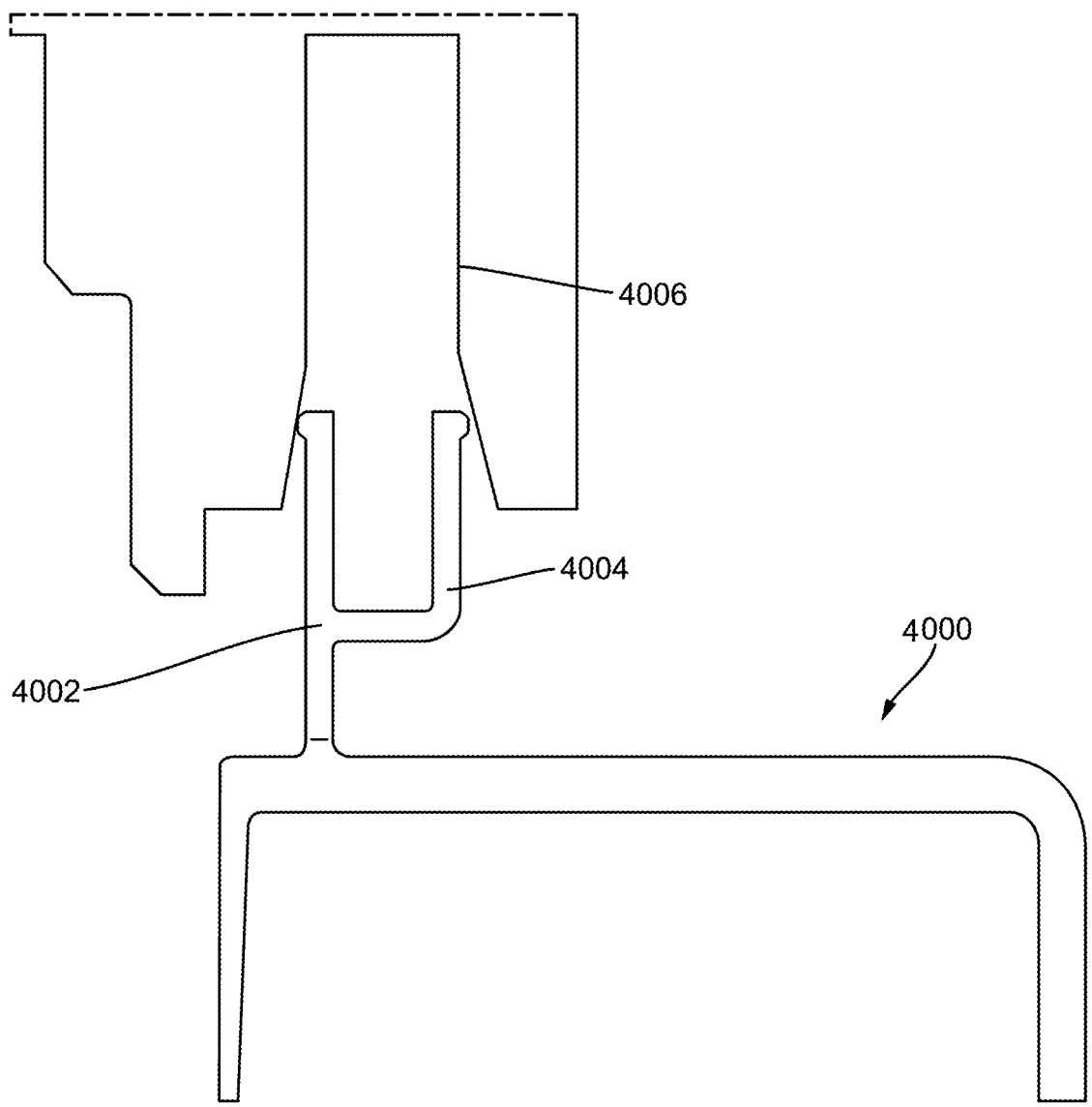
FIG. 43 is a cross-sectional view of a portion of a first endcap according to another example embodiment.
Figure 44:
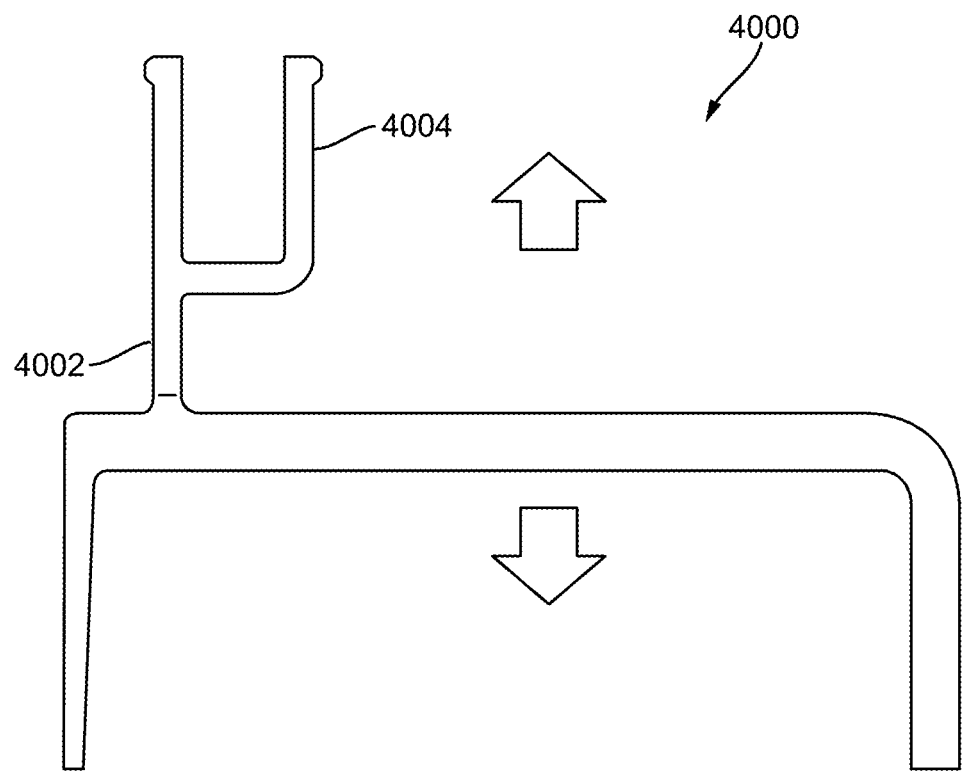
FIG. 44 is a detailed view of a portion of the first endcap of FIG. 43.

FIGS. 43 and 44 illustrate cross-sectional views of another first endcap according to multiple example embodiments. Sealing is achieved at the tip of two seal members, each seal member forming a 'leg' of an h shape. The seal members may include dimples that enhance sealing. The dimple may be located at a tip of the seal member. A length of each of the two seal members is adjusted such that the inner seal member engages last but disengages first. Keeping length of both seal members the same, a chamfer on the groove can be adjusted to get similar effect as mentioned above. The delaying length feature can be modified to meet a target application. The end plate is manufactured as a single part in one draw. The core out directions are shown in FIG. 44.

Referring to FIG. 43, a first endcap 4000 is shown with a first endcap projection 4002 that functions as a seal member and that has an additional seal member 4004 structurally integrated therewith (and therefore structurally integrated with the first endcap 4000) according to an example embodiment. Both the first endcap projection 4002 and the additional seal member 4004 are configured to deflect (e.g., towards each other, etc.) upon insertion of the first endcap projection 4002 into the filter head channel 4006. The additional seal member 4004 may be substantially parallel to the first endcap projection 4002.

Figure 45:
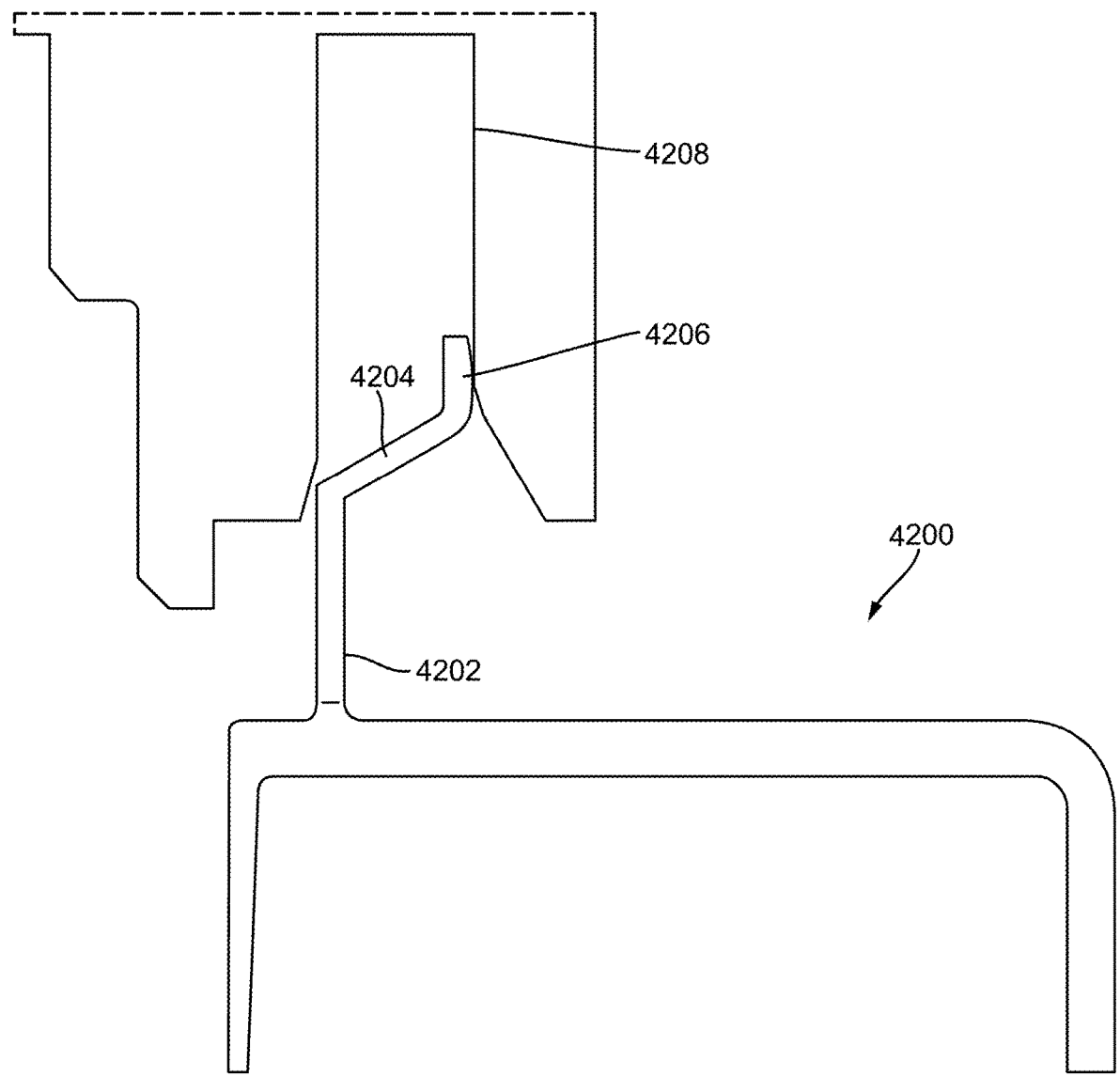
FIG. 45 is a cross-sectional view of a portion of a first endcap according to an example embodiment.
Figure 46:
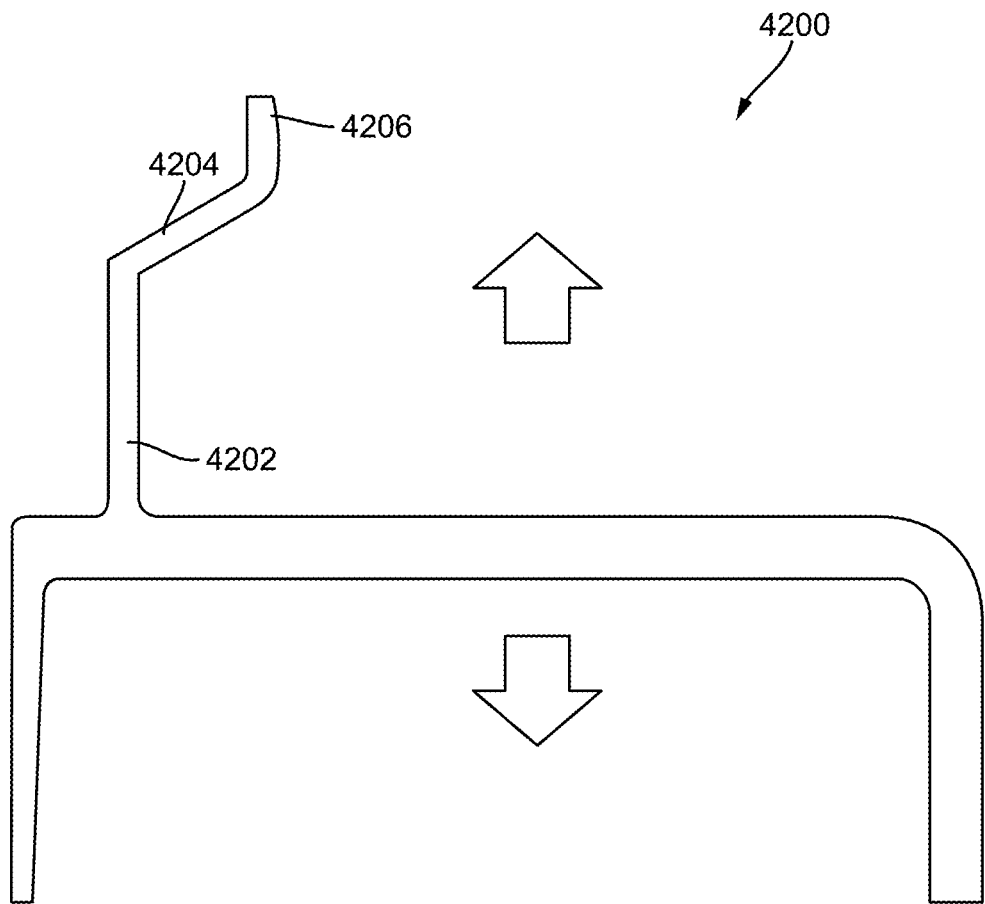
FIG. 46 is a detailed view of a portion of the first endcap of FIG. 45.

FIGS. 45 and 46 illustrate cross-sectional views of another first endcap according to multiple example embodiments. In such embodiments, sealing is achieved on the outer surface first while there is a small radial clearance at outer side. Once an inner surface comes in contact with the groove wall, the Z seal member starts bending and deflect in inward direction. Therefore, with more downward motion, the inner wall of z seal member also makes contact with groove wall. The delaying length feature can be modified to meet a target application. The end plate is manufactured as a single part in one draw. The core out directions are shown in FIG. 46.

Referring to FIG. 45, a first endcap 4200 is shown with a first endcap projection 4202 that includes a hinge member 4204 and a seal member 4206 structurally integrated therewith (and therefore structurally integrated with the first endcap 4200) according to an example embodiment. Insertion of the first endcap projection 4202 into the filter head channel 4208 causes compression of the seal member 4206 towards the first endcap projection 4202. This compression is facilitated by the hinge member 4204.

Figure 47:
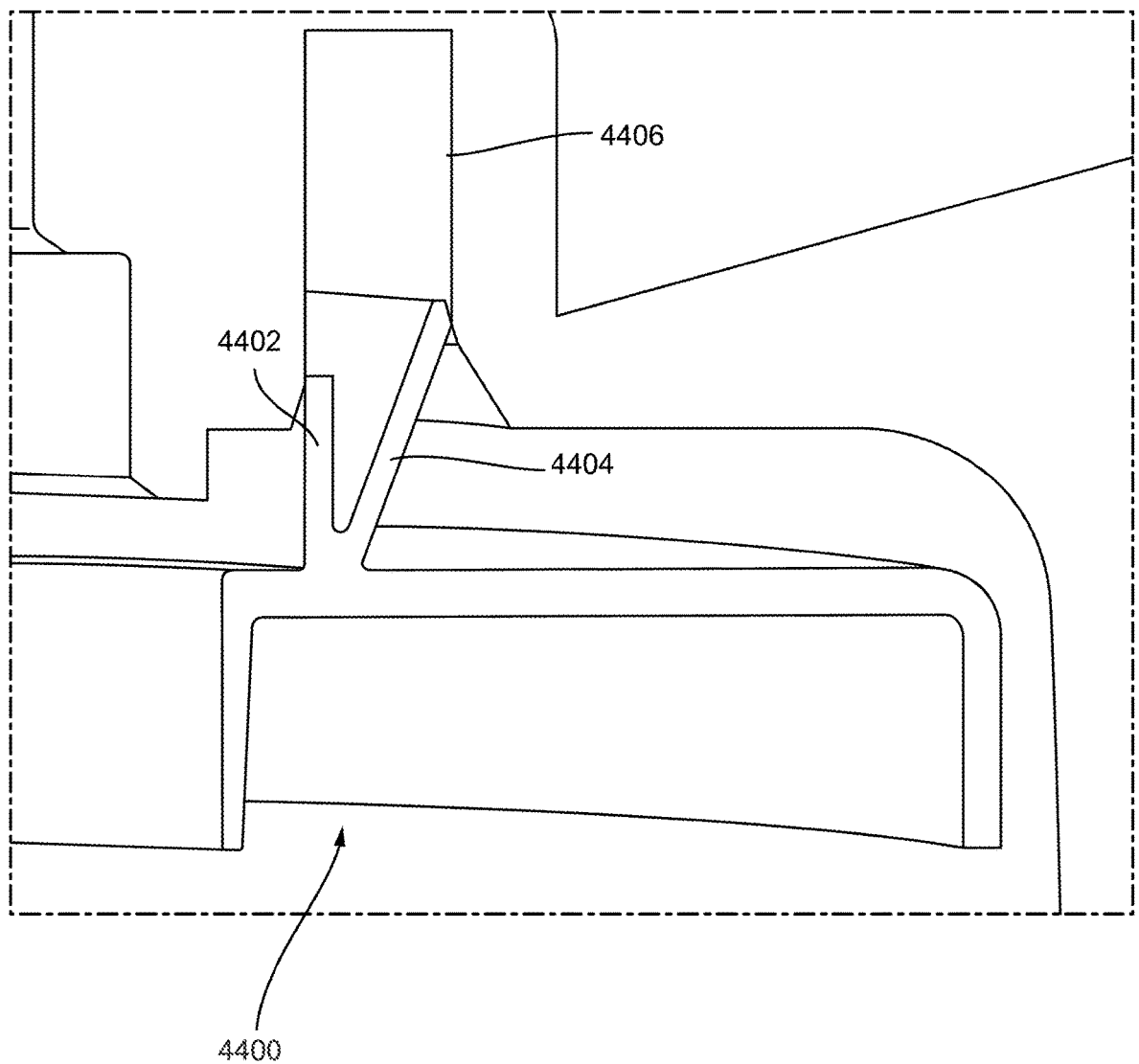
FIG. 47 is a cross-sectional view of a portion of a first endcap according to an example embodiment.
Figure 48:
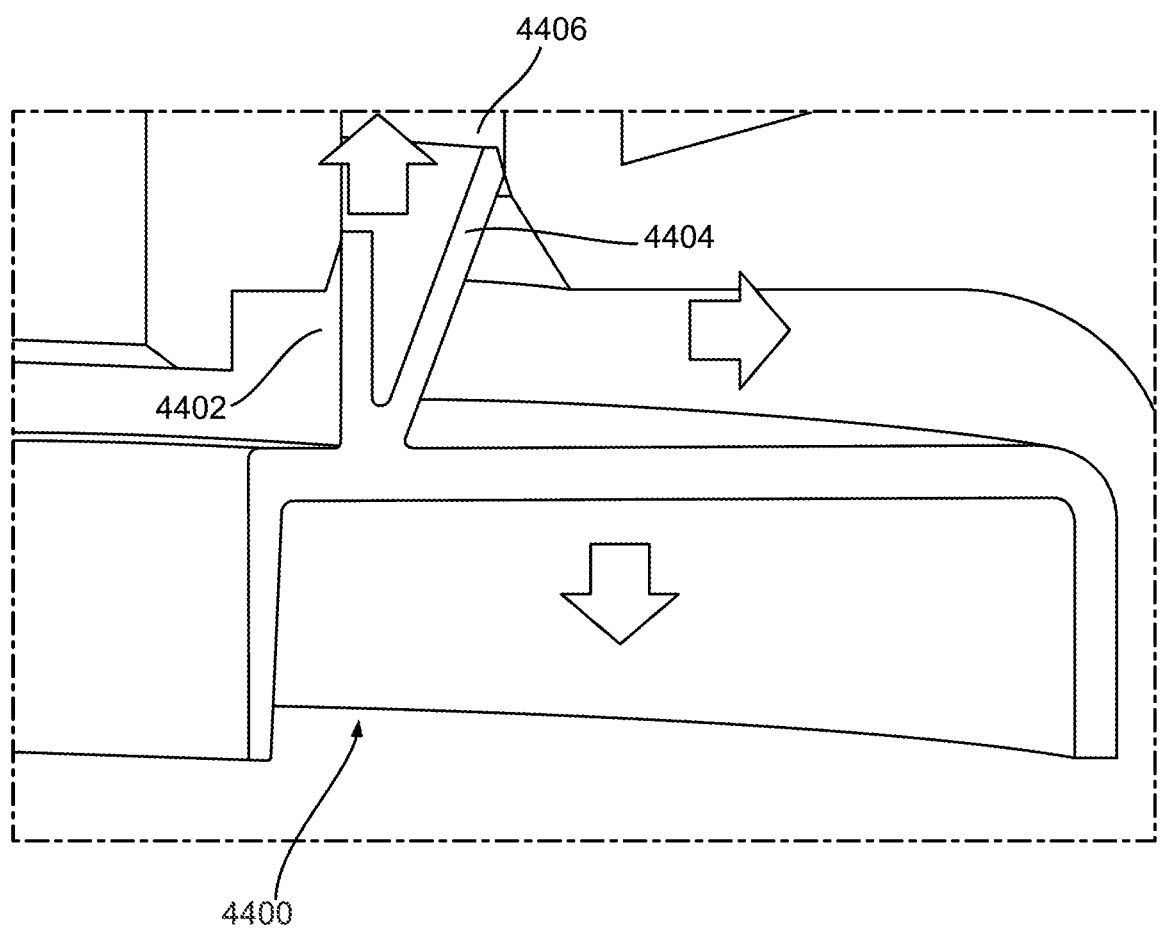
FIG. 48 is a detailed view of a portion of the first endcap of FIG. 47.

FIGS. 47 and 48 illustrate cross-sectional views of another first endcap according to multiple example embodiments. Yet in another concept, a v shape profile is developed to develop a seal member. Sealing is achieved by radial compression. The length of inner and outer arm of "v" is modified to achieve sealing at different timings. A small chamfer is added on outer arm of v to ensure smooth entry. The delaying length feature can be modified to meet a target application. The end plate is manufactured as a single part in one draw. The core out directions are shown in FIG. 48.

Referring to FIG. 47, a first endcap 4400 is shown with a first endcap projection 4402 that includes a seal member 4404 structurally integrated therewith (and therefore structurally integrated with the first endcap 4400) according to an example embodiment. Insertion of the first endcap projection 4402 into the filter head channel 4406 causes compression of the seal member 4404 towards the first endcap projection 4402. This compression causes a void between the seal member 4404 and the first endcap projection 4402 to be decreased.

Figure 49:
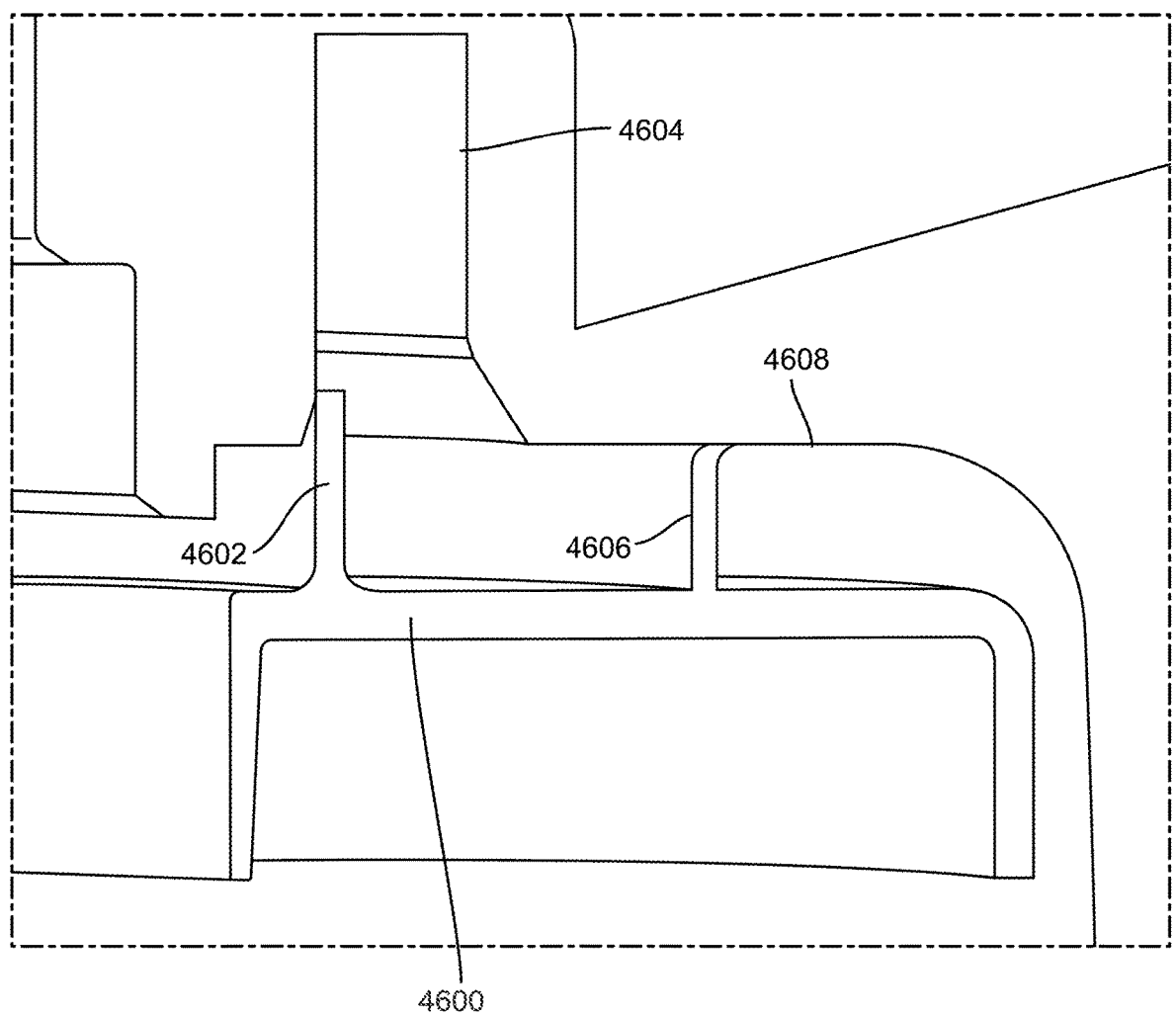
FIG. 49 is a cross-sectional view of a portion of a first endcap according to an example embodiment.
Figure 50:
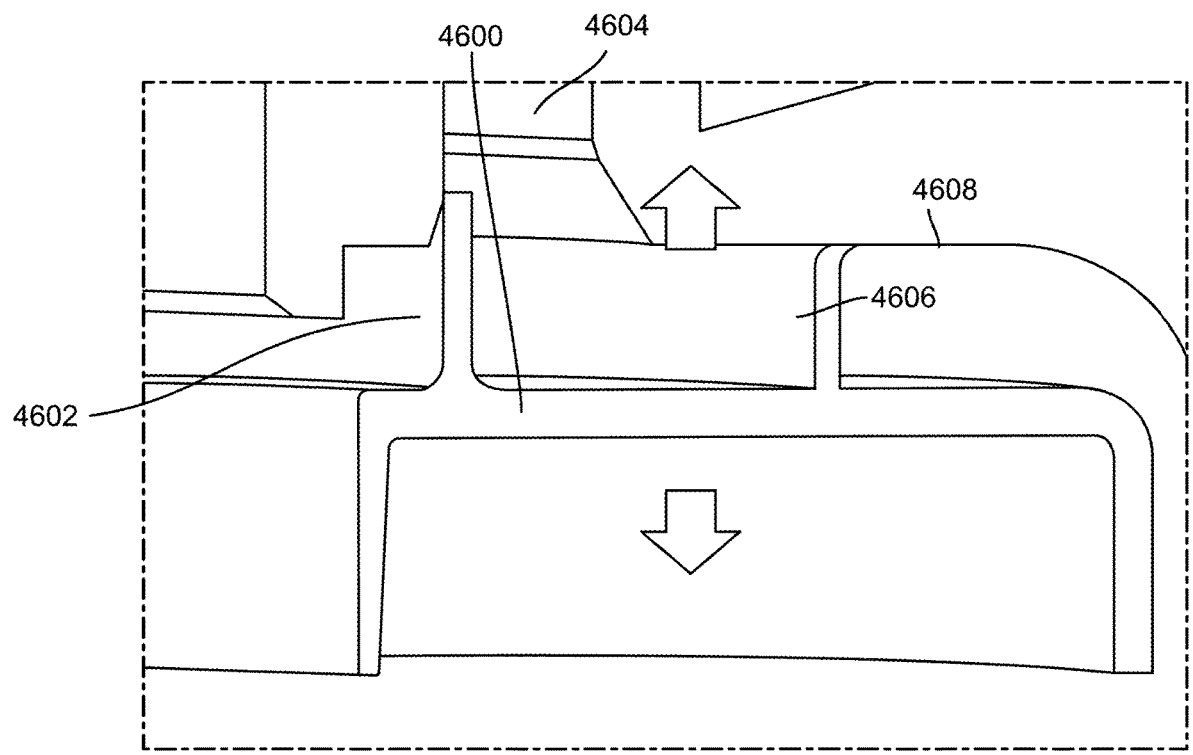
FIG. 50 is a detailed view of a portion of the first endcap of FIG. 49.

FIGS. 49 and 50 illustrate cross-sectional views of another first endcap according to multiple example embodiments. This is a combination seal member concept. Here for fluid at one side, sealing is established by a collapsible/deformable vertical leg. This sealing is achieved is on horizontal surface. The leg may maintain sealing on the horizontal surface as long as there is a downward force on it due to cartridge assembly. The other sealing surface may be same and here, it is achieved on the inner vertical surface of groove. The delaying length feature can be modified to meet a target application. The end plate is manufactured as a single part in one draw. The core out directions are shown in FIG. 50.

Referring to FIG. 49, a first endcap 4600 is shown with a first endcap projection 4602 that functions as a seal member according to an example embodiment. Rather than forming a seal exclusively in the filter head channel 4604 upon insertion of the first endcap projection 4602 in the filter head channel 4604, the first endcap 4600 includes a seal member 4606 protecting therefrom an interfacing with a filter head 4608 (e.g., with a floor of the filter head 4608, etc.) radially outward of the filter head channel 4604. As a result of inserting the first endcap projection 4602 in the filter head channel 4604, the seal member 4606 is compressed against the filter head 4608 and a seal is formed between the first endcap projection 4602, the filter head channel 4604, the first endcap 4600, the seal member 4606, and the filter head 4608.

Figure 51:
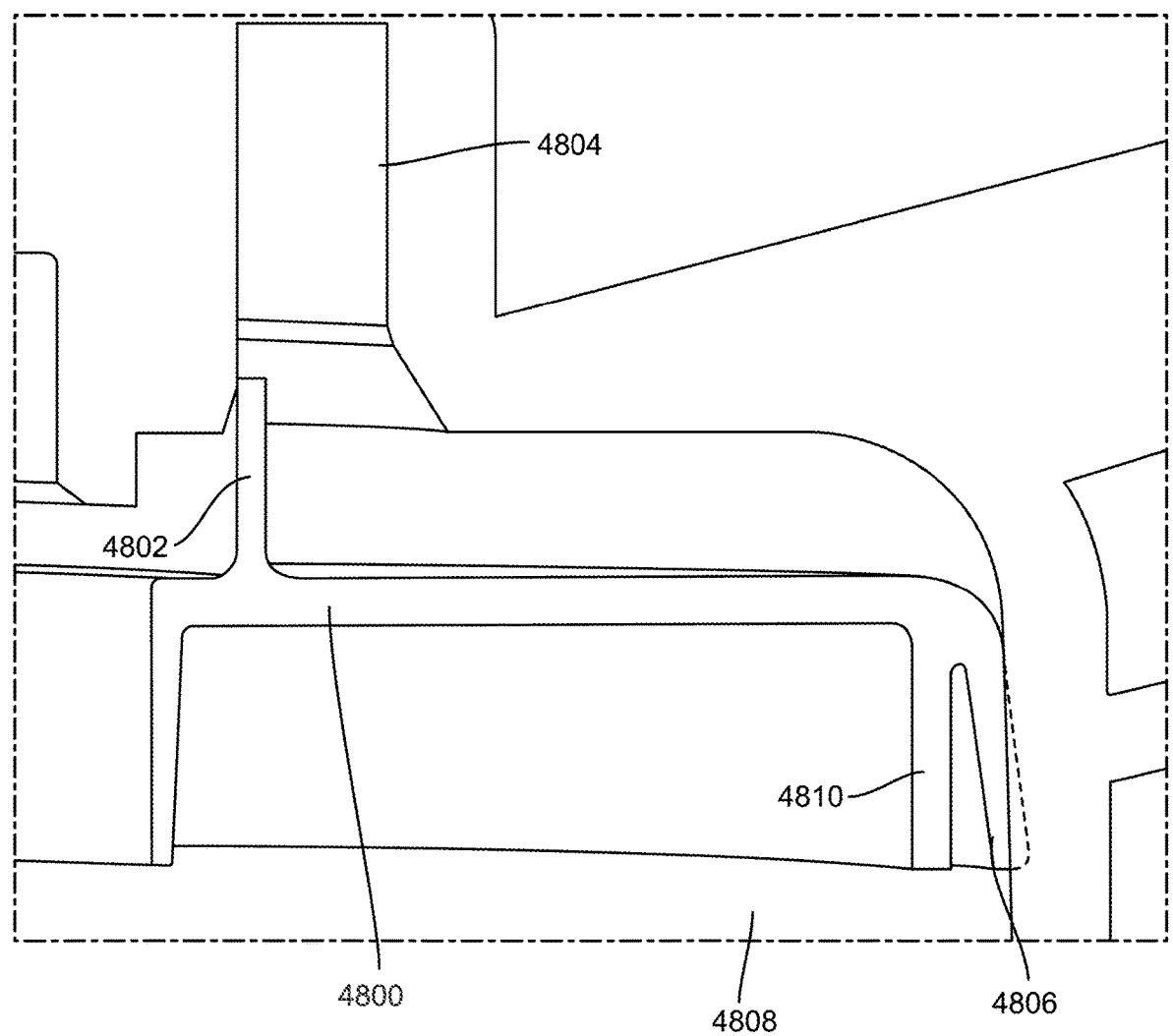
FIG. 51 is a cross-sectional view of a portion of a first endcap according to another example embodiment.
Figure 52:
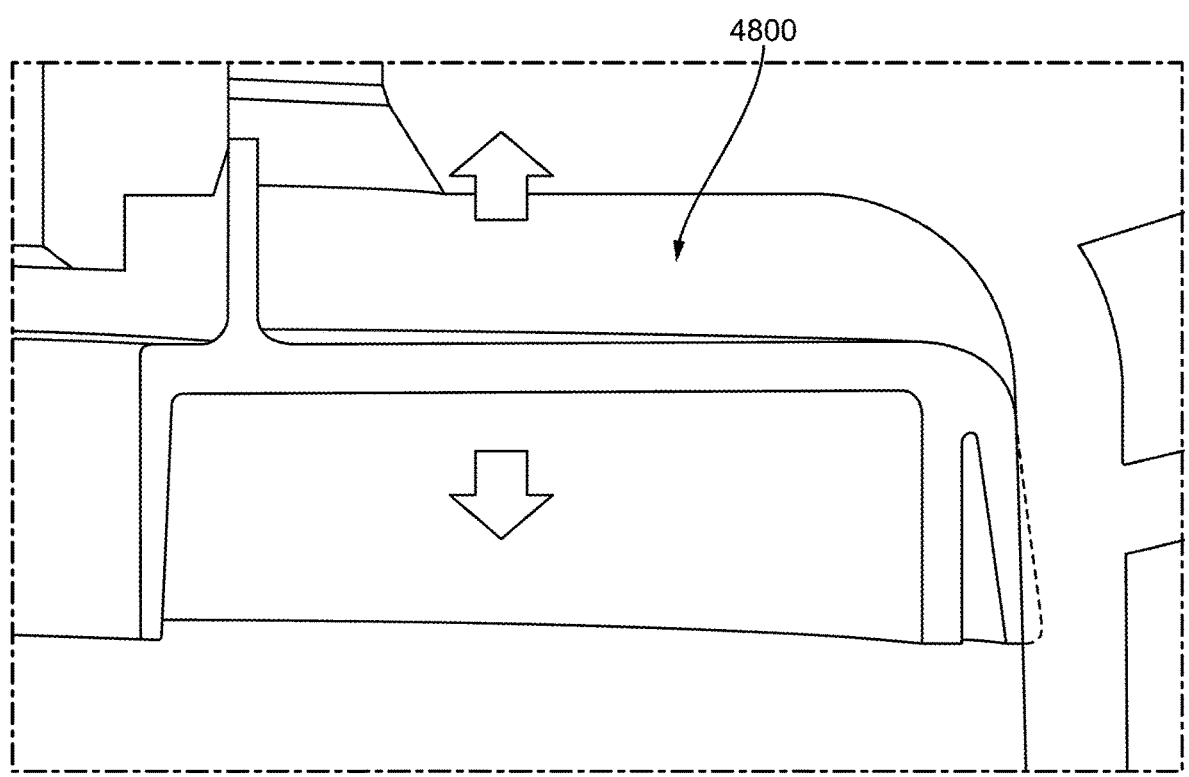
FIG. 52 is a detailed view of a portion of the first endcap of FIG. 51.

FIGS. 51 and 52 illustrate cross-sectional views of another first endcap according to multiple example embodiments. In this arrangement, a lip seal member is present at the outermost diameter of end plate. Near an inner portion, the sealing is achieved by a straight feature as shown in FIG. 52. The installation force is low due to highly deformable lip seal member feature. Delaying length feature can be modified to meet a target application. The end plate is manufactured as a single part in one draw. The core out directions are shown in FIG. 52.

Referring to FIG. 51, a first endcap 4800 is shown with a first endcap projection 4802 that functions as a seal member according to an example embodiment. Rather than forming a seal exclusively in the filter head channel 4804 upon insertion of the first endcap projection 4802 in the filter head channel 4804, the first endcap 4800 includes a seal member 4806 protecting therefrom an interfacing with a filter head 4808 (e.g., with a wall of the filter head 4808, etc.) radially outward of the filter head channel 4804. As a result of inserting the first endcap projection 4802 in the filter head channel 4804, the seal member 4806 is compressed against the filter head 4808 and a seal is formed between the first endcap projection 4802, the filter head channel 4804, the first endcap 4800, the seal member 4806, and the filter head 4808. The first endcap 4800 includes a first endcap flange 4810 that interfaces with a filter cartridge (e.g., with an outer surface of the first endcap, etc.). The seal member 4806 is contiguous with the first endcap flange 4810. Compression of the seal member 4806 caused by insertion of the first endcap projection 4802 in the filter head channel 4804 causes a void between the seal member 4806 and the first endcap flange 4810 to be decreased. The filter head 4808 may be shaped (e.g., rounded, filleted, chamfered, etc.) to increase deflection of the seal member 4806 upon insertion of the first endcap projection 4802 in the filter head channel 4804, thereby increasing sealing between the seal member 4806 and the filter head 4808.

Figure 53:
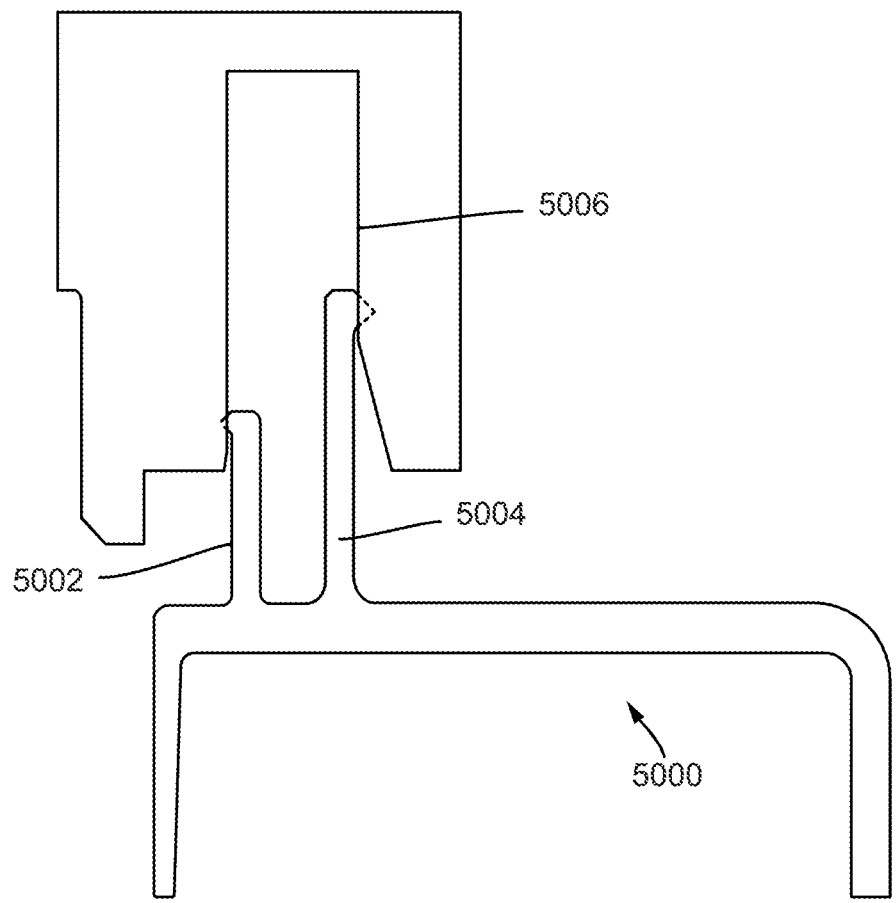
FIG. 53 is a cross-sectional view of a portion of a first endcap according to yet another example embodiment.
Figure 54:
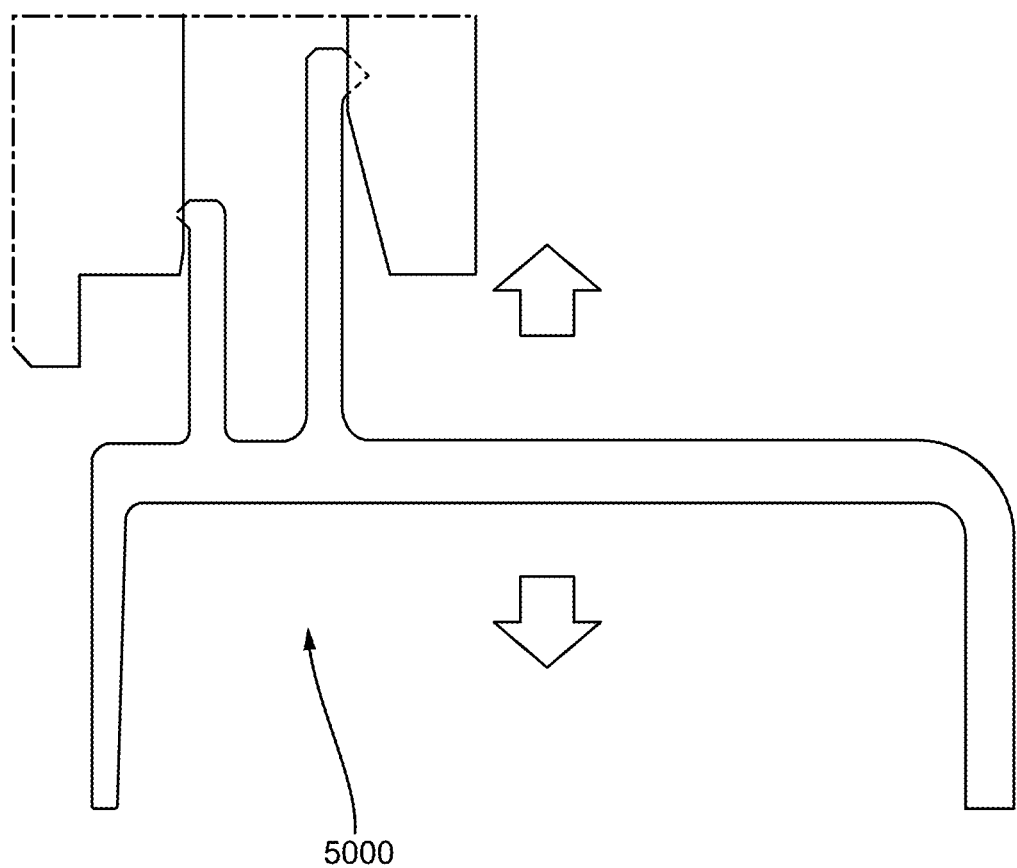
FIG. 54 is a detailed view of a portion of the first endcap of FIG. 53.

FIGS. 53 and 54 illustrate cross-sectional views of another first endcap according to multiple example embodiments. In this concept, two straight legs/arms develop the required sealing surface. The seal member is developed due to the bending of legs/arms. A crushable dimple feature can be added on both legs/arms to ensure a tight seal. The end plate is manufactured as a single part in one draw. The core out directions are shown in FIG. 54.

Referring to FIG. 53, a first endcap 5000 is shown with a first endcap projection 5002 that functions as a seal member and with a separate seal member 5004 according to an example embodiment. The first endcap 5000 is configured such that both the first endcap projection 5002 and the separate seal member 5004 may be inserted into the filter head channel 5006 simultaneously. Insertion of the first endcap projection 5002 and the separate seal member 5004 into the filter head channel 5006 causes compression of the first endcap projection 5002 towards the separate seal member 5004 and vice versa.

Figure 55:
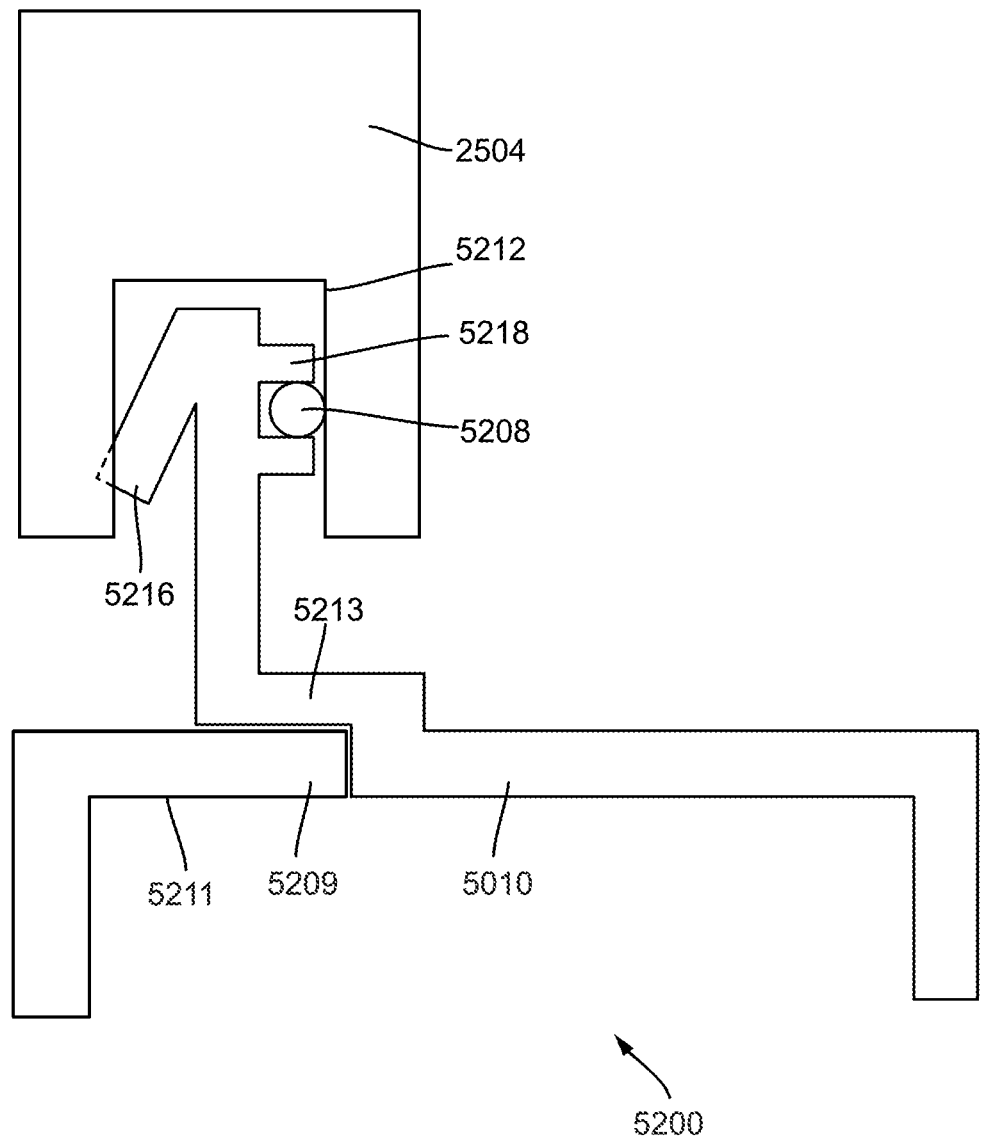
FIG. 55 is a cross-sectional view of a portion of a first endcap according to still another example embodiment.
Figure 56:
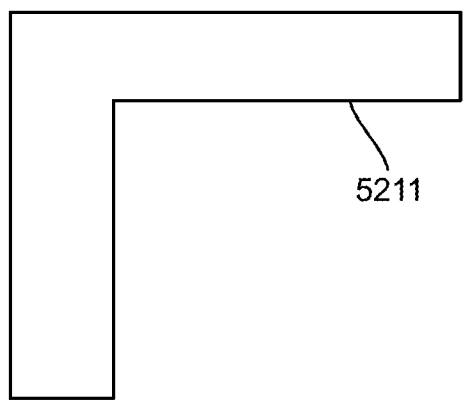
FIG. 56 is a detailed view of a portion of the first endcap of FIG. 55.
Figure 57:
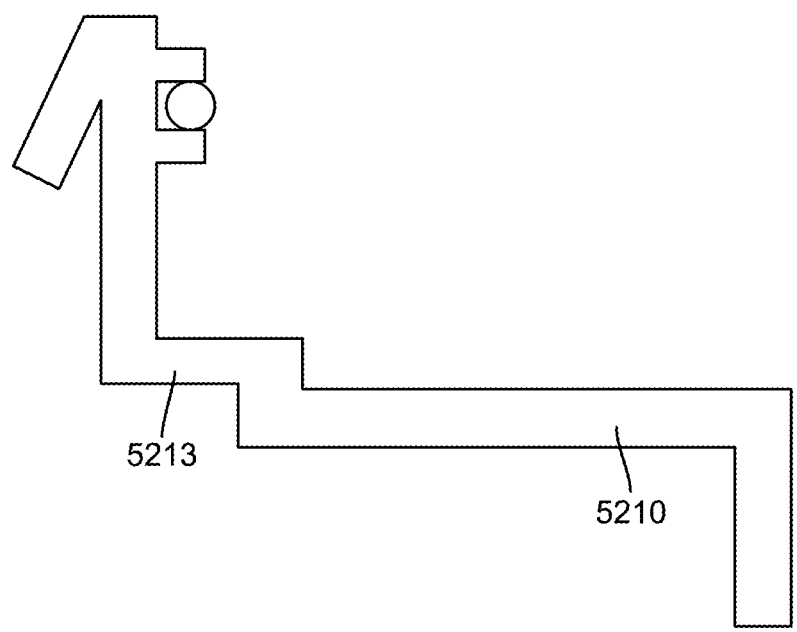
FIG. 57 is a detailed view of another portion of the first endcap of FIG. 55.

FIGS. 55-57 illustrate cross-sectional views of another first endcap according to multiple example embodiments. Fluids at two sides are separated by an O-ring and a lip seal member. Here also, the delaying feature can be added to control the drainage. The end-plate is manufactured in two different stages. At first, the inner end plate is developed in one draw as per draw direction in FIG. 56. In next stage, the outer portion of end plate is developed in one draw. The draw directions are as shown in FIG. 57. Both parts are then joined together at the sitting area with snaps. Pouring the epoxy during media installation forms the joint between two parts.

Referring to FIG. 55, a cross-sectional view of a filter assembly 5200 is shown according to an example embodiment. The filter assembly 5200 includes a filter head lid, a filter head 5204, a filter cartridge, a seal member 5208, a first endcap 5210 (e.g., endcap, etc.), a first endcap insert 5211, and the filter head channel 5212. The first endcap interfaces with the first endcap 5210. The first endcap insert 5211 includes a first endcap insert shelf 5209 that interfaces with a first endcap shelf 5213 of the first endcap 5210. The first endcap 5210 includes a first endcap projection 5214, which is configured to be inserted in the filter head channel 5212. The first endcap projection 5214 includes a structurally integrated seal member 5216 and a seal member receiver 5218 configured to receive the seal member 5208. The structurally integrated seal member 5216 is also structurally integrated with the first endcap 5210. Upon insertion of the first endcap projection 5214 into the filter head channel 5212, the structurally integrated seal member 5216 is compressed towards the seal member receiver 5218 and the seal member 5208 is compressed towards the structurally integrated seal member 5216.

Figure 58:
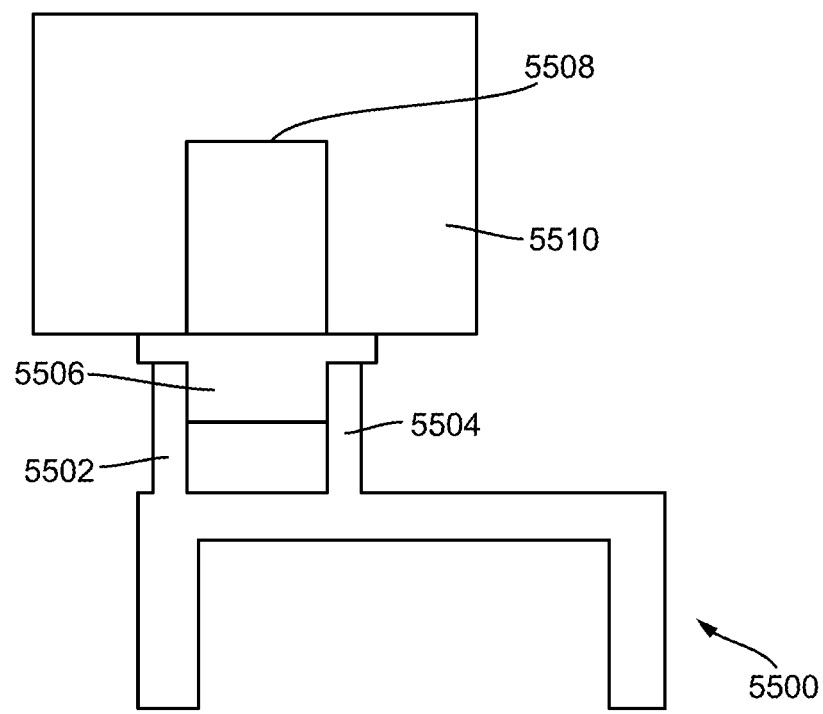
FIG. 58 is a cross-sectional view of a portion of a first endcap according to another example embodiment.
Figure 61:
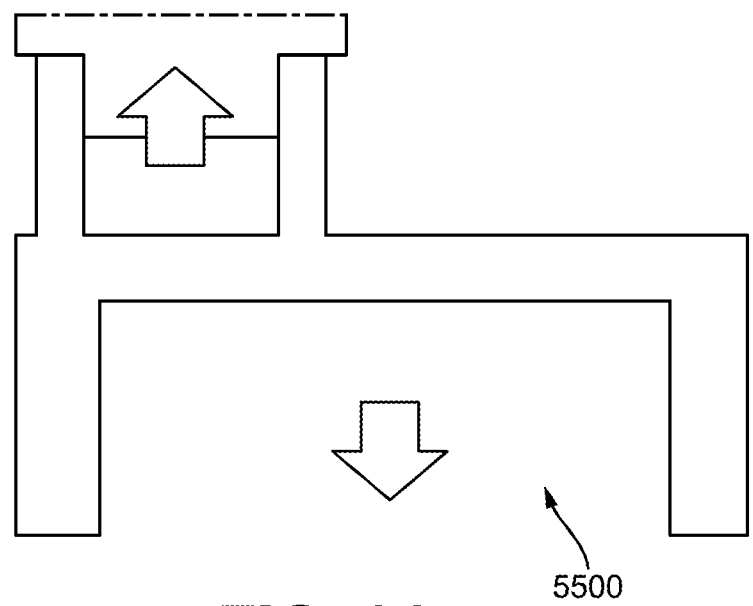
FIG. 61 is a detailed view of another portion of the first endcap of FIG. 58.

FIGS. 58-61 illustrate cross-sectional views of another first endcap according to multiple example embodiments. In this concept, sealing is achieved on the horizontal surface by the cartridge assembly force. In some embodiments, such as are shown in FIGS. 58 and 61, a single seal member is used that covers the entire opening of the drain port in the filter head.

Referring to FIG. 58, a first endcap 5500 is shown with a first endcap projection 5502, a second first endcap projection 5504, and a seal member 5506 according to an example embodiment. Rather than forming a seal in the filter head channel 5508, the first endcap 5500 forms a seal over the filter head channel 5508 by compressing the seal member 5506 against a filter head 5510 around the filter head channel 5508. Specifically, the first endcap projection 5502 and the second first endcap projection 5504 each compress the seal member 5506 against the filter head 5510.

Figure 59:
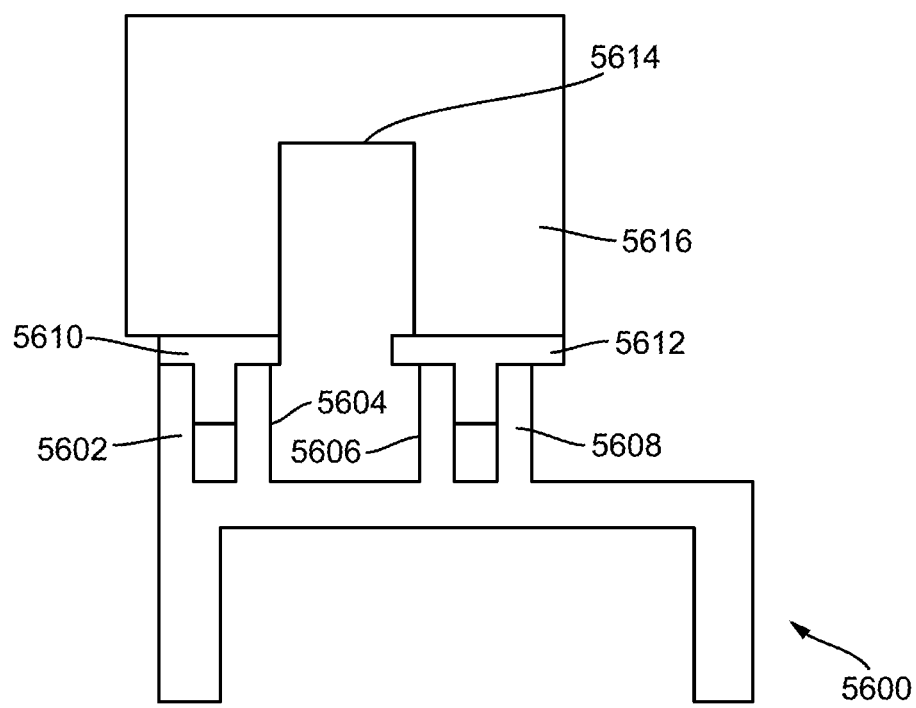
FIG. 59 is a cross-sectional view of a portion of a first endcap according to an example embodiment.
Figure 60:
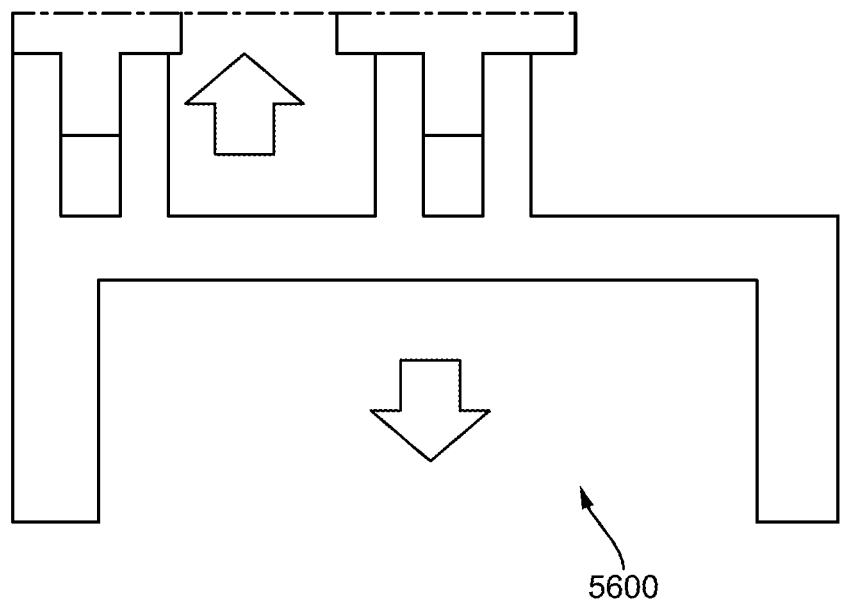
FIG. 60 is a detailed view of another portion of the first endcap of FIG. 59.

Referring to FIG. 59, a first endcap 5600 is shown with a first endcap projection 5602, a second first endcap projection 5604, a third first endcap projection 5606, a fourth first endcap projection 5608, a first seal member 5610, and a second seal member 5612 according to an example embodiment. Rather than forming a seal in the filter head channel 5614, the first endcap 5600 forms a seal over the filter head channel 5614 by compressing the first seal member 5610 and the second seal member 5612 against a filter head 5616 around the filter head channel 5614. Specifically, the first endcap projection 5602 and the second first endcap projection 5604 compress the first seal member 5610 against the filter head 5616 and the third first endcap projection 5606 and the fourth first endcap projection 5608 compress the second seal member 5612 against the filter head 5616.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, lubricant, fuel, an air-lubricant mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A filter assembly comprising:
   a filter head comprising:
      a filter head coupling surface defining a filter head opening;
      a filter head outlet configured to provide a fluid;
      a filter head inner wall extending around the filter head outlet; and
      a filter head outer wall extending around the filter head inner wall, the filter head inner wall and the filter head outer wall collectively defining a filter head channel; and
   a filter cartridge comprising:
      a filter cartridge shell having a filter cartridge coupling surface configured to be coupled to the filter head coupling surface, the filter cartridge shell defining a filter cartridge opening; and
      a filter element configured to be contained within the filter head opening and the filter cartridge opening when the filter cartridge coupling surface is coupled to the filter head coupling surface, the filter element comprising:
         a first endcap;
         a seal member coupled to the first endcap, the seal member configured to be received within the filter head channel, directly contacting the filter head inner wall and the filter head outer wall when the filter element is contained within the filter head opening and the filter cartridge opening; and
         filter media coupled to the first endcap.

2. The filter assembly of claim 1, wherein:
   the first endcap comprises:
      a first endcap flange interfacing with the filter media;
      a first endcap inner wall contiguous with the first endcap flange, the first endcap inner wall projecting orthogonally from the first endcap flange; and
      a first endcap outer wall contiguous with the first endcap flange, the first endcap outer wall projecting orthogonally from the first endcap flange and interfacing with the filter media; and
   the filter media extends between the first endcap inner wall and the first endcap outer wall.

3. The filter assembly of claim 2, wherein:
   the first endcap further comprises:
      an inner seal member wall extending from the first endcap flange away from the filter media; and
      an outer seal member wall extending from the first endcap flange away from the filter media, the outer seal member wall and the inner seal member wall collectively defining a seal member aperture; and
   the seal member comprises:
      a seal member base received within the seal member aperture and coupled to at least one of the inner seal member wall or the outer seal member wall; and
      a seal member head contiguous with the seal member base and separating at least one the inner seal member wall or the outer seal member wall from the filter head when the filter element is contained within the filter head opening and the filter cartridge opening.

4. The filter assembly of claim 2, wherein the filter element further comprises a central tube interfacing with the first endcap inner wall and the filter media, the central tube separating the first endcap inner wall from the filter media, the central tube comprising a plurality of central tube apertures and defining a central tube opening that is aligned with the filter head outlet when the filter element is contained within the filter head opening and the filter cartridge opening.

5. The filter assembly of claim 2, wherein:
   the first endcap further comprises a first lip section contiguous with the first endcap outer wall and extending from the first endcap outer wall away from the first endcap inner wall; and
   the filter cartridge shell comprises an edge that supports the first lip section within the filter head opening when the filter element is contained within the filter head opening and the filter cartridge opening.

6. The filter assembly of claim 5, wherein the first endcap further comprises a second lip section contiguous with the first endcap outer wall and extending from the first endcap outer wall away from the first endcap inner wall.

7. The filter assembly of claim 6, wherein the second lip section is separated from the first lip section by 90 degrees relative to a center axis of the filter cartridge shell, the second lip section supported on the edge within the filter head opening when the filter element is contained within the filter head opening and the filter cartridge opening.

8. The filter assembly of claim 5, wherein:
   the first lip section comprises a lip projection extending from the first lip section away from the first endcap flange;
   the edge comprises a first edge recess that is configured to receive the lip projection; and
   an interaction between the lip projection and the first edge recess resists rotation of the first endcap relative to the filter cartridge shell.

9. The filter assembly of claim 8, wherein the edge comprises a second edge recess that is configured to receive the lip projection.

10. The filter assembly of claim 9, wherein the second edge recess is separated from the first edge recess by 90 degrees relative to a center axis of the filter cartridge shell.

11. The filter assembly of claim 1, wherein the filter head further comprises a vent extending from the filter head channel and configured to facilitate evacuation of air within the filter head channel.

12. The filter assembly of claim 1, further comprising a drain plug;
   wherein the filter cartridge shell comprises a filter cartridge drain aperture at a lowermost point of the filter cartridge shell; and
   wherein the drain plug is selectively received within the filter cartridge drain aperture.

13. A filter assembly comprising:
   a filter head comprising:
      a filter head coupling surface defining a filter head opening;
      a filter head outlet configured to provide a fluid;
      a filter head inner wall extending around the filter head outlet;
      a filter head outer wall extending around the filter head inner wall, the filter head inner wall and the filter head outer wall collectively defining a filter head channel; and
      a vent extending from the filter head channel and configured to facilitate evacuation of air within the filter head channel; and
   a filter cartridge comprising:
      a filter cartridge coupling surface configured to be coupled to the filter head coupling surface; and
      a filter element configured to be contained within the filter head opening when the filter cartridge coupling surface is coupled to the filter head coupling surface, the filter element comprising:
a first endcap;
a seal member coupled to the first endcap, the seal member configured to be received within the filter head channel, directly contacting the filter head inner wall and the filter head outer wall when the filter element is contained within the filter head opening; and
filter media coupled to the first endcap;
wherein the vent extends above the first endcap when the filter cartridge coupling surface is coupled to the filter head coupling surface.

14. A filter assembly comprising:
a filter head comprising:
 a filter head coupling surface defining a filter head opening;
 a filter head outlet configured to provide a fluid;
 a filter head inner wall extending around the filter head outlet; and
 a filter head outer wall extending around the filter head inner wall, the filter head inner wall and the filter head outer wall collectively defining a filter head channel; and
a filter cartridge comprising:
 a filter cartridge shell having a filter cartridge coupling surface configured to be coupled to the filter head coupling surface, the filter cartridge shell defining a filter cartridge opening; and
 a filter element configured to be contained within the filter head opening and the filter cartridge opening when the filter cartridge coupling surface is coupled to the filter head coupling surface, the filter element comprising:
  filter media coupled to a first endcap;
  the first endcap comprising:
   a first endcap flange interfacing with the filter media;
   a first endcap inner wall contiguous with the first endcap flange, the first endcap inner wall projecting orthogonally from the first endcap flange;
   a first endcap outer wall contiguous with the first endcap flange, the first endcap outer wall projecting orthogonally from the first endcap flange and interfacing with the filter media, the filter media extending between the first endcap inner wall and the first endcap outer wall; and
   a first lip section contiguous with the first endcap outer wall and extending from the first endcap outer wall away from the first endcap inner wall; and
  a seal member coupled to the first endcap and configured to be received within the filter head channel when the filter element is contained within the filter head opening and the filter cartridge opening,
 wherein the filter cartridge shell comprises an edge that supports the first lip section within the filter head opening when the filter element is contained within the filter head opening and the filter cartridge opening.

15. The filter assembly of claim 14, wherein the first endcap further comprises a second lip section contiguous with the first endcap outer wall and extending from the first endcap outer wall away from the first endcap inner wall.

16. The filter assembly of claim 15, wherein the second lip section is separated from the first lip section by 90 degrees relative to a center axis of the filter cartridge shell, the second lip section supported on the edge within the filter head opening when the filter element is contained within the filter head opening and the filter cartridge opening.

17. The filter assembly of claim 14, wherein:
the first lip section comprises a lip projection extending from the first lip section away from the first endcap flange;
the edge comprises a first edge recess that is configured to receive the lip projection; and
an interaction between the lip projection and the first edge recess resists rotation of the first endcap relative to the filter cartridge shell.

18. The filter assembly of claim 17, wherein the edge comprises a second edge recess that is configured to receive the lip projection.

19. The filter assembly of claim 18, wherein the second edge recess is separated from the first edge recess by 90 degrees relative to a center axis of the filter cartridge shell.

* * * * *